US011939479B2

(12) United States Patent
Sato et al.

(10) Patent No.: US 11,939,479 B2
(45) Date of Patent: Mar. 26, 2024

(54) INK JET INK COMPOSITION, METHOD FOR PRODUCING THE SAME, AND IMAGE-FORMING METHOD

(71) Applicant: FUJIFILM CORPORATION, Tokyo (JP)

(72) Inventors: Noriaki Sato, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 883 days.

(21) Appl. No.: 17/002,792

(22) Filed: Aug. 26, 2020

(65) Prior Publication Data

US 2020/0392359 A1 Dec. 17, 2020

Related U.S. Application Data

(63) Continuation of application No. PCT/JP2019/011273, filed on Mar. 18, 2019.

(30) Foreign Application Priority Data

Mar. 27, 2018 (JP) .................................. 2018-060714

(51) Int. Cl.
*C09D 11/101* (2014.01)
*C08K 5/13* (2006.01)
(Continued)

(52) U.S. Cl.
CPC .............. *C09D 11/101* (2013.01); *C08K 5/13* (2013.01); *C08K 5/41* (2013.01); *C08K 5/45* (2013.01); *C08K 5/49* (2013.01); *C09D 11/38* (2013.01)

(58) Field of Classification Search
CPC ........ C09D 11/101; C09D 11/38; C08K 5/13; C08K 5/41; C08K 5/45; C08K 5/49; C08K 5/06; C08K 5/42; B41J 2/01
See application file for complete search history.

(56) References Cited

U.S. PATENT DOCUMENTS

2005/0113476 A1 5/2005 Akiyama et al.
2006/0057339 A1 3/2006 Adachi et al.
(Continued)

FOREIGN PATENT DOCUMENTS

CN 1654559 A 8/2005
CN 104870576 A 8/2015
(Continued)

OTHER PUBLICATIONS

English machine translation of WO-2018042916-A1 (Year: 2018).*
(Continued)

*Primary Examiner* — Jennifer A Smith
*Assistant Examiner* — Jeffrey Eugene Barzach
(74) *Attorney, Agent, or Firm* — SOLARIS Intellectual Property Group, PLLC

(57) ABSTRACT

Provided are an ink jet ink composition including water and particles including a polymer having an anionic group, a photo-acid generator, and a sensitizer, wherein a value obtained by subtracting a photo-acid generator amount G being a number of millimoles of the photo-acid generator per 1 g of the particles from an anionic group value A being a number of millimoles of the anionic group per 1 g of the particles is −0.20 or more and 0.20 or less, and the sensitizer is at least one of compounds represented by Formula (S1) to Formula (S3); a method for producing the ink jet ink composition; and an image-forming method. $R^{11}$, $R^{12}$, $R^{21}$, $R^{31}$, $R^{32}$, $R^{33}$, and $R^{34}$ each independently represent a substituent; n11, n12, n21, n33, and n34 each independently represent an integer of 0 to 4; and $R^{22}$ and $R^{23}$ each independently represent a hydrogen atom or a substituent.

(Continued)

US 11,939,479 B2
Page 2

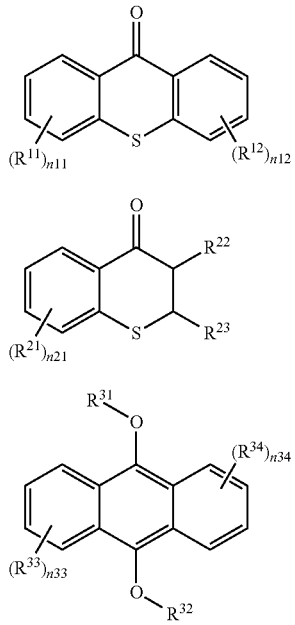

13 Claims, 1 Drawing Sheet

(51) Int. Cl.
*C08K 5/41* (2006.01)
*C08K 5/45* (2006.01)
*C08K 5/49* (2006.01)
*C09D 11/38* (2014.01)

(56) References Cited

U.S. PATENT DOCUMENTS

| 2008/0213550 A1 | 9/2008 | Watanabe |
| 2011/0057983 A1 | 3/2011 | Kato et al. |
| 2015/0291815 A1 | 10/2015 | Verschuuren et al. |
| 2017/0174913 A1 | 6/2017 | Sato et al. |

FOREIGN PATENT DOCUMENTS

| JP | 2004-338361 A | | 12/2004 | |
| JP | 2008-266561 A | | 11/2008 | |
| JP | 2010-066392 A | | 3/2010 | |
| JP | 2011-057791 A | | 3/2011 | |
| JP | 2011-073195 A | | 4/2011 | |
| JP | 2011-074143 A | | 4/2011 | |
| JP | 2011074143 A | * | 4/2011 | |
| JP | 2012-001587 A | | 1/2012 | |
| JP | 2012001587 A | * | 1/2012 | |
| JP | 2015-120818 A | | 7/2015 | |
| JP | 2017-101178 A | | 6/2017 | |
| WO | 2016/052053 A | | 4/2016 | |
| WO | WO-2018042916 A1 | * | 3/2018 | ......... C08G 18/0823 |

OTHER PUBLICATIONS

English machine translation of JP-2012001587-A (Year: 2012).*
English machine translation of JP-2011074143-A (Year: 2011).*
English language translation of the following: Office action dated Feb. 25, 2022 from the SIPO in a Chinese patent application No. 201980021752.7 corresponding to the instant patent application. This office action translation is submitted now in order to supplement the understanding of the cited references which are being disclosed in the instant Information Disclosure Statement.
Extended European Search Report dated May 26, 2021, issued in corresponding EP Patent Application No. 19777263.5.
International Search Report issued in International Application No. PCT/JP2019/011273 dated May 21, 2019.
Written Opinion of the ISA issued in International Application No. PCT/JP2019/011273 dated May 21, 2019.

* cited by examiner

INK JET INK COMPOSITION, METHOD FOR PRODUCING THE SAME, AND IMAGE-FORMING METHOD

CROSS-REFERENCE TO RELATED APPLICATIONS

This application is a continuation application of International Application No. PCT/JP2019/011273, filed Mar. 18, 2019, the disclosure of which is incorporated herein by reference in its entirety. Further, this application claims priority from Japanese Patent Application No. 2018-060714, filed Mar. 27, 2018, the disclosure of which is incorporated herein by reference in its entirety.

BACKGROUND OF THE INVENTION

1. Field of the Invention

The present disclosure relates to an ink jet ink composition, a method for producing the ink jet ink composition, and an image-forming method.

2. Description of the Related Art

There are known ink jet ink compositions containing water and particles including a polymer.

For example, WO2016/052053A discloses, as gel particles that have high dispersibility and high re-dispersibility in the case of occurrence of solidification, and that cure at high sensitivity to provide a film (such as an image) having high film hardness, gel particles that have a polymerizable group, have a three-dimensional crosslinked structure including at least one bond selected from the group consisting of a urethane bond and a urea bond, and internally include a photopolymerization initiator, and further discloses an ink composition containing these gel particles and water.

In addition, JP2011-57791A discloses, as an aqueous ink composition that has high fixability and high ejectability, an aqueous ink composition including a) an aqueous medium, b) a compound having an ethylenically unsaturated bond, and c) initiator-containing resin particles including a water-insoluble vinyl polymer and a water-insoluble photo-initiator.

In addition, JP2017-101178A discloses, as an aqueous ink that has high ink preservation stability and high image fixability, an aqueous ink that contains resin particles having cores and shells and multivalent metallic ions, and that is used for recording an image on a recording medium having a relatively low pH, wherein the percentage (mass %) of, in a resin (C) constituting the cores, a unit derived from an ethylenically unsaturated monomer having an anionic group relative to the total resin mass is 5.00 mass % or less; a resin (S) constituting the shells has a unit derived from an ethylenically unsaturated monomer having an anionic group, and the percentage (mass %) of the unit relative to the total resin mass is 10.00 mass % or more; the shells have a film thickness of 3.0 to 15.0 nm; some of anionic groups in the resin particles form, together with a multivalent metallic ion, a complex; the amounts of anionic groups of the resin particles and the complex are disclosed; and the resin particles have a volume-average particle size of 50.0 to 400.0 nm.

SUMMARY OF THE INVENTION

However, there are some cases where images formed from aqueous ink jet ink compositions including, as a liquid component, water are required to have improved image definition. In such a case of trying to improve the image definition, the aqueous ink jet ink composition may have lowered ejection stability (specifically, stability of ejection through ink jet nozzles. hereafter, the same definition).

An object according to an aspect of the present disclosure is to provide an ink jet ink composition that forms an image having high definition and exhibits high ejection stability.

An object according to another aspect of the present disclosure is to provide an ink jet ink composition production method for producing the above-described ink jet ink composition.

An object according to still another aspect of the present disclosure is to provide an image-forming method that forms an image having high definition and exhibits high ink ejection stability.

Specific means for achieving the objects include the following embodiments.

<1> An ink jet ink composition including:
water; and
particles including a polymer having an anionic group, a photo-acid generator, and a sensitizer,
wherein a number of millimoles of the anionic group per 1 g of the particles is defined as an intra-particle anion value A, a number of millimoles of the photo-acid generator per 1 g of the particles is defined as an intra-particle photo-acid generator amount G, and a value obtained by subtracting the intra-particle photo-acid generator amount G from the intra-particle anion value A is −0.20 or more and 0.20 or less, and
the sensitizer is at least one selected from the group consisting of a compound represented by Formula (S1) below, a compound represented by Formula (S2) below, and a compound represented by Formula (S3) below.

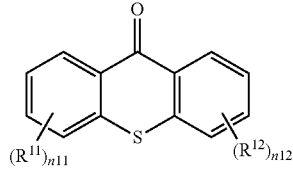

(S1)

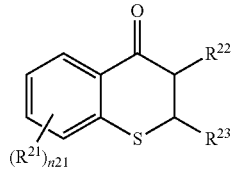

(S2)

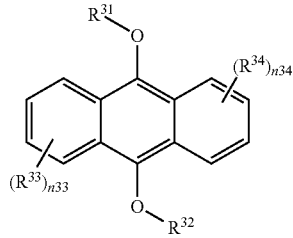

(S3)

In Formula (S1), Formula (S2), and Formula (S3), $R^{11}$, $R^{12}$, $R^{21}$, $R^{33}$, and $R^{34}$ each independently represent a halogen atom, an alkyl group, an aryl group, a hydroxy group, an amino group, an alkylsulfanyl group, an alkylamino group, an alkoxy group, an alkoxycarbonyl group, an acyloxy group, an acyl group, a carboxy group, or a sulfo group; n11, n12, n21, n33, and n34 each independently represent an integer of 0 to 4; when n11 is an integer of 2 to 4, a plurality of $R^{11}$ may be the same or different; when n12 is an integer of 2 to 4, a plurality of $R^{12}$ may be the same or different; when n21 is an integer of 2 to 4, a plurality of $R^{21}$ may be the same or different; when n33 is an integer of 2 to 4, a plurality of $R^{33}$ may be the same or different; when n34 is an integer of 2 to 4, a plurality of $R^{34}$ may be the same or different, in Formula (S2), $R^{22}$ and $R^{23}$ each independently represent a hydrogen atom, a halogen atom, an alkyl group, or a hydroxy group, and in Formula (S3), $R^{31}$ and $R^{32}$ each independently represent an alkyl group.

<2> The ink jet ink composition according to <1>, wherein the anionic group is a carboxylate group.

<3> The ink jet ink composition according to <1> or <2>, wherein the photo-acid generator is at least one selected from the group consisting of a compound represented by Formula (G1) below and a compound represented by Formula (G2) below.

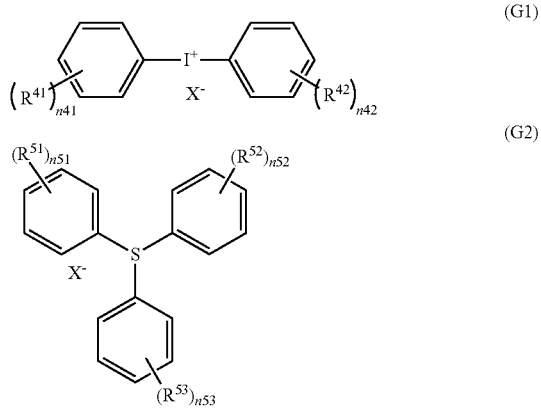

In Formula (G1) and Formula (G2), $R^{41}$, $R^{42}$, $R^{51}$, $R^{52}$, and $R^{53}$ each independently represent a halogen atom, an alkyl group, an aryl group, a hydroxy group, an alkoxy group, an aryloxy group, an alkylthio group, an arylthio group, or a trifluoromethyl group; n41, n42, n51, n52, and n53 each independently represent an integer of 0 to 5; when n41 is an integer of 2 to 5, a plurality of $R^{41}$ may be the same or different; when n42 is an integer of 2 to 5, a plurality of $R^{42}$ may be the same or different; when n51 is an integer of 2 to 5, a plurality of $R^{51}$ may be the same or different; when n52 is an integer of 2 to 5, a plurality of $R^{52}$ may be the same or different; when n53 is an integer of 2 to 5, a plurality of $R^{53}$ may be the same or different; and $X^-$ in Formula (G1) and $X^-$ in Formula (G2) each independently represent a chloride ion, a bromide ion, an iodide ion, a para-toluenesulfonate ion, a tetrafluoroborate ion, a trifluoromethanesulfonate ion, a bis(trifluoromethylsulfonyl)imide ion, a hexafluorophosphate ion, a hexafluoroantimonate ion, a perchlorate ion, or a hexafluoroarsenate ion.

<4> The ink jet ink composition according to any one of <1> to <3>, wherein the photo-acid generator includes the compound represented by Formula (G2).

<5> The ink jet ink composition according to <4>, wherein $X^-$ in Formula (G2) is a trifluoromethanesulfonate ion or a hexafluorophosphate ion.

<6> The ink jet ink composition according to any one of <1> to <5>, wherein the sensitizer includes the compound represented by Formula (S1).

<7> The ink jet ink composition according to any one of <1> to <6>, wherein the particles further include a compound represented by Formula (SA).

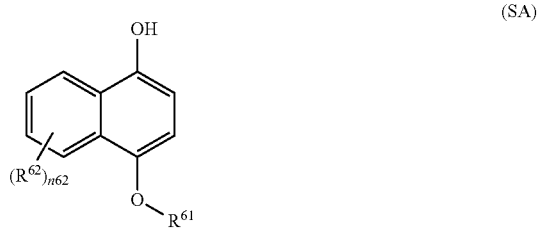

In Formula (SA), $R^{61}$ represents a hydrocarbon group having 1 to 20 carbon atoms; $R^{62}$ represents a halogen atom, an alkyl group, an aryl group, a hydroxy group, an alkoxy group, or a trifluoromethyl group; n62 represents an integer of 0 to 4; and when n62 is an integer of 2 to 4, a plurality of $R^{62}$ may be the same or different.

<8> The ink jet ink composition according to any one of <1> to <7>, wherein the particles further include a radical-polymerizable monomer.

<9> The ink jet ink composition according to any one of <1> to <8>, wherein the polymer further has a radical-polymerizable group.

<10> The ink jet ink composition according to any one of <1> to <9>, wherein the particles further include a radical polymerization initiator.

<11> The ink jet ink composition according to any one of <1> to <10>, the ink jet ink composition being used as an ink in an image-forming method including a step of applying, onto a substrate, the ink by an ink jet process to form an ink film, a step of irradiating the formed ink film with light, and a step of heat-drying the ink film irradiated with light to obtain an image.

<12> A method for producing the ink jet ink composition according to any one of <1> to <11>, the method including:

a step of mixing together an oil-phase component including an organic solvent, a polymer having an acid group, the photo-acid generator, and the sensitizer, and an aqueous-phase component including water and a neutralizer, and performing emulsification to form the particles.

<13> An image-forming method including:

a step of applying, onto a substrate, the ink jet ink composition according to any one of <1> to <10> by an ink jet process to form an ink film;

a step of irradiating the formed ink film with light; and a step of heat-drying the ink film irradiated with light to obtain an image.

An aspect of the present disclosure provides an ink jet ink composition that forms an image having high definition and exhibits high ejection stability.

Another aspect of the present disclosure provides an ink jet ink composition production method for producing the above-described ink jet ink composition.

Still another aspect of the present disclosure provides an image-forming method that forms an image having high definition and exhibits high ink ejection stability.

BRIEF DESCRIPTION OF THE DRAWING

FIG. 1 illustrates a character image used for evaluation of the definition of images in EXAMPLES.

DESCRIPTION OF THE PREFERRED EMBODIMENTS

In this Specification, ranges defined by a value "to" a value include these values as the minimum value and the maximum value.

In this Specification, the amount of each of components in a composition means, when the composition contains a plurality of substances belonging to such a component, the total amount of the plurality of substances in the composition unless otherwise specified.

In this Specification, among ranges described in series, the upper limit value or the lower limit value of a range may be replaced by the upper limit value or the lower limit value of one of other ranges described in series, or may be replaced by a value described in Examples.

In this Specification, the term "step" includes not only an independent step, but also a step that is not clearly distinguished from another step but that achieves the intended result of the step.

In this Specification, "*" in chemical formulas denote bonding positions.

In this Specification, the concept of "images" encompasses, in addition to patterned images (such as characters, symbols, and figures), solid images.

In this Specification, "light" is a concept that encompasses actinic energy rays such as γ-rays, β-rays, electron beams, ultraviolet radiation, and visible radiation.

In this Specification, ultraviolet radiation is also referred to as "UV (Ultra Violet) light".

In this Specification, light emitted from an LED (Light Emitting Diode) light source is also referred to as "LED light".

In this Specification, "(meth)acrylic polymer" is a concept that encompasses both of an acrylic polymer and a methacrylic polymer; "(meth)acrylic acid" is a concept that encompasses both of acrylic acid and methacrylic acid; "(meth)acrylate" is a concept that encompasses both of acrylate and methacrylate; and "(meth)acryloyl group" is a concept that encompasses both of an acryloyl group and a methacryloyl group.

In this Specification, the polyoxyalkylene group, the amide group, the urea group, and the urethane group respectively mean a polyoxyalkylene bond, an amide bond, a urea bond, and a urethane bond.

Ink Jet Ink Composition

An ink jet ink composition according to the present disclosure (hereafter, also simply referred to as "ink") contains water and particles (hereafter, also referred to as "specified particles") including a polymer having an anionic group, a photo-acid generator, and a sensitizer, wherein the number of millimoles of the anionic group per 1 g of the specified particles is defined as an intra-particle anion value A, the number of millimoles of the photo-acid generator per 1 g of the specified particles is defined as an intra-particle photo-acid generator amount G, and a value obtained by subtracting the intra-particle photo-acid generator amount G from the intra-particle anion value A is −0.20 or more and 0.20 or less.

The sensitizer is at least one selected from the group consisting of a compound represented by the following Formula (S1), a compound represented by the following Formula (S2), and a compound represented by the following Formula (S3).

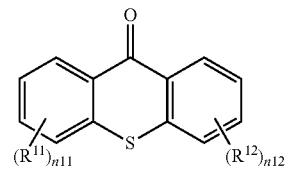

(S1)

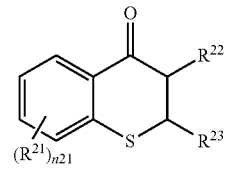

(S2)

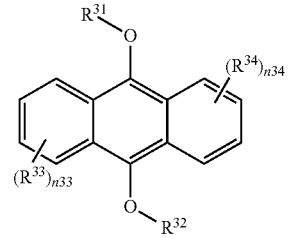

(S3)

In Formula (S1), Formula (S2), and Formula (S3), $R^{11}$, $R^{12}$, $R^{21}$, $R^{33}$, and $R^{34}$ each independently represent a halogen atom, an alkyl group, an aryl group, a hydroxy group, an amino group, an alkylsulfanyl group, an alkylamino group, an alkoxy group, an alkoxycarbonyl group, an acyloxy group, an acyl group, a carboxy group, or a sulfo group; n11, n12, n21, n33, and n34 each independently represent an integer of 0 to 4; when n11 is an integer of 2 to 4, a plurality of $R^{11}$ may be the same or different; when n12 is an integer of 2 to 4, a plurality of $R^{12}$ may be the same or different; when n21 is an integer of 2 to 4, a plurality of $R^{21}$ may be the same or different; when n33 is an integer of 2 to 4, a plurality of $R^{33}$ may be the same or different; and when n34 is an integer of 2 to 4, a plurality of $R^{34}$ may be the same or different.

In Formula (S2), $R^{22}$ and $R^{23}$ each independently represent a hydrogen atom, a halogen atom, an alkyl group, or a hydroxy group.

In Formula (S3), $R^{31}$ and $R^{32}$ each independently represent an alkyl group.

In general, an image formed from an ink containing water as a liquid component tends to have low definition, compared with an image formed from an ink containing, as a liquid component, a polymerizable monomer and/or an organic solvent. The reason for this is inferred as follows: in ink droplets formed of an ink containing water as a liquid component, the liquid component is less likely to be removed from the ink droplets, so that, for example, bleeding of ink droplets occurs on the substrate in some cases.

Thus, in some cases, there is a demand for improvement in the image definition of images formed from an aqueous ink jet ink composition including water as a liquid component.

As a method for improving the image definition, the following method may be employed: irradiating, with light, ink droplets applied onto a substrate (hereafter, also referred to as "ink film"), and heat-drying the ink film irradiated with light to obtain an image. In this method, the irradiation with light is performed before heat-drying of the ink film. The purpose of the irradiation with light is mainly thickening of the ink film on the substrate.

However, there are some cases where the irradiation with light cannot sufficiently thicken the ink film and, for example, bleeding of the ink droplets occurs, so that high-definition images cannot be obtained.

The thickening of the ink film is a phenomenon caused by destruction of the dispersion state of components dispersed in the ink film. Thus, when the thickening performance of the ink film on the substrate is improved, the ink to be applied onto the substrate has a poor dispersion state of components dispersed in the ink in some cases, which results in degradation of the stability of ejection through ink jet nozzles in some cases.

Regarding the above-described problems, an ink according to the present disclosure enables formation of images having high definition, and exhibits high ejection stability.

The reason why such advantages are provided is inferred as follows; however, an ink according to the present disclosure is not limited by the following reason.

An ink according to the present disclosure contains specified particles. The specified particles include a polymer having an anionic group. Thus, the specified particles have anionic groups.

In an ink according to the present disclosure, charge repulsion between the anionic groups in the specified particles provides an improvement in the dispersion stability of the specified particles in the ink. This inferentially results in an improvement in the ejection stability of the ink.

On the other hand, the photo-acid generator and the sensitizer contained in an ink according to the present disclosure inferentially have a function of, upon irradiation of the ink film with light, effectively thickening the ink film. Specifically, when the ink film is irradiated with light, this light inferentially causes electroexcitation of the sensitizer in the ink film, and electron transfer occurs from the electroexcited sensitizer to the photo-acid generator. This electron transfer causes decomposition of the photo-acid generator to generate acid. The generated acid inferentially turns an anionic group (such as a —COO⁻ group) in the specified particles into an acid group (such as a —COOH group) (weak-acid liberation reaction). As a result, in the ink film, the effect of charge repulsion between anionic groups is reduced, which inferentially results in aggregation of the specified particles (thus, the ink thickens).

In an ink according to the present disclosure, the number of millimoles of the anionic group per 1 g of the particles is defined as an intra-particle anion value A, the number of millimoles of the photo-acid generator per 1 g of the particles is defined as an intra-particle photo-acid generator amount G, and a value obtained by subtracting the intra-particle photo-acid generator amount G from the intra-particle anion value A (hereafter, also referred to as "difference [A−G]") is limited to −0.20 or more and 0.20 or less. This inferentially keeps the balance between the effect of improving the ejection stability of the ink due to the anionic group, and the effect of thickening the ink due to the photo-acid generator and the sensitizer. This inferentially results in, in an ink according to the present disclosure, effective achievement of both of the ejection stability of the ink and the definition of images to be formed.

An ink according to the present disclosure is an ink for irradiation with light, but is not limited to a photocurable ink including a photopolymerizable monomer and/or a photopolymerizable group.

In both of a case where an ink according to the present disclosure is a photocurable ink and a case where an ink according to the present disclosure is not a photocurable ink, the ink is thickened upon irradiation with light. This results in an improvement in the definition of the image.

An ink according to the present disclosure may have any of the following forms:
 a photocurable ink containing a photopolymerizable monomer and/or a photo polymerizable group;
 a thermosetting ink containing a thermal-polymerizable monomer and/or a thermal-polymerizable group; and
 an ink that does not have photocurability or thermosetting ability.

The photocurable ink and the thermosetting ink will be individually described later in detail.

Hereinafter, components that can be contained in an ink according to the present disclosure will be described.

Specified Particles

An ink according to the present disclosure contains at least one species of specified particles.

The specified particles include a polymer having an anionic group (hereafter, referred to as "specified polymer"), a photo-acid generator, and a sensitizer.

In the specified particles, the difference [A−G] (specifically, a value obtained by subtracting the intra-particle photo-acid generator amount G from the intra-particle anion value A) is −0.20 or more and 0.20 or less.

Anionic Group

The specified polymer has an anionic group.

In the present disclosure, the anionic group means a group that is generated by dissociation of an acid group and has a negative charge.

Examples of the acid group include a carboxy group, a sulfo group, a sulfuric acid group, a phosphonic acid group, and a phosphoric acid group.

Examples of the anionic group include a carboxylate group, a sulfonate group, a sulfinate group, a phosphonate group, and a phosphinate group.

The anionic group is, from the viewpoint of more effectively exerting advantages of an ink according to the present disclosure, preferably a carboxylate group (—COO⁻ group).

The carboxylate group (—COO⁻ group) is a group that is generated by dissociation of a carboxy group (—COOH group) and has a negative charge.

Difference [A−G]

In an ink according to the present disclosure, the difference [A−G] (specifically, a value obtained by subtracting the intra-particle photo-acid generator amount G from the intra-particle anion value A) is −0.20 or more and 0.20 or less.

When the difference [A−G] is −0.20 or more, the ink exhibits improved ejection stability.

When the difference [A−G] is 0.20 or less, the image to be formed has improved definition.

The difference [A−G] is, from the viewpoint of further improving the ejection stability of the ink, preferably −0.15 or more, more preferably −0.10 or more.

The difference [A−G] is, from the viewpoint of further improving the definition of the image to be formed, 0.15 or less, more preferably 0.10 or less.

Intra-Particle Anion Value A

The intra-particle anion value A is the number of millimoles of the anionic group per 1 g of the specified particles.

The intra-particle anion value A is not particularly limited as long as the difference [A–G] satisfies −0.20 or more and 0.20 or less, but is preferably 0.05 mmol/g to 0.30 mmol/g.

When the intra-particle anion value A is 0.05 mmol/g or more, the ink exhibits further improved ejection stability.

When the intra-particle anion value A is 0.30 mmol/g or less, the image to be formed has further improved definition.

Intra-Particle Photo-Acid Generator Amount G

The intra-particle photo-acid generator amount G is the number of millimoles of the photo-acid generator per 1 g of the specified particles.

The photo-acid generator in the ink functions together with a specified sensitizer, upon irradiation of the ink on the substrate with light, to thicken the ink on the substrate, to improve the definition of the image.

The intra-particle photo-acid generator amount G is not particularly limited as long as the difference [A–G] satisfies −0.20 or more and 0.20 or less, but is preferably 0.05 mmol/g to 0.30 mmol/g.

Preferred forms of the photo-acid generator will be described later.

Sensitizer

The specified particles include a sensitizer (hereafter, also referred to as "specified sensitizer").

The specified sensitizer is at least one selected from the group consisting of a compound represented by the following Formula (S1), a compound represented by the following Formula (S2), and a compound represented by the following Formula (S3).

The specified sensitizer has a function of, upon irradiation of the ink film with light, undergoing electroexcitation to donate electrons to the photo-acid generator.

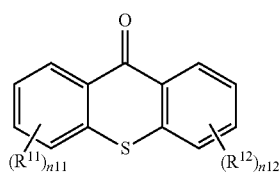
(S1)

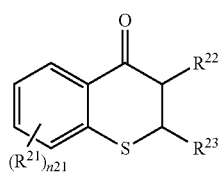
(S2)

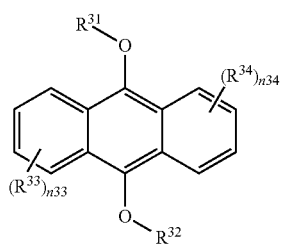
(S3)

In Formula (S1), Formula (S2), and Formula (S3), $R^{11}$, $R^{12}$, $R^{21}$, $R^{33}$, and $R^{34}$ each independently represent a halogen atom, an alkyl group, an aryl group, a hydroxy group, an amino group, an alkylsulfanyl group, an alkylamino group, an alkoxy group, an alkoxycarbonyl group, an acyloxy group, an acyl group, a carboxy group, or a sulfo group; and n11, n12, n21, n33, and n34 each independently represent an integer of 0 to 4. When n11 is an integer of 2 to 4, a plurality of $R^{11}$ may be the same or different; when n12 is an integer of 2 to 4, a plurality of $R^{12}$ may be the same or different; when n21 is an integer of 2 to 4, a plurality of $R^{21}$ may be the same or different; when n33 is an integer of 2 to 4, a plurality of $R^{33}$ may be the same or different; and when n34 is an integer of 2 to 4, a plurality of $R^{34}$ may be the same or different.

In Formula (S2), $R^{22}$ and $R^{23}$ each independently represent a hydrogen atom, a halogen atom, an alkyl group, or a hydroxy group.

In Formula (S3), $R^{31}$ and $R^{32}$ each independently represent an alkyl group.

In Formula (S1), $R^{11}$ represents a halogen atom, an alkyl group, an aryl group, a hydroxy group, an amino group, an alkylsulfanyl group, an alkylamino group, an alkoxy group, an alkoxycarbonyl group, an acyloxy group, an acyl group, a carboxy group, or a sulfo group.

In Formula (S1), the halogen atom represented by $R^{11}$ is preferably a fluorine atom, a chlorine atom, a bromine atom, or an iodine atom, more preferably a fluorine atom, a chlorine atom, or a bromine atom, still more preferably a fluorine atom or a chlorine atom.

In Formula (S1), the alkyl group represented by $R^{11}$ may be a linear alkyl group, may be a branched alkyl group, or may be a cyclic alkyl group.

In Formula (S1), the alkyl group represented by $R^{11}$ may have a substituent.

In Formula (S1), examples of the substituent that may be present in the alkyl group represented by $R^{11}$ include halogen atoms (preferably a fluorine atom, a chlorine atom, a bromine atom, or an iodine atom, more preferably a fluorine atom, a chlorine atom, or a bromine atom, still more preferably a fluorine atom or a chlorine atom), aryl groups, a hydroxy group, an amino group, alkylsulfanyl groups, alkylamino groups, alkoxy groups, alkoxycarbonyl groups, acyloxy groups, acyl groups, a carboxy group, and a sulfo group.

In Formula (S1), in the alkyl group represented by $R^{11}$, the number of carbon atoms is preferably 1 to 8, more preferably 1 to 4, still more preferably 1 to 3, particularly preferably 1 or 2.

The number of carbon atoms of the alkyl group represented by $R^{11}$ means the total number of carbon atoms (specifically, in the case of having a substituent, the total number of carbon atoms also including the number of carbon atoms of the substituent).

In Formula (S1), the aryl group represented by $R^{11}$ may have a substituent.

In Formula (S1), examples of the substituent that may be present in the aryl group represented by $R^{11}$ include halogen atoms (preferably a fluorine atom, a chlorine atom, a bromine atom, or an iodine atom, more preferably a fluorine atom, a chlorine atom, or a bromine atom, still more preferably a fluorine atom or a chlorine atom), alkyl groups, a hydroxy group, an amino group, alkylsulfanyl groups, alkylamino groups, alkoxy groups, alkoxycarbonyl groups, acyloxy groups, acyl groups, a carboxy group, and a sulfo group.

In Formula (S1), the number of carbon atoms of the aryl group represented by $R^{11}$ is preferably 6 to 10, more preferably 6 to 8.

The number of carbon atoms of the aryl group in $R^{11}$ means the total number of carbon atoms (specifically, in the case of having a substituent, the total number of carbon atoms also including the number of carbon atoms of the substituent).

In Formula (S1), the aryl group represented by $R^{11}$ is preferably a substituted or unsubstituted phenyl group.

In Formula (S1), the alkylsulfanyl group represented by $R^{11}$ may be a linear alkylsulfanyl group, may be a branched alkylsulfanyl group, or may be a cyclic alkylsulfanyl group.

In Formula (S1), the alkylsulfanyl group represented by $R^{11}$ may have a substituent.

In Formula (S1), examples of the substituent that may be present in the alkylsulfanyl group represented by $R^{11}$ include halogen atoms (preferably a fluorine atom, a chlorine atom, a bromine atom, or an iodine atom, more preferably a fluorine atom, a chlorine atom, or a bromine atom, still more preferably a fluorine atom or a chlorine atom), alkyl groups, aryl groups, a hydroxy group, an amino group, alkylamino groups, alkoxy groups, alkoxycarbonyl groups, acyloxy groups, acyl groups, a carboxy group, and a sulfo group.

In Formula (S1), the number of carbon atoms of the alkylsulfanyl group represented by $R^{11}$ is preferably 1 to 8, more preferably 1 to 4, still more preferably 1 to 3, particularly preferably 1 or 2.

The number of carbon atoms of the alkylsulfanyl group represented by $R^{11}$ means the total number of carbon atoms (specifically, in the case of having a substituent, the total number of carbon atoms also including the number of carbon atoms of the substituent).

In Formula (S1), the alkylamino group represented by $R^{11}$ may be a monoalkylamino group or may be a dialkylamino group.

In Formula (S1), the alkyl group included in the structure of the alkylamino group represented by $R^{11}$ may be a linear alkyl group, may be a branched alkyl group, or may be a cyclic alkyl group.

In Formula (S1), the alkylamino group represented by $R^{11}$ may have a substituent.

In Formula (S1), examples of the substituent that may be present in the alkylamino group represented by $R^{11}$ include halogen atoms (preferably a fluorine atom, a chlorine atom, a bromine atom, or an iodine atom, more preferably a fluorine atom, a chlorine atom, or a bromine atom, still more preferably a fluorine atom or a chlorine atom), alkyl groups, aryl groups, a hydroxy group, an amino group, alkylsulfanyl groups, alkoxy groups, alkoxycarbonyl groups, acyloxy groups, acyl groups, a carboxy group, and a sulfo group.

In Formula (S1), the number of carbon atoms of the alkylamino group represented by $R^{11}$ is preferably 1 to 16, more preferably 1 to 8, still more preferably 1 to 6, particularly preferably 1 to 4.

The number of carbon atoms of the alkylamino group represented by $R^{11}$ means the total number of carbon atoms (specifically, in the case of having a substituent, the total number of carbon atoms also including the number of carbon atoms of the substituent).

In Formula (S1), the alkoxy group represented by $R^{11}$ may be a linear alkoxy group, may be a branched alkoxy group, or may be a cyclic alkoxy group.

In Formula (S1), the alkoxy group represented by $R^{11}$ may have a substituent.

In Formula (S1), examples of the substituent that may be present in the alkoxy group represented by $R^{11}$ include halogen atoms (preferably a fluorine atom, a chlorine atom, a bromine atom, or an iodine atom, more preferably a fluorine atom, a chlorine atom, or a bromine atom, still more preferably a fluorine atom or a chlorine atom), aryl groups, a hydroxy group, an amino group, alkylsulfanyl groups, alkylamino groups, alkoxy groups, alkoxycarbonyl groups, acyloxy groups, acyl groups, a carboxy group, and a sulfo group.

In Formula (S1), the number of carbon atoms of the alkoxy group represented by $R^{11}$ is preferably 1 to 8, more preferably 1 to 4, still more preferably 1 to 3, particularly preferably 1 or 2.

The number of carbon atoms of the alkoxy group represented by $R^{11}$ means the total number of carbon atoms (specifically, in the case of having a substituent, the total number of carbon atoms also including the number of carbon atoms of the substituent).

In Formula (S1), the alkoxycarbonyl group represented by $R^{11}$ may be a linear alkoxycarbonyl group, may be a branched alkoxycarbonyl group, or may be a cyclic alkoxycarbonyl group.

In Formula (S1), the alkoxycarbonyl group represented by $R^{11}$ may have a substituent.

In Formula (S1), examples of the substituent that may be present in the alkoxycarbonyl group represented by $R^{11}$ include halogen atoms (preferably a fluorine atom, a chlorine atom, a bromine atom, or an iodine atom, more preferably a fluorine atom, a chlorine atom, or a bromine atom, still more preferably a fluorine atom or a chlorine atom), aryl groups, a hydroxy group, an amino group, alkylsulfanyl groups, alkylamino groups, alkoxy groups, alkoxycarbonyl groups, acyloxy groups, acyl groups, a carboxy group, and a sulfo group.

In Formula (S1), the number of carbon atoms of the alkoxycarbonyl group represented by $R^{11}$ is preferably 1 to 9, more preferably 1 to 5, still more preferably 1 to 4, particularly preferably 1 to 3.

The number of carbon atoms of the alkoxycarbonyl group in $R^{11}$ means the total number of carbon atoms (specifically, in the case of having a substituent, the total number of carbon atoms also including the number of carbon atoms of the substituent).

In Formula (S1), the acyloxy group represented by $R^{11}$ may have a substituent.

In Formula (S1), examples of the substituent that may be present in the acyloxy group represented by $R^{11}$ include halogen atoms (preferably a fluorine atom, a chlorine atom, a bromine atom, or an iodine atom, more preferably a fluorine atom, a chlorine atom, or a bromine atom, still more preferably a fluorine atom or a chlorine atom), aryl groups, a hydroxy group, an amino group, alkylsulfanyl groups, alkylamino groups, alkoxy groups, alkoxycarbonyl groups, acyloxy groups, acyl groups, a carboxy group, and a sulfo group.

In Formula (S1), the number of carbon atoms of the acyloxy group represented by $R^{11}$ is preferably 1 to 9, more preferably 1 to 5, still more preferably 1 to 4, particularly preferably 1 to 3.

The number of carbon atoms of the acyloxy group represented by $R^{11}$ means the total number of carbon atoms (specifically, in the case of having a substituent, the total number of carbon atoms also including the number of carbon atoms of the substituent).

In Formula (S1), the acyl group represented by $R^{11}$ may have a substituent.

Examples of the substituent that may be present in the acyl group represented by $R^{11}$ include halogen atoms (preferably a fluorine atom, a chlorine atom, a bromine atom, or an iodine atom, more preferably a fluorine atom, a chlorine atom, or a bromine atom, still more preferably a fluorine atom or a chlorine atom), aryl groups, a hydroxy group, an amino group, alkylsulfanyl groups, alkylamino groups, alkoxy groups, alkoxycarbonyl groups, acyloxy groups, acyl groups, a carboxy group, and a sulfo group.

In Formula (S1), the preferred number of carbon atoms of the acyl group represented by $R^{11}$ is the same as the above-described preferred number of carbon atoms of the acyloxy group represented by $R^{11}$.

In Formula (S1), $R^{11}$ is preferably a halogen atom, an alkyl group having 1 to 8 (more preferably 1 to 4) carbon atoms, or a hydroxy group.

In Formula (S1), n11 represents an integer of 0 to 4.

n11 is preferably an integer of 0 to 2, more preferably 0 or 1.

When n11 is an integer of 2 to 4, a plurality of $R^{11}$ may be the same or different.

In Formula (S1), $R^{12}$ and n12 respectively have the same definitions and the same preferred examples as in $R^{11}$ and n11 in Formula (S1).

In Formula (S2), $R^{21}$ and n21 respectively have the same definitions and the same preferred examples as in $R^{11}$ and n11 in Formula (S1).

In Formula (S2), $R^{22}$ and $R^{23}$ each independently represent a hydrogen atom, a halogen atom, an alkyl group, or a hydroxy group.

In Formula (S2), the halogen atom represented by $R^{22}$ has the same definition and the same preferred examples as in the halogen atom represented by $R^{11}$ in Formula (S1).

In Formula (S2), the alkyl group represented by $R^{22}$ has the same definition and the same preferred examples as in the alkyl group represented by $R^{11}$ in Formula (S1).

In Formula (S2), the halogen atom represented by $R^{23}$ has the same definition and the same preferred examples as in the halogen atom represented by $R^{11}$ in Formula (S1).

In Formula (S2), the alkyl group represented by $R^{23}$ has the same definition and the same preferred examples as in the alkyl group represented by $R^{11}$ in Formula (S1).

In Formula (S3), $R^{31}$ and $R^{32}$ each independently represent an alkyl group.

In Formula (S3), the alkyl group represented by $R^{31}$ has the same definition and the same preferred examples as in the alkyl group represented by $R^{11}$ in Formula (S1).

In Formula (S3), the alkyl group represented by $R^{32}$ has the same definition and the same preferred examples as in the alkyl group represented by $R^{11}$ in Formula (S1).

In Formula (S3), $R^{33}$ and n33 respectively have the same definitions and the same preferred examples as in $R^{11}$ and n11 in Formula (S1).

In Formula (S3), $R^{34}$ and n34 respectively have the same definitions and the same preferred examples as in $R^{11}$ and n11 in Formula (S1).

The specified sensitizer preferably includes the compound represented by Formula (S1). This results in a further improvement in the definition of the image.

The content of the compound represented by Formula (S1) in the specified sensitizer is preferably 50 mass %, more preferably 60 mass % or more, still more preferably 80 mass % or more.

The following are specific examples of the compound represented by Formula (S1), the compound represented by Formula (S2), and the compound represented by Formula (S3); however, the compound represented by Formula (S1), the compound represented by Formula (S2), and the compound represented by Formula (S3) are not limited to the following specific examples.

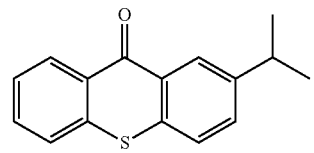

ITX

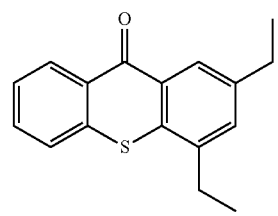

DETX

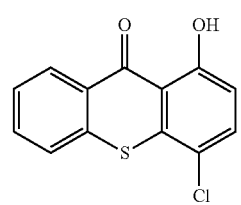

CTX

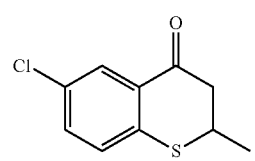

TC

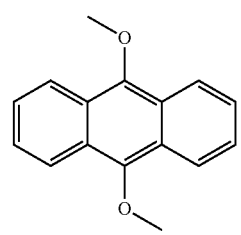

DMA

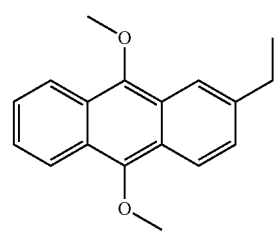

2Et-DEA

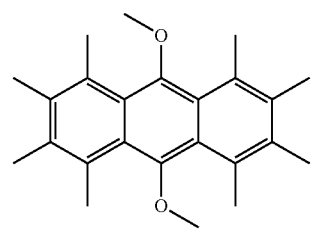

OMDMA

-continued

DEA
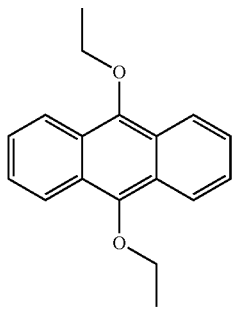

DBA
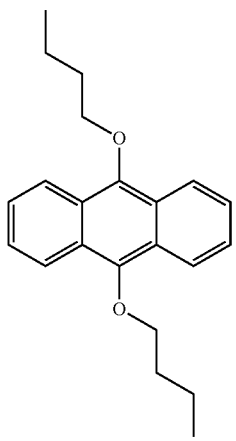

DKA
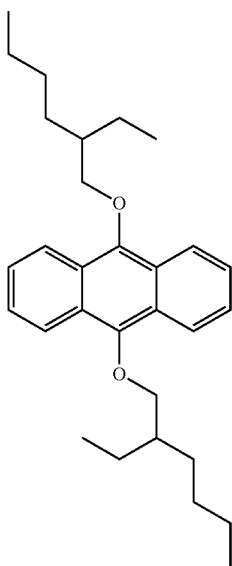

Specific examples of the compound represented by Formula (S1) further include, in addition to those described above, a polymeric thioxanthone-based sensitizer.

A commercially available product of the polymeric thioxanthone-based sensitizer is, for example, SPEEDCURE (registered trademark) 7010 (manufactured by Lambson Limited).

In the specified particles, the specified sensitizer content relative to the total solid-content amount of the specified particles is preferably 0.1 mass % to 20 mass %, more preferably 0.2 mass % to 15 mass %, still more preferably 0.3 mass % to 10 mass %, still more preferably 1 mass % to 5 mass %.

Photo-Acid Generator

The specified particles include at least one photo-acid generator.

The photo-acid generator included in the specified particles has a function of, upon irradiation of the ink film with light, receiving electrons from the sensitizer undergoing electroexcitation and decomposing to generate acid.

The photo-acid generator is not particularly limited as long as it has the above-described function.

The photo-acid generator may include, as the above-described function, a function of generating, in addition to acid, radical. Specifically, the photo-acid generator may include the function of serving as a radical polymerization initiator.

The photo-acid generator is preferably at least one selected from the group consisting of a compound represented by Formula (G1) and a compound represented by Formula (G2).

The compound represented by Formula (G1) is an iodonium salt having the following chemical structure. The compound represented by Formula (G2) is a sulfonium salt having the following chemical structure.

These compounds include, in addition to the function of serving as a photo-acid generator, the function of serving as a radical polymerization initiator.

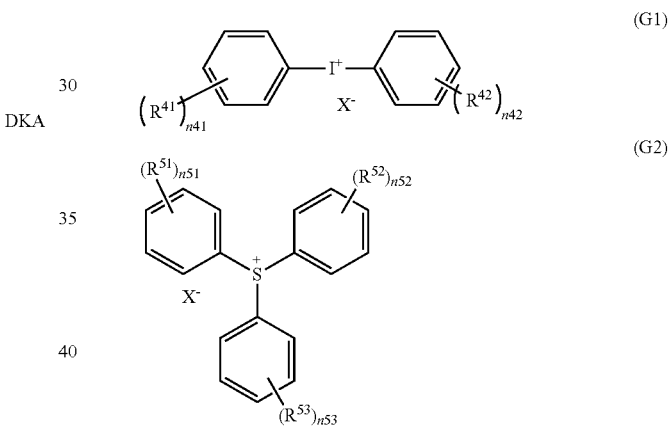

In Formula (G1) and Formula (G2), $R^{41}$, $R^{42}$, $R^{51}$, $R^{52}$, and $R^{53}$ each independently represent a halogen atom, an alkyl group, an aryl group, a hydroxy group, an alkoxy group, an aryloxy group, an alkylthio group, an arylthio group, or a trifluoromethyl group; and n41, n42, n51, n52, and n53 each independently represent an integer of 0 to 5. When n41 is an integer of 2 to 5, a plurality of $R^{41}$ may be the same or different. When n42 is an integer of 2 to 5, a plurality of $R^{42}$ may be the same or different. When n51 is an integer of 2 to 5, a plurality of $R^{51}$ may be the same or different. When n52 is an integer of 2 to 5, a plurality of $R^{52}$ may be the same or different. When n53 is an integer of 2 to 5, a plurality of $R^{53}$ may be the same or different.

$X^-$ in Formula (G1) and $X^-$ in Formula (G2) each independently represent a chloride ion, a bromide ion, an iodide ion, a para-toluenesulfonate ion, a tetrafluoroborate ion, a trifluoromethanesulfonate ion, a bis(trifluoromethylsulfonyl)imide ion, a hexafluorophosphate ion, a hexafluoroantimonate ion, a perchlorate ion, or a hexafluoroarsenate ion.

In Formula (G1), the halogen atom represented by $R^{41}$ has the same definition and the same preferred examples as in the halogen atom represented by $R^{11}$ in Formula (S1).

In Formula (G1), the alkyl group represented by $R^{41}$ has the same definition and the same preferred examples as in the alkyl group represented by $R^{11}$ in Formula (S1).

In Formula (G1), the aryl group represented by $R^{41}$ has the same definition and the same preferred examples as in the aryl group represented by $R^{11}$ in Formula (S1).

In Formula (G1), the alkoxy group represented by $R^{41}$ has the same definition and the same preferred examples as in the alkoxy group represented by $R^{11}$ in Formula (S1).

In Formula (G1), the aryl group in the structure of the aryloxy group represented by $R^{41}$ has the same definition and the same preferred examples as in the aryl group represented by $R^{11}$ in Formula (S1).

In Formula (G1), the alkyl group in the structure of the alkylthio group represented by $R^{41}$ has the same definition and the same preferred examples as in the alkyl group represented by $R^{11}$ in Formula (S1).

In Formula (G1), the aryl group in the structure of the arylthio group represented by $R^{41}$ has the same definition and the same preferred examples as in the aryl group represented by $R^{11}$ in Formula (S1).

In Formula (G1), $R^{41}$ is:
preferably a halogen atom, an alkyl group, an alkoxy group, an aryloxy group, an alkylthio group, an arylthio group, or a trifluoromethyl group,
more preferably a halogen atom, an alkyl group, an alkoxy group, an arylthio group, or a trifluoromethyl group.

In Formula (G1), n41 represents an integer of 0 to 5.
n41 is preferably an integer of 0 to 2, more preferably 0 or 1.
When n41 is an integer of 2 to 5, a plurality of $R^{41}$ may be the same or different.

In Formula (G1), $R^{42}$ and n42 respectively have the same definitions and the same preferred examples as in $R^{41}$ and n41.

In Formula (G1), $X^-$ represents a chloride ion ($Cl^-$), a bromide ion ($Br^-$), an iodide ion ($I^-$), a para-toluenesulfonate ion ($CH_3C_6H_4SO_3^-$), a tetrafluoroborate ion ($BF_4^-$), a trifluoromethanesulfonate ion ($CF_3SO_3^-$), a bis(trifluoromethylsulfonyl)imide ion ($(CF_3SO_2)_2N^-$), a hexafluorophosphate ion ($PF_6^-$), a hexafluoroantimonate ion ($SbF_6^-$), a perchlorate ion ($ClO_4^-$), or a hexafluoroarsenate ion ($AsF_6^-$).

In Formula (G1), $X^-$ is:
preferably a para-toluenesulfonate ion, a tetrafluoroborate ion, a trifluoromethanesulfonate ion, or a hexafluorophosphate ion,
more preferably a tetrafluoroborate ion, a trifluoromethanesulfonate ion, or a hexafluorophosphate ion,
still more preferably a trifluoromethanesulfonate ion or a hexafluorophosphate ion.

In Formula (G2), $R^{51}$ and n51 respectively have the same definitions and the same preferred examples as in $R^{41}$ and n41 in Formula (G1).

In Formula (G2), $R^{52}$ and n52 respectively have the same definitions and the same preferred examples as in $R^{41}$ and n41 in Formula (G1).

In Formula (G2), $R^{53}$ and n53 respectively have the same definitions and the same preferred examples as in $R^{41}$ and n41 in Formula (G1).

In Formula (G2), $X^-$ has the same definition and the same preferred examples as in $X^-$ in Formula (G1).

The photo-acid generator preferably includes the compound represented by Formula (G2). This results in a further improvement in the definition of the image.

In this case, the content of the compound represented by Formula (G2) in the photo-acid generator included in the specified particles is preferably 50 mass % or more, more preferably 60 mass % or more, still more preferably 80 mass % or more.

The following are specific examples of the photo-acid generator; however, the photo-acid generator is not limited to the following specific examples.

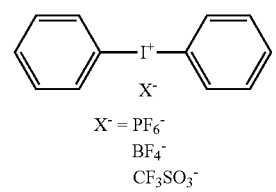

PAG-1

$X^- = PF_6^-$
$BF_4^-$
$CF_3SO_3^-$

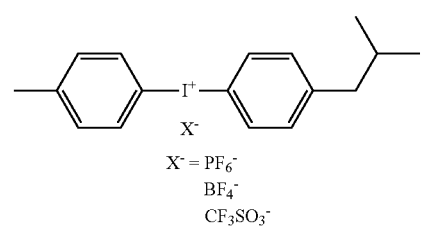

PAG-2

$X^- = PF_6^-$
$BF_4^-$
$CF_3SO_3^-$

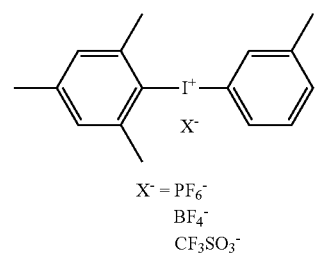

PAG-3

$X^- = PF_6^-$
$BF_4^-$
$CF_3SO_3^-$

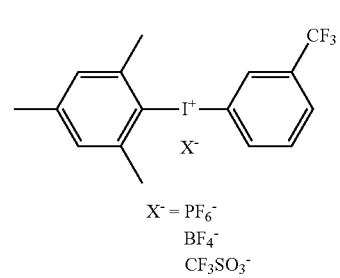

PAG-4

$X^- = PF_6^-$
$BF_4^-$
$CF_3SO_3^-$

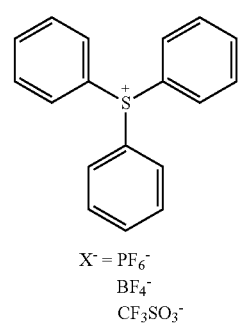

PAG-5

$X^- = PF_6^-$
$BF_4^-$
$CF_3SO_3^-$

-continued

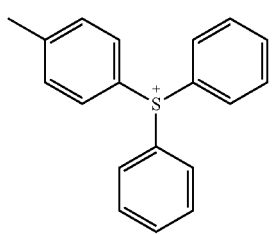

X⁻ = PF$_6^-$
BF$_4^-$
CF$_3$SO$_3^-$

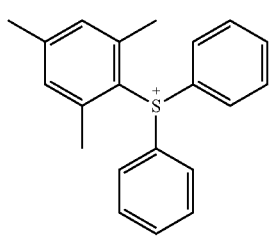

X⁻ = PF$_6^-$
BF$_4^-$
CF$_3$SO$_3^-$

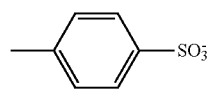

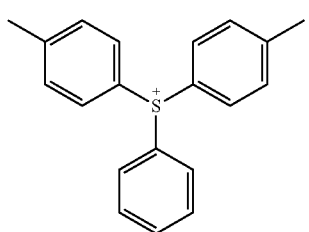

X⁻ = PF$_6^-$
BF$_4^-$
CF$_3$SO$_3^-$

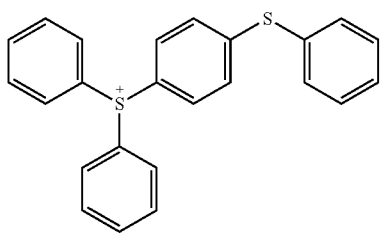

X⁻ = PF$_6^-$
BF$_4^-$
CF$_3$SO$_3^-$

PAG-6

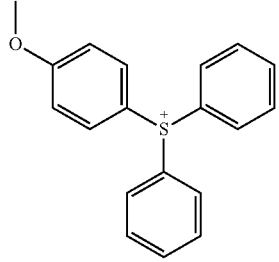

X⁻ = PF$_6^-$
BF$_4^-$
CF$_3$SO$_3^-$

PAG-7

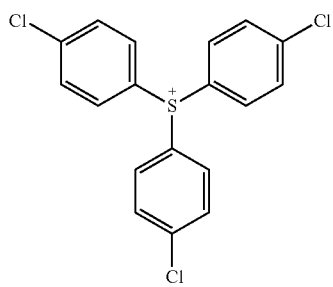

X⁻ = PF$_6^-$
BF$_4^-$
CF$_3$SO$_3^-$

PAG-8

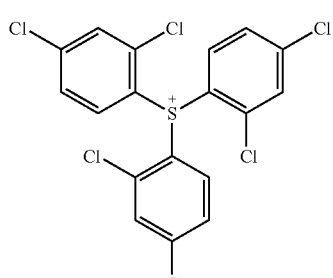

X⁻ = PF$_6^-$
BF$_4^-$
CF$_3$SO$_3^-$

PAG-9

PAG-10

PAG-11

PAG-12

PAG-13

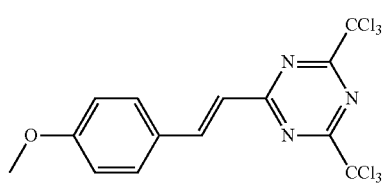

In the specified particles, the photo-acid generator content relative to the total solid-content amount of the specified particles is preferably 0.1 mass % to 20 mass %, more preferably 0.2 mass % to 15 mass %, still more preferably 1 mass % to 10 mass %.

Sensitizing Auxiliary

The specified particles preferably further include at least one sensitizing auxiliary that is a compound represented by the following Formula (SA).

This results in a further improvement in the definition of the image.

This is achieved inferentially because the decomposition efficiency of the photo-acid generator is further improved.

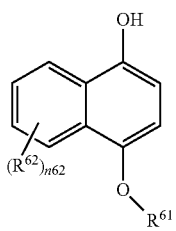

(SA)

In Formula (SA), $R^{61}$ represents a hydrocarbon group having 1 to 20 carbon atoms; $R^{62}$ represents a halogen atom, an alkyl group, an aryl group, a hydroxy group, an alkoxy group, or a trifluoromethyl group; and n62 represents an integer of 0 to 4. When n62 is an integer of 2 to 4, a plurality of $R^{62}$ may be the same or different.

In Formula (SA), the hydrocarbon group represented by $R^{61}$ is preferably an alkyl group, an alkenyl group, an alkynyl group, or an aryl group, more preferably an alkyl group or an aryl group, particularly preferably an alkyl group.

In the hydrocarbon group having 1 to 20 carbon atoms represented by $R^{61}$, the number of carbon atoms is preferably 1 to 12, more preferably 1 to 6.

In Formula (SA), preferred examples of the halogen atom represented by $R^{62}$ are the same as the preferred examples of the halogen atom represented by $R^{11}$ in Formula (S1).

In Formula (SA), preferred examples of the alkyl group represented by $R^{62}$ are the same as the preferred examples of the alkyl group represented by $R^{11}$ in Formula (S1).

In Formula (SA), preferred examples of the aryl group represented by $R^{62}$ are the same as the preferred examples of the aryl group represented by $R^{11}$ in Formula (S1).

In Formula (SA), preferred examples of the alkoxy group represented by $R^{62}$ are the same as the preferred examples of the alkoxy group represented by $R^{11}$ in Formula (S1).

In Formula (SA), n62 represents an integer of 0 to 4. n62 is preferably an integer of 0 to 2, more preferably 0 or 1.

When n62 is an integer of 2 to 4, a plurality of $R^{62}$ may be the same or different.

The following are specific examples of the compound represented by Formula (SA); however, the compound represented by Formula (SA) is not limited to the following specific examples.

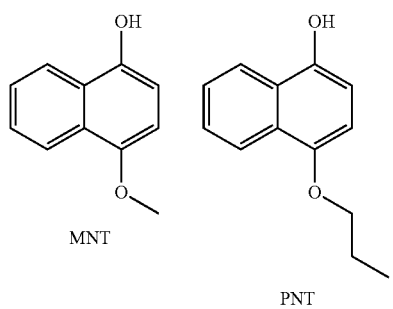

MNT

PNT

When the specified particles contain the sensitizing auxiliary, the sensitizing auxiliary content relative to the total solid-content amount of the specified particles is preferably 0.1 mass % to 20 mass %, more preferably 0.2 mass % to 10 mass %, still more preferably 0.3 mass % to 5 mass %, still more preferably 0.3 mass % to 3 mass %.

Specified Polymer

The specified particles include at least one specified polymer (specifically, a polymer having an anionic group).

A preferred example of the anionic group is the same as that described above.

The anionic group in the specified polymer may be a single species alone, or may be two or more species.

A preferred range of the number of millimoles of the anionic group per 1 g of the specified particles (namely, the intra-particle anion value A) is the same as that described above.

The intra-particle anion value A can be determined by a publicly known method such as neutralization titration or structural analysis.

Hereinafter, as an example of such measurement methods, a method of measuring the intra-particle anion value A by potentiometric titration serving as one of neutralization titration will be described.

The measurement device is not particularly limited, and is preferably, for example, an automatic potentiometric titrator (model: AT-510) available from Kyoto Electronics Manufacturing Co., Ltd. Hereinafter, a case where the anionic group is a carboxylate group (—$COO^-$ group) will be described as an example.

First, from an ink serving as the measurement target for the intra-particle anion value A, the components other than the specified particles and water are removed, to prepare an aqueous dispersion of the specified particles.

The prepared aqueous dispersion (50 g) is centrifuged under conditions at 80000 rpm (revolutions per minute; hereafter, the same definition) for 40 minutes. The supernatant provided by the centrifugation is removed, to collect the precipitate (specified particles).

Into a vessel, about 0.5 g of the collected specified particles were weighed, and the weighed value Wa (g) is recorded. Subsequently, 60 mL of acetic acid is added, to dilute the weighed specified particles, to thereby obtain a measurement sample for the intra-particle anion value A.

The obtained measurement sample is titrated using, as a titrant, a 0.1 N (=0.1 mol/L) solution of perchloric acid in acetic acid, and the amount of titrant consumed until the equivalence point is recorded as Fa (mL). In the titration, when a plurality of equivalence points are found, of a plurality of amounts of titrant consumed until the plurality of equivalence points, the maximum value is defined as Fa. The product of Fa (mL) and the normality (0.1 mol/L) of the solution of perchloric acid in acetic acid corresponds to the amount of the anionic group (specifically a —$COO^-$ group) included in the specified particles.

From Fa (mL), the normality (0.1 mol/L) of the solution of perchloric acid in acetic acid, and the weighed value Wa (g), the following formula is used to determine the intra-particle anion value A (mmol/g).

$$\begin{aligned}\text{Intra-particle anion value } A \text{ (mmol/g)} = \\ \text{Amount (mmol/g) of } -COO^- \text{ group included per 1 g of} \\ \text{specified particles} = Fa \text{ (mL)} \times \text{Normality (0.1 mol/L)} \\ \text{of solution of perchloric acid in acetic acid}/Wa \text{ (g)}\end{aligned}$$

When the number of millimoles of the anionic group per 1 g of the specified polymer is defined as the anion value of the specified polymer, the anion value of the specified polymer is appropriately set such that the difference [A−G] satisfies the above-described range.

The specified polymer has an anion value of, for example, 0.10 mmol/g to 1.00 mmol/g, preferably 0.20 mmol/g to 0.60 mmol/g.

The specified polymer may have an acid group.

Examples of the acid group include a carboxy group, a sulfo group, a sulfuric acid group, a phosphonic acid group, and a phosphoric acid group.

Such a specified polymer that has an acid group (specifically, a polymer having an acid group and an anionic group) is formed by, for example, neutralization of a polymer having an acid group serving as a raw material of the specified polymer (hereafter, also referred to as "raw-material polymer"). The neutralization of the raw-material polymer results in neutralization of some of the acid groups (such as —COOH groups) of the raw-material polymer, to form a specified polymer that has an anionic group (such as a —COO⁻ group) as a neutralized acid group, and an unneutralized acid group (such as a —COOH group) (refer to EXAMPLES described later).

The raw-material polymer is neutralized by, for example, using a neutralizer.

Examples of the neutralizer include alkali metal hydroxides (such as sodium hydroxide and potassium hydroxide) and organic amines (such as triethylamine).

The neutralization of the raw-material polymer (specifically, formation of the specified polymer having an anionic group) may be performed in the forming process of the specified particles (refer to EXAMPLES described later), or may be performed before formation of the specified particles.

In the raw-material polymer (specifically, the polymer having an acid group and serving as the raw material of the specified polymer), when the number of millimoles of the acid group per 1 g of the raw-material polymer is defined as "the acid value of the raw-material polymer", the acid value of the raw-material polymer is, for example, 0.10 mmol/g to 2.00 mmol/g, preferably 0.20 mmol/g to 1.00 mmol/g.

In the specified polymer, when the percentage (%) of the number of moles of the anionic group relative to the total number of moles of the anionic group and the acid group is defined as "the neutralization degree of the specified polymer", the neutralization degree of the specified polymer is preferably 20% to 100%, more preferably 30% to 95%, still more preferably 30% to 90%, still more preferably 30% to 80%.

In the specified particles, when the percentage (%) of the number of moles of the anionic group relative to the total number of moles of the anionic group and the acid group is defined as "the neutralization degree of the specified particles", the neutralization degree of the specified particles is preferably 20% to 100%, more preferably 30% to 95%, still more preferably 30% to 90%, still more preferably 30% to 80%.

When the neutralization of the raw-material polymer (specifically, formation of the specified polymer having an anionic group) is performed in the forming process of the specified particles (for example, refer to EXAMPLES described later), the neutralization degree of the specified particles can be regarded as matching the neutralization degree of the specified polymer.

The neutralization degree of the specified particles can be determined by a publicly known method such as neutralization titration or structural analysis.

An example of the measurement method for the neutralization degree of the specified particles is the measurement method by neutralization titration (specifically, the potentiometric titration method), which has been described as an example of the measurement method for the intra-particle anion value A. Hereinafter, as an example, a case where the anionic group is a carboxylate group (—COO⁻ group), and the acid group is a carboxy group (—COOH) will be described.

First, from an ink serving as a measurement target for the neutralization degree of the specified particles, the components other than the specified particles and water are removed, to prepare the aqueous dispersion of the specified particles.

The prepared aqueous dispersion (50 g) is centrifuged under conditions at 80000 rpm for 40 minutes. The supernatant provided by the centrifugation is removed, to collect the precipitate (specified particles).

Into Vessel 1, about 0.5 g of the collected specified particles are weighed, and the weighed value W1 (g) is recorded. Subsequently, a mixture of 54 mL of tetrahydrofuran (THF) and 6 mL of distilled water is added, to dilute the weighed specified particles, to obtain Neutralization-degree measurement sample 1.

The obtained Neutralization-degree measurement sample 1 is titrated using, as the titrant, a 0.1 N (=0.1 mol/L) aqueous sodium hydroxide solution, and the amount of titrant consumed until the equivalence point is recorded as F1 (mL). In the titration, when a plurality of equivalence points are found, of a plurality of amounts of titrant consumed until the plurality of equivalence points, the maximum value is defined as F1 (mL). The product of F1 (mL) and the normality (0.1 mol/L) of the aqueous sodium hydroxide solution corresponds to the amount of the acid group (specifically, a —COOH group) included in the specified particles.

To Vessel 2, about 0.5 g of the collected specified particles are weighed, and the weighed value W2 (g) is recorded. Subsequently, 60 mL of acetic acid is added, to dilute the weighed specified particles to thereby obtain Neutralization-degree measurement sample 2.

The obtained Neutralization-degree measurement sample 2 is titrated using, as the titrant, a 0.1 N (=0.1 mol/L) solution of perchloric acid in acetic acid, and the amount of titrant consumed until the equivalence point is recorded as F2 (mL). In the titration, when a plurality of equivalence points are found, of a plurality of amounts of titrant consumed until the plurality of equivalence points, the maximum value is defined as F2 (mL). The product of F2 (mL) and the normality (0.1 mol/L) of the solution of perchloric acid in acetic acid corresponds to the amount of the anionic group (specifically, a —COO⁻ group) included in the specified particles.

From the measured values of "F1 (mL)" and "F2 (mL)", the following formulas are used to determine the neutralization degree (%) of the specified particles.

$F1$ (mL)×Normality (0.1 mol/L) of aqueous sodium hydroxide solution/$W1$ (g)+$F2$ (mL)×Normality (0.1 mol/L) of solution of perchloric acid in acetic acid/$W2$ (g)=Total amount (mmol/g) of —COOH group and —COO⁻ group included per 1 g of specified particles     (1)

$F2$ (mL)×Normality (0.1 mol/L) of solution of perchloric acid in acetic acid/$W2$ (g)=Amount (mmol/g) of —COO⁻ group included per 1 g of specified particles Neutralization degree (%) of specified particles=(2)/
(1)×100    (2)

Incidentally, the amount (mmol/g) of a —COO⁻ group included per 1 g of the specified particles and determined by (2) above is the intra-particle anion value A described above.

Structure of Specified Polymer

The specified polymer is not particularly limited as long as it has an anionic group, and the polymer may have any structure.

The specified polymer is preferably a urethane polymer, a urea polymer, or a (meth)acrylic polymer.

These polymers each have a strong structure.

Thus, when the specified polymer is a urethane polymer, a urea polymer, or a (meth)acrylic polymer, further improvements in the hardness and scratch resistance of the image are achieved.

In this Specification, the urethane polymer means a polymer including a urethane group (except for polymers belonging to a (meth)acrylic polymer).

In this Specification, the urea polymer means a polymer including a urea group (except for polymers belonging to the above-described urethane polymer or a (meth)acrylic polymer).

In this Specification, the (meth)acrylic polymer means a homopolymer of a single (meth)acrylate, a copolymer of two or more (meth)acrylates, or a copolymer of one or more (meth)acrylates and one or more other monomers.

The concept of the urethane polymer also encompasses a polymer including both of a urethane group and a urea group (what is called, the urethane-urea polymer).

The concept of the (meth)acrylic polymer also encompasses a (meth)acrylic polymer including at least one of a urethane group or a urea group.

The specified polymer is, from the viewpoint of further improving the hardness and scratch resistance of the image, preferably a urethane polymer or a urea polymer.

The specified polymer may be a chain polymer not having a crosslinked structure, or may be a crosslinked polymer having a crosslinked structure (such as a three-dimensional crosslinked structure).

When the specified polymer is a crosslinked polymer having a three-dimensional crosslinked structure, the specified particles become stronger to thereby achieve further improvements in the hardness and scratch resistance of the image.

Regarding the three-dimensional crosslinked structure that may be present in the crosslinked polymer, reference may be made to the three-dimensional crosslinked structure described in WO2016/052053A.

The chain polymer preferably includes, in the main chain, a ring structure such as an aliphatic ring, an aromatic ring, or a hetero ring. In this case, specified particles including the specified polymer that is the chain polymer become stronger to thereby achieve further improvements in the hardness and scratch resistance of the image.

Chain Polymer

The chain polymer is preferably:
  a reaction product of at least one selected from the group consisting of bifunctional isocyanate compounds and at least one selected from the group consisting of compounds having two active hydrogen groups and water, or
  a reaction product of at least one selected from the group consisting of bifunctional isocyanate compounds, at least one selected from the group consisting of compounds having two active hydrogen groups and water, and another compound.

Examples of such a compound having two active hydrogen groups include diol compounds, diamine compounds, and dithiol compounds.

For example, a reaction of a bifunctional isocyanate compound and a diol compound forms urethane groups.

A reaction of a bifunctional isocyanate compound and a diamine compound forms urea groups.

A reaction of a bifunctional isocyanate compound and water forms urea groups.

Examples of the other compound include:
  among polymerizable-group-introducing compounds described later, compounds including a single active hydrogen group alone;
  among polymerizable-group-introduced isocyanate compounds described later, compounds including a single isocyanate group alone;
  among hydrophilic-group-introducing compounds described later, compounds including a single active hydrogen group alone; and
  among hydrophilic-group-introduced isocyanate compounds described later, compounds including a single isocyanate group alone.

Examples of the bifunctional isocyanate compounds for forming the chain polymer include the following Compounds (1-1) to (1-20).

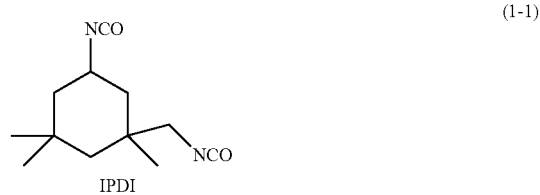
IPDI    (1-1)

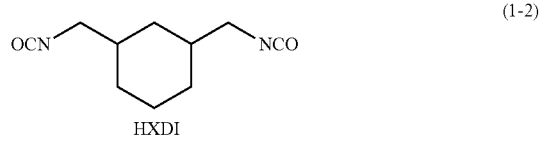
HXDI    (1-2)

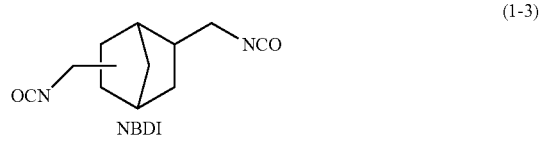
NBDI    (1-3)

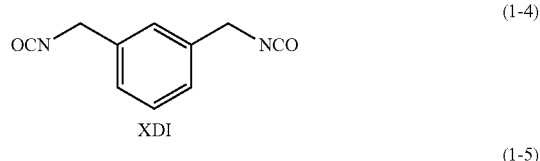
XDI    (1-4)

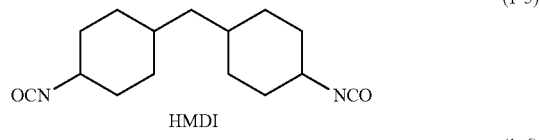
HMDI    (1-5)

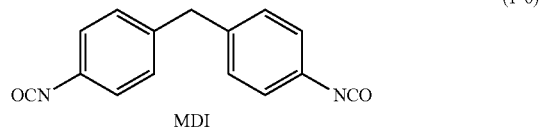
MDI    (1-6)

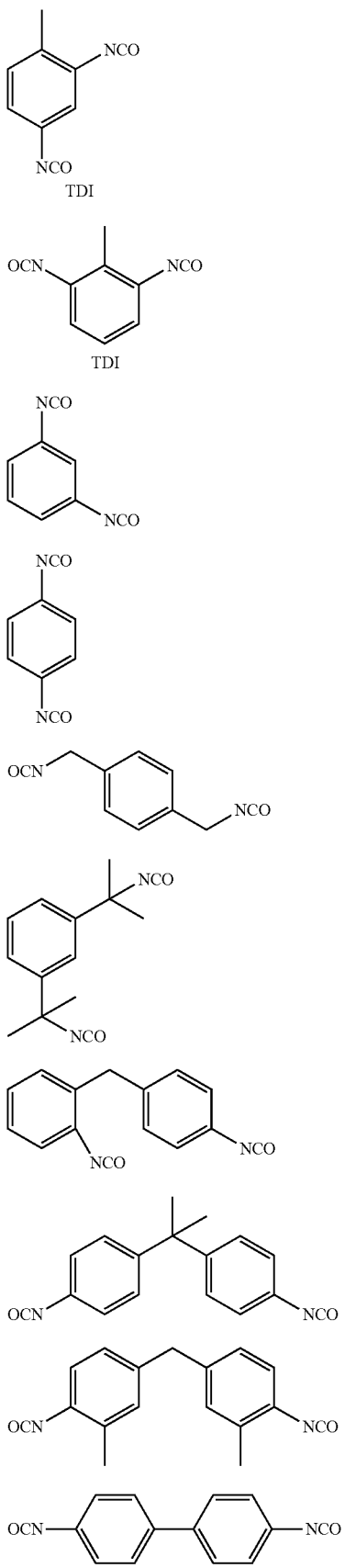
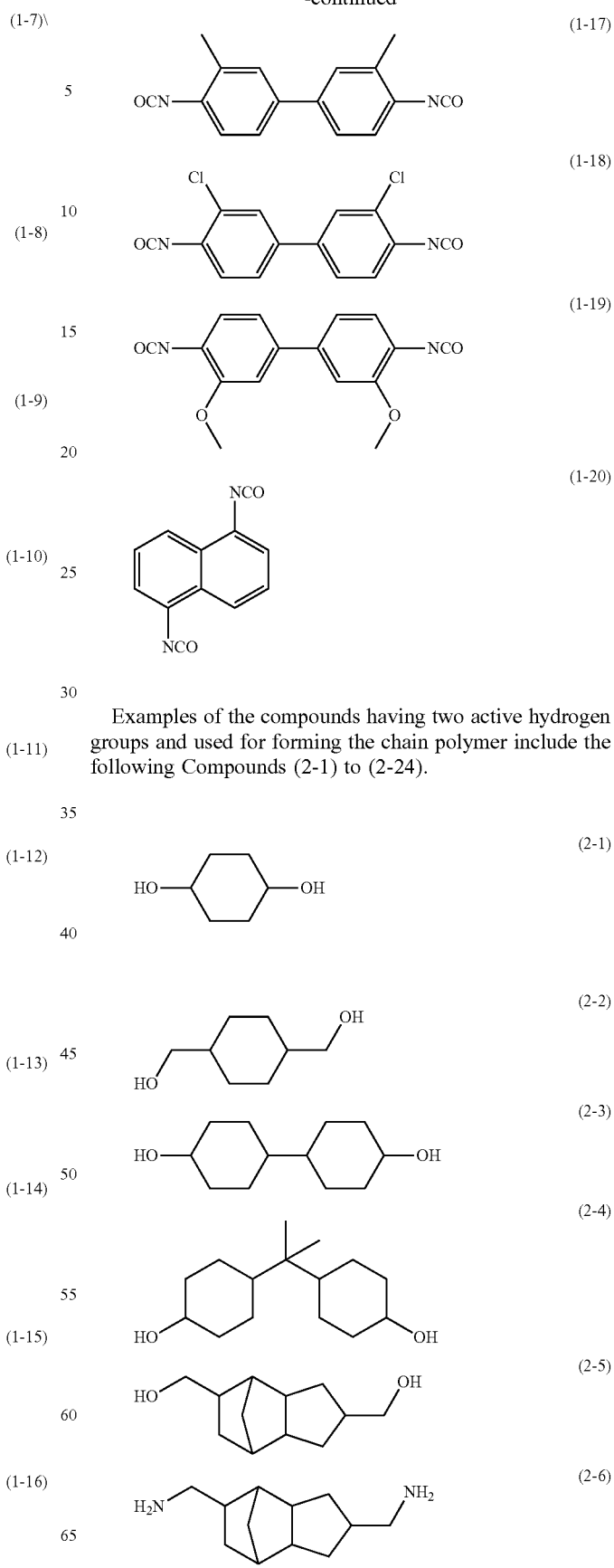
Examples of the compounds having two active hydrogen groups and used for forming the chain polymer include the following Compounds (2-1) to (2-24).

(2-7) 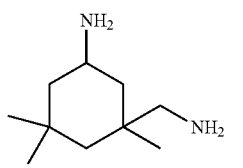
(2-8) 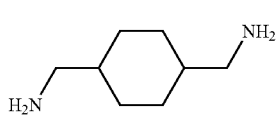
(2-9) 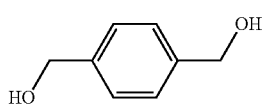
(2-10) 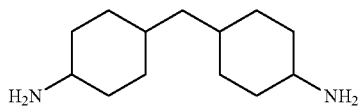
(2-11) 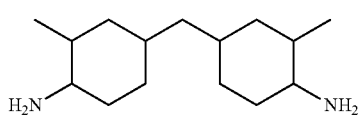
(2-12) 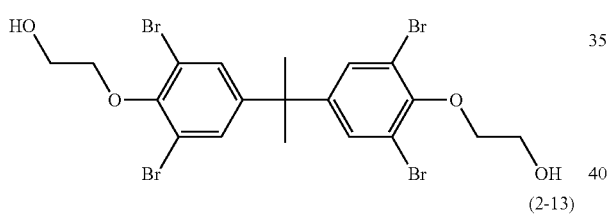
(2-13) 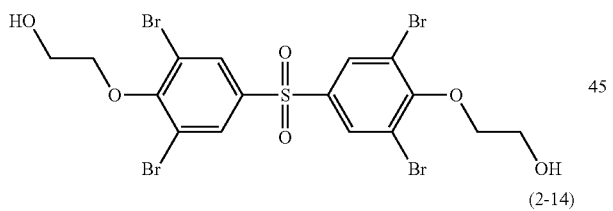
(2-14) 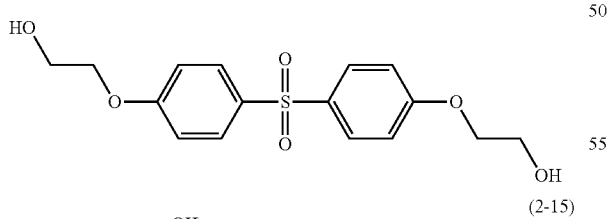
(2-15) 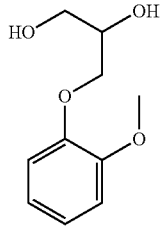
(2-16) 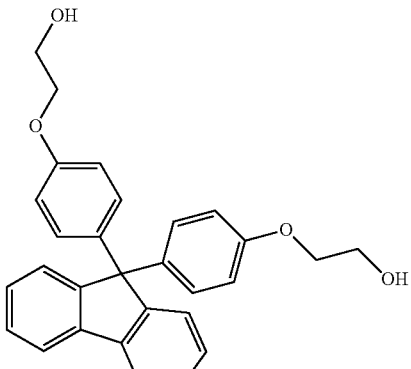
(2-17) 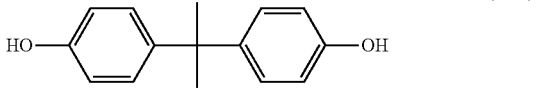
(2-18) 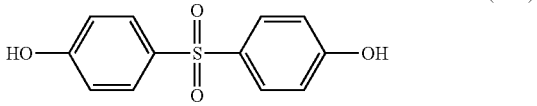
(2-19) 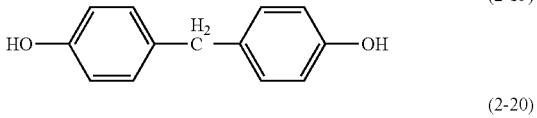
(2-20) 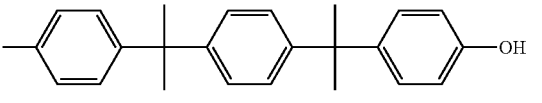
(2-21) 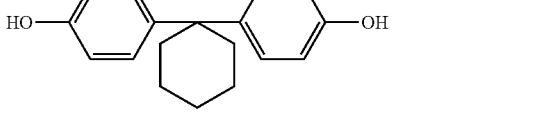
(2-22) 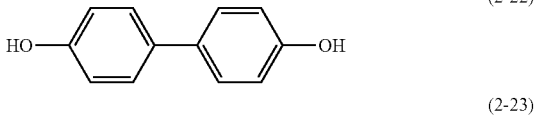
(2-23) 
(2-24) 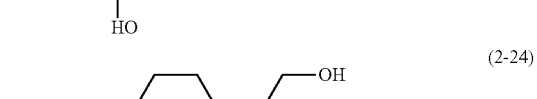
Other examples of the compounds having two active hydrogen groups and used for forming the chain polymer include, among polymerizable-group-introducing compounds described later, compounds including two active hydrogen groups, and, among hydrophilic-group-introducing compounds described later, compounds including two active hydrogen groups.

Crosslinked Polymer

The crosslinked polymer preferably includes the structure of a reaction product of at least one selected from the group consisting of tri- or higher functional isocyanate compounds and at least one selected from the group consisting of compounds having two or more active hydrogen groups and water.

In this case, the crosslinked polymer may further include the structure of a reaction product of at least one selected from the group consisting of tri- or higher functional isocyanate compounds, at least one selected from the group consisting of compounds having two or more active hydrogen groups and water, and another compound.

Examples of the other compound include:
- among polymerizable-group-introducing compounds described later, compounds including a single active hydrogen group alone;
- among polymerizable-group-introduced isocyanate compounds described later, compounds including a single isocyanate group alone;
- among hydrophilic-group-introducing compounds described later, compounds including a single active hydrogen group alone; and
- among hydrophilic-group-introduced isocyanate compounds described later, compounds including a single isocyanate group alone.

When the specified particles include the crosslinked polymer, the specified particles preferably include microcapsules (hereafter, "MC") including a shell formed of the crosslinked polymer and a core.

Examples of the compound used for forming the crosslinked polymer and having two or more active hydrogen groups include, as in the above-described compound having two active hydrogen groups and used for forming the chain polymer, diol compounds, diamine compounds, and dithiol compounds.

Other examples of the compound used for forming the crosslinked polymer and having two or more active hydrogen groups include tri- or higher functional polyol compounds, tri- or higher functional polyamine compounds, and tri- or higher functional polythiol compounds.

Such a tri- or higher functional isocyanate compound for forming the crosslinked polymer is preferably a reaction product of at least one selected from the group consisting of bifunctional isocyanate compounds, and at least one selected from the group consisting of compounds having three or more active hydrogen groups (such as tri- or higher functional polyol compounds, tri- or higher functional polyamine compounds, and tri- or higher functional polythiol compounds).

The number of moles (the number of molecules) of such a bifunctional isocyanate compound that is to react with such a compound having three or more active hydrogen groups is preferably 0.6 or more times, more preferably 0.6 times to 5 times, still more preferably 0.6 times to 3 times, still more preferably 0.8 times to 2 times, the number of moles of the active hydrogen groups (the number of equivalents of the active hydrogen groups) of the compound having three or more active hydrogen groups.

Examples of the bifunctional isocyanate compound for forming the tri- or higher functional isocyanate compound include the same as those described above for the bifunctional isocyanate compound for forming the chain polymer.

Examples of the compound having three or more active hydrogen groups for forming the tri- or higher functional isocyanate compound include compounds having structures represented by the following (H-1) to (H-13). In the following structures, n represents an integer selected from the group consisting of 1 to 100.

(H-1)

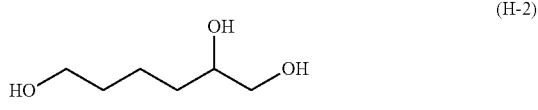

(H-2)

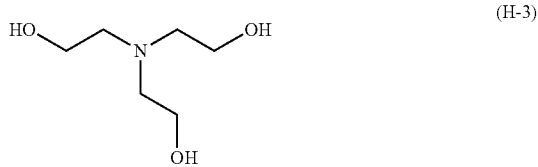

(H-3)

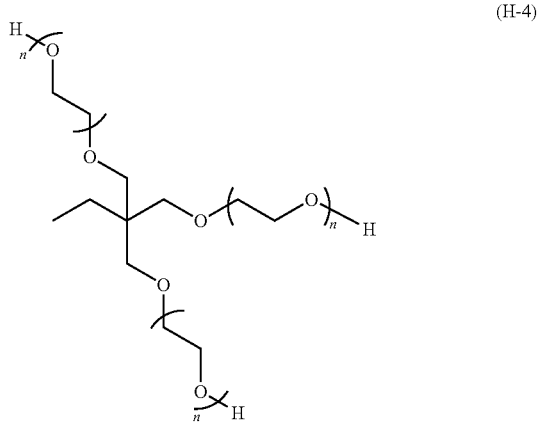

(H-4)

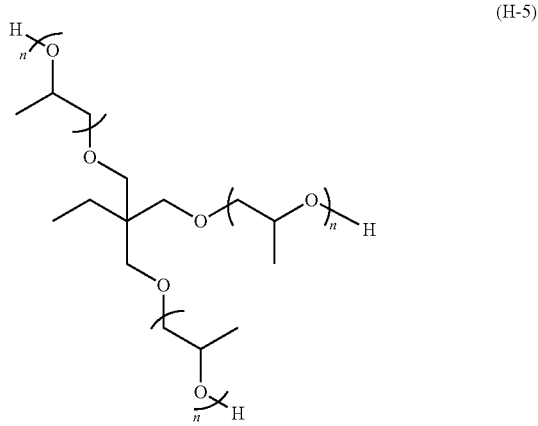

(H-5)

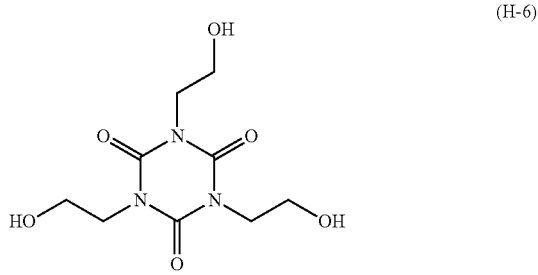

(H-6)

(H-7) 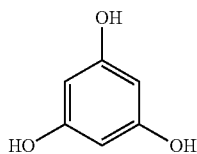

(H-8) 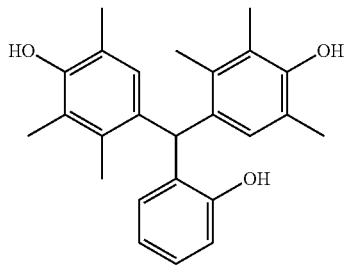

(H-9) 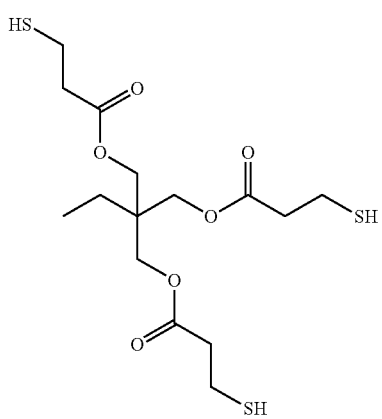

(H-10) 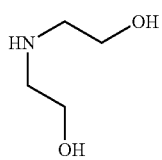

(H-11) 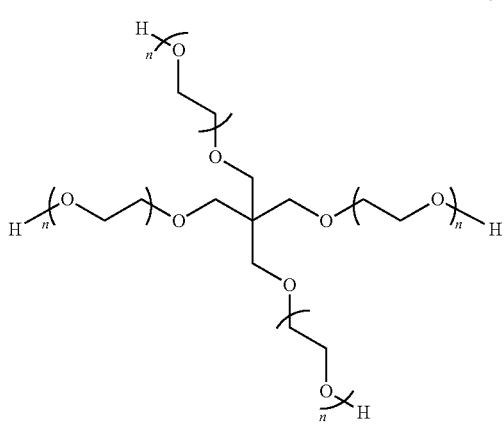

(H-12) 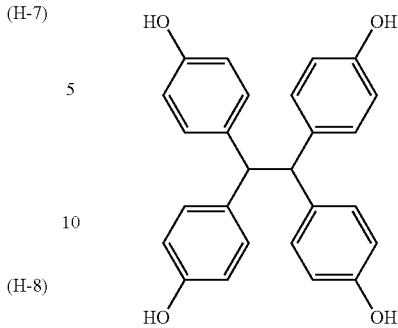

(H-13) 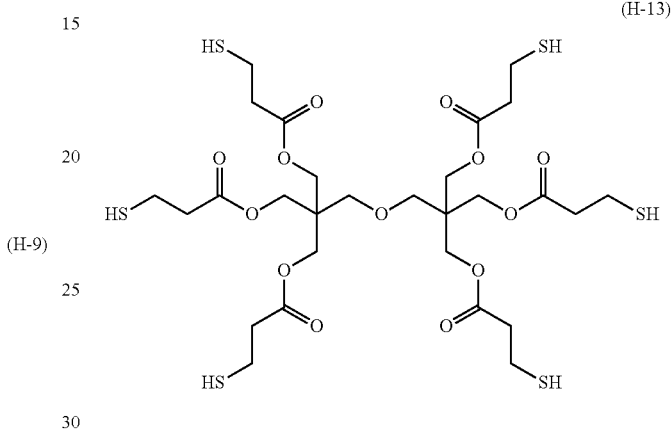

Examples of the tri- or higher functional isocyanate compound for forming the crosslinked polymer include adduct-type tri- or higher functional isocyanate compounds, isocyanurate-type tri- or higher functional isocyanate compounds, and biuret-type tri- or higher functional isocyanate compounds.

Examples of the commercially available products of the adduct-type tri- or higher functional isocyanate compounds include TAKENATE (registered trademark) D-102, D-103, D-103H, D-103M2, P49-75S, D-110N, D-120N, D-140N, D-160N (all from Mitsui Chemicals, Inc.), DESMODUR (registered trademark) L75, UL57SP (Sumika Bayer Urethane Co., Ltd.), CORONATE (registered trademark) HL, HX, L (Nippon Polyurethane Industry Co., Ltd.), and P301-75E (Asahi Kasei Corporation).

Examples of the commercially available products of the isocyanurate-type tri- or higher functional isocyanate compounds include TAKENATE (registered trademark) D-127N, D-170N, D-170HN, D-172N, D-177N (all from Mitsui Chemicals, Inc.), SUMIDUR N3300, DESMODUR (registered trademark) N3600, N3900, Z4470BA (all from Sumika Bayer Urethane Co., Ltd.), CORONATE (registered trademark) HX, HK (all from Nippon Polyurethane Industry Co., Ltd.), and DURANATE (registered trademark) TPA-100, TKA-100, TSA-100, TSS-100, TLA-100, and TSE-100 (all from Asahi Kasei Corporation).

Examples of the commercially available products of the biuret-type tri- or higher functional isocyanate compounds include TAKENATE (registered trademark) D-165N, NP1100 (all from Mitsui Chemicals, Inc.), DESMODUR (registered trademark) N3200 (Sumika Bayer Urethane Co., Ltd.), and DURANATE (registered trademark) 24A-100 (Asahi Kasei Corporation).

When the specified particles include MC (namely, microcapsules) including a shell formed of the crosslinked polymer and a core, the specified particles may contain, as a dispersing agent for MC, among the above-described chain polymers, a chain polymer having a hydrophilic group. In this case, in the ink, the peripheries of the shells of MC can be at least partially covered with the chain polymer serving as a dispersing agent. In this case, the specified particles are MC covered with a dispersing agent (namely, a composite of MC and the dispersing agent). In this case, an interaction between a urethane group and/or a urea group of the shells of MC and a urethane group and/or a urea group of the dispersing agent (chain polymer), and the dispersing effect exerted by the hydrophilic group of the dispersing agent synergistically provide a further improvement in the dispersion stability of the specified particles.

In this case, the ratio of the amount of the dispersing agent to the total solid-content amount of MC (hereafter, also referred to as the mass ratio [dispersing agent/MC solid content]) is preferably 0.005 to 1.000, more preferably 0.05 to 0.7.

When the mass ratio [dispersing agent/MC solid content] is 0.005 or more, a further improvement is achieved in the dispersion stability of the specified particles.

When the mass ratio [dispersing agent/MC solid content] is 1.000 or less, a further improvement is achieved in the hardness of the image.

Preferred Weight-Average Molecular Weight (Mw) of Specified Polymer

The weight-average molecular weight (Mw) of the specified polymer is, from the viewpoint of the dispersion stability of the ink (specifically, the dispersion stability of the specified particles), preferably 5000 or more, more preferably 7000 or more, still more preferably 8000 or more.

The upper limit of Mw of the specified polymer is not particularly limited. The upper limit of Mw of the specified polymer is, for example, 150000, 100000, 70000, or 50000.

In this Specification, the weight-average molecular weight (Mw) is a value measured by gel permeation chromatography (GPC).

The measurement by gel permeation chromatography (GPC) is performed with a measurement device of an HLC (registered trademark)-8020GPC (Tosoh Corporation), three columns of TSKgel (registered trademark) Super Multipore HZ-H (4.6 mm ID×15 cm, Tosoh Corporation), and an eluant that is THE (tetrahydrofuran). The measurement conditions are a sample concentration of 0.45 mass %, a flow rate of 0.35 ml/min, a sample injection amount of 10 μl, a measurement temperature of 40° C., and use of an RI detector.

The calibration curve is created with "Standard samples TSK standard, polystyrene" from Tosoh Corporation: 8 samples of "F-40", "F-20", "F-4", "F-1", "A-5000", "A-2500", "A-1000", and "n-propylbenzene".

The specified polymer content relative to the total solid-content amount of the specified particles is preferably 10 mass % or more, more preferably 20 mass % or more, still more preferably 30 mass % or more.

When the specified polymer content relative to the total solid-content amount of the specified particles is 10 mass % or more, a further improvement is achieved in the dispersion stability of the ink (specifically, the dispersion stability of the specified particles).

The specified polymer content relative to the total solid-content amount of the specified particles may be 100 mass %, but is preferably 80 mass % or less, more preferably 70 mass % or less, particularly preferably 50 mass % or less.

Polymerizable Group

The specified polymer may have at least one polymerizable group species.

When the specified polymer has a polymerizable group, the ink film is thickened by the actions of the specified sensitizer and the photo-acid generator, and subsequently the thickened ink film can be cured by the action of the polymerizable group.

This results in further improvements in the hardness and scratch resistance of the image.

The polymerizable group is preferably a photopolymerizable group or a thermal-polymerizable group.

The photopolymerizable group is preferably a radical-polymerizable group, more preferably a group including an ethylenically double bond, still more preferably a (meth) acryloyl group, an allyl group, a styryl group, or a vinyl group. The radical-polymerizable group is, from the viewpoint of radical polymerization reactivity and the hardness of a film to be formed, particularly preferably a (meth) acryloyl group.

The thermal-polymerizable group is preferably an epoxy group, an oxetanyl group, an aziridinyl group, an azetidinyl group, a ketone group, an aldehyde group, or a blocked isocyanate group.

The specified polymer may contain one polymerizable group species alone, or may contain two or more polymerizable group species.

The fact that the specified polymer has a polymerizable group can be confirmed by, for example, Fourier transform infrared spectroscopy (FT-IR).

Polymerizable-Group-Introducing Compound

In the case of the specified polymer having a polymerizable group, the polymerizable group can be introduced into the specified polymer by using a polymerizable-group-introducing compound.

The polymerizable-group-introducing compound may be a compound having a polymerizable group and an active hydrogen group.

The polymerizable-group-introducing compound is preferably a compound having one or more polymerizable groups and two or more active hydrogen groups.

The method of introducing a polymerizable group into the specified polymer is not particularly limited. A particularly preferred method is, during synthesis of the specified polymer, to cause a reaction of at least one selected from the group consisting of bifunctional isocyanate compounds, at least one selected from the group consisting of water, diol compounds, diamine compounds, and dithiol compounds, and at least one polymerizable-group-introducing compound (and optionally at least one hydrophilic-group-introducing compound).

Such polymerizable-group-introducing compound species may be used alone or in combination of two or more thereof.

Other examples of the polymerizable-group-introducing compound include compounds described in Paragraphs 0075 to 0089 of WO2016/052053A.

The polymerizable-group-introducing compound is preferably a compound represented by the following formula (ma).

$$L^1 Lc_m Z_n \qquad \text{(ma)}$$

In the formula (ma), $L^1$ represents an m+n-valent linking group; m and n each independently represent an integer selected from the group consisting of 1 to 100; Lc represents a monovalent ethylenically unsaturated group; and Z represents an active hydrogen group.

$L^1$ preferably represents a di- or higher valent aliphatic group, a di- or higher valent aromatic group, a di- or higher valent heterocyclic group, —O—, —S—, —NH—, —N<, —CO—, —SO—, —SO$_2$—, or a combination of the foregoing.

m and n each independently represent preferably 1 to 50, more preferably 2 to 20, still more preferably 3 to 10, particularly preferably 3 to 5.

Examples of the monovalent ethylenically unsaturated group represented by Lc include an allyl group, a vinyl group, an acryloyl group, and a methacryloyl group.

The active hydrogen group represented by Z is more preferably a hydroxy group or a primary amino group, still more preferably a hydroxy group.

The following are examples of the polymerizable-group-introducing compound; however, the polymerizable-group-introducing compound is not limited to the following examples. Incidentally, n's in Compounds (a-3) and (a-14) represent, for example, an integer selected from the group consisting of 1 to 90.

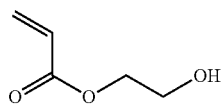
(a-1)

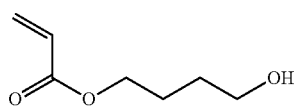
(a-2)

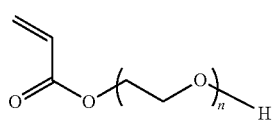
(a-3)

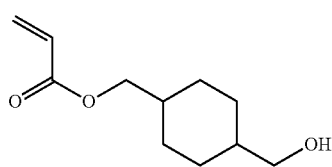
(a-4)

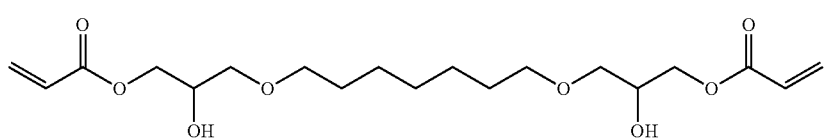
(a-5)

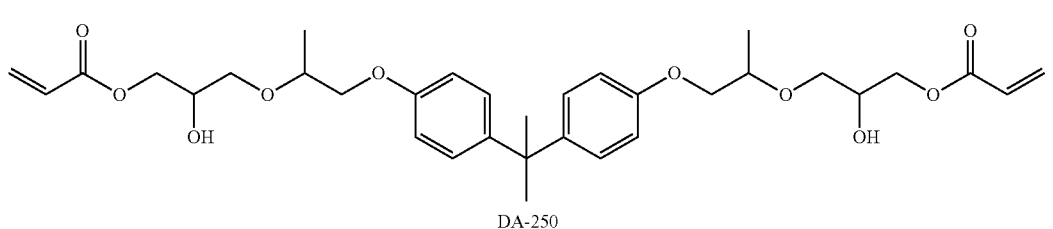
DA-250
(a-6)

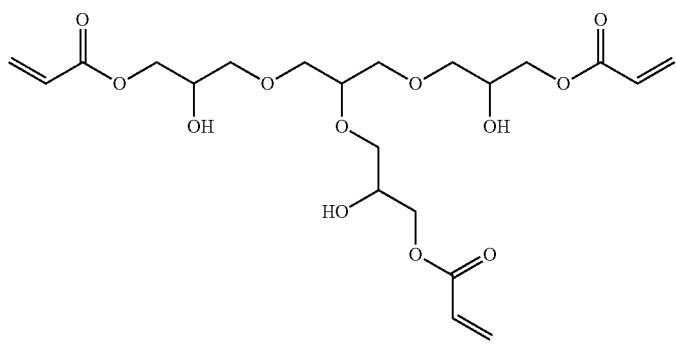
DA-314
(a-7)

(a-8)
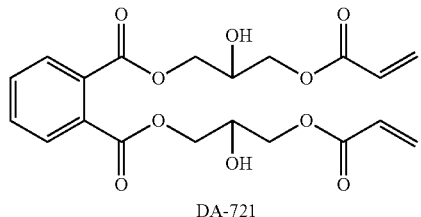
DA-721
(a-9)
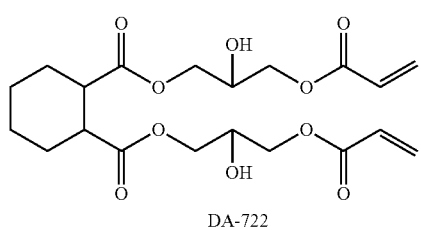
DA-722
(a-10)
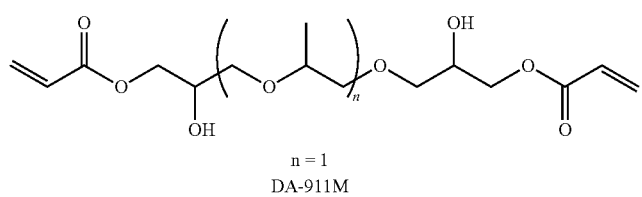
n = 1
DA-911M
(a-11)
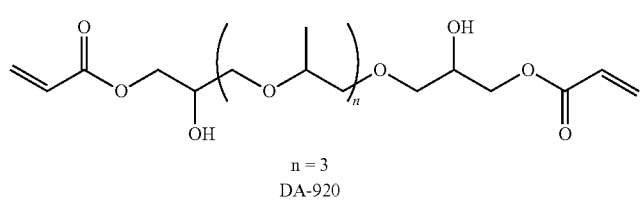
n = 3
DA-920
(a-12)
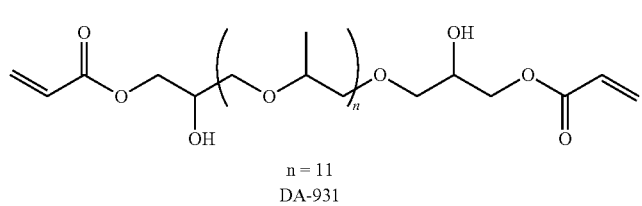
n = 11
DA-931
(a-13)
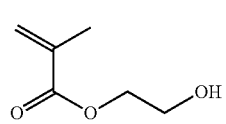
(a-14)
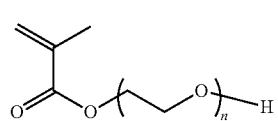
(a-15)
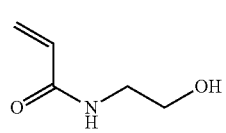

(a-16)
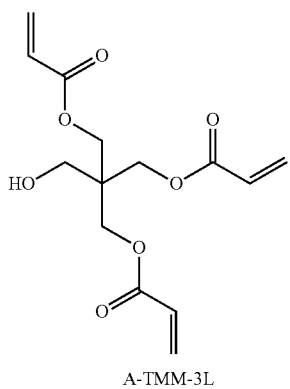
A-TMM-3L
(a-17)
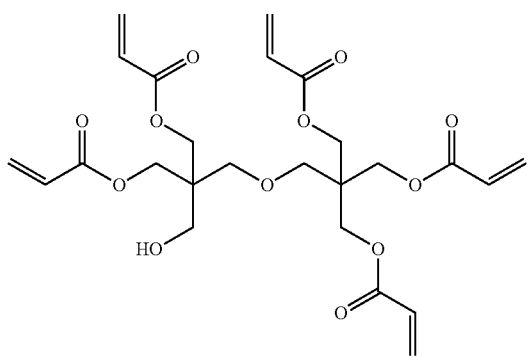
SR399E
(a-18)
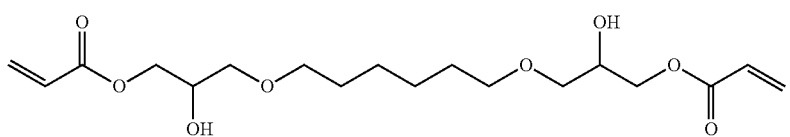
(a-19)
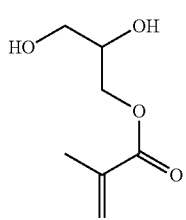
(a-20)
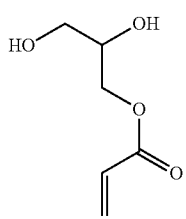
(a-21)
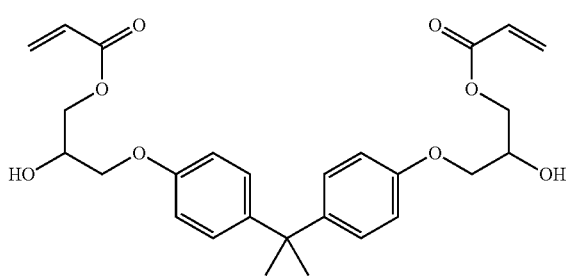

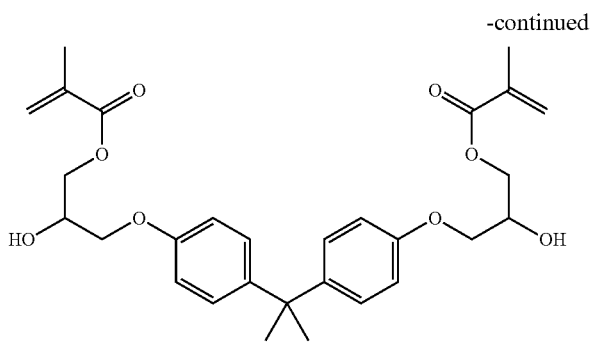

Polymerizable-Group-Introduced Isocyanate Compound

In the case of the specified polymer having a polymerizable group, the polymerizable group can also be introduced into the specified polymer by using a polymerizable-group-introduced isocyanate compound.

Examples of the polymerizable-group-introduced isocyanate compound include:
- a reaction product of at least one of the above-described polymerizable-group-introducing compounds, and at least one of bifunctional isocyanate compounds;
- a reaction product of at least one of the above-described polymerizable-group-introducing compounds, and at least one of tri- or higher functional isocyanate compounds; and
- a reaction product of at least one of the above-described polymerizable-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Acid-Group-Introducing Compound

The above-described raw-material polymer (specifically, a polymer having an acid group that is neutralized into the specified polymer) can be formed using an acid-group-introducing compound.

As the acid-group-introducing compound, a compound having an acid group and an active hydrogen group can be used.

As the acid-group-introducing compound, a compound having one or more acid groups and two or more active hydrogen groups is preferably used.

Examples of the acid-group-introducing compound include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Examples of the acid-group-introducing compound include, in addition to the above-described α-amino acids, the following specific examples.

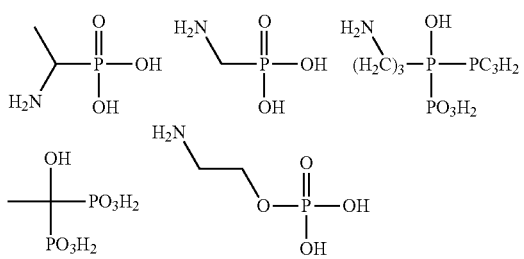

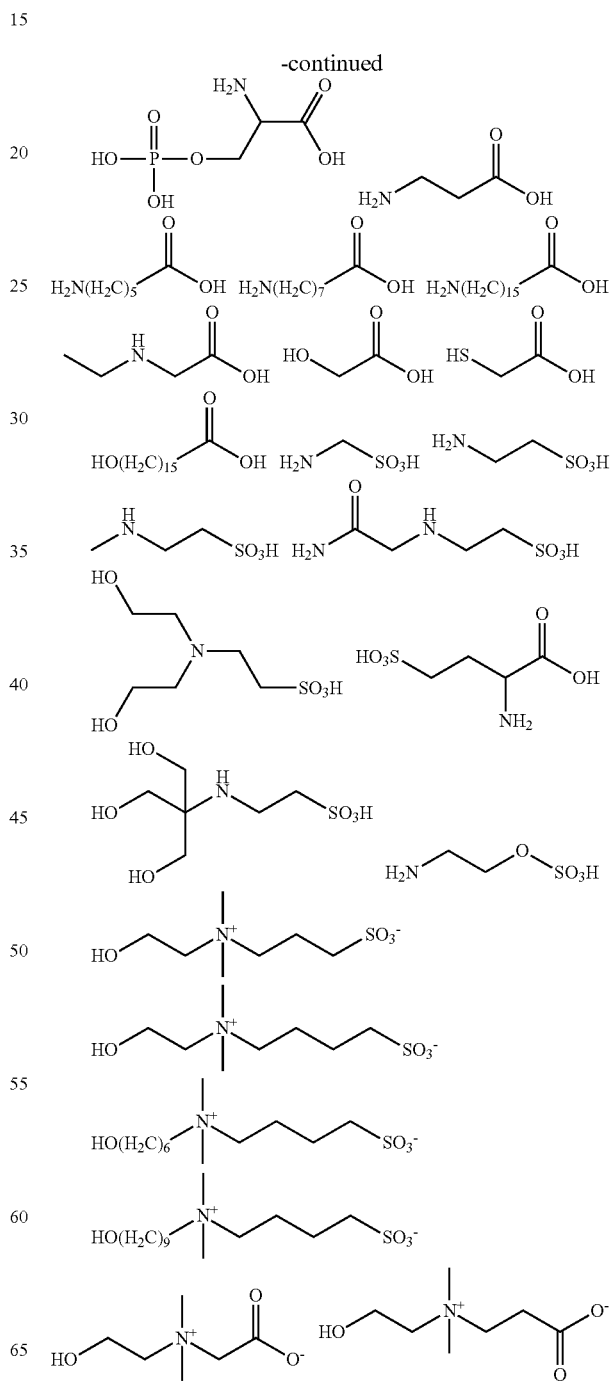

(a-22)

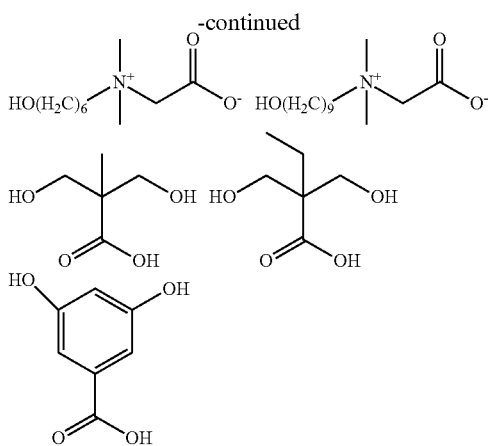

In the acid-group-introducing compound, for example, an inorganic base such as sodium hydroxide or potassium hydroxide or an organic base such as triethylamine may be used to neutralize at least partially the acid groups.

Such an acid-group-introducing compound in which the acid groups are at least partially neutralized is a compound having an anionic group, and hence can also be used as an anionic-group-introducing compound for the specified polymer.

Specifically, use of the anionic-group-introducing compound enables, without preparation of the raw-material monomer, direct production of a specified monomer (a polymer having an anionic group).

Acid-Group-Introduced Isocyanate Compound

The introduction of the acid group into the raw-material monomer can also be performed by using an acid-group-introduced isocyanate compound.

Examples of the acid-group-introduced isocyanate compound include:
- a reaction product of at least one of the above-described acid-group-introducing compounds, and at least one of bifunctional isocyanate compounds;
- a reaction product of at least one of the above-described acid-group-introducing compounds, and at least one of tri- or higher functional isocyanate compounds; and
- a reaction product of at least one of the above-described acid-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Anionic-Group-Introduced Isocyanate Compound

The introduction of the acid group into the specified monomer can also be performed by using an anionic-group-introduced isocyanate compound.

Examples of the anionic-group-introduced isocyanate compound include:
- a reaction product of at least one of the above-described anionic-group-introducing compounds, and at least one of bifunctional isocyanate compounds;
- a reaction product of at least one of the above-described anionic-group-introducing compounds, and at least one of tri- or higher functional isocyanate compounds; and
- a reaction product of at least one of the above-described anionic-group-introducing compounds, at least one of bifunctional isocyanate compounds, and at least one selected from the group consisting of tri- or higher functional polyol compounds, tri- or higher functional polyamine compounds, and tri- or higher functional polythiol compounds.

Nonionic Group

The specified polymer or raw-material polymer may have a nonionic group.

The nonionic group may be a group having a polyether structure, and is preferably a monovalent group including a polyalkyleneoxy group.

The introduction of the nonionic group into the specified polymer or raw-material polymer can be performed by using a nonionic-group-introducing compound.

The nonionic-group-introducing compound is preferably a compound having a polyether structure, more preferably a compound having a polyoxyalkylene group.

The introduction of the nonionic group into the specified polymer or raw-material polymer can also be performed by using a nonionic-group-introduced isocyanate compound.

Specific examples of the nonionic-group-introduced isocyanate compound include adducts of trimethylolpropane (TMP), m-xylylene diisocyanate (XDI), and polyethylene glycol monomethyl ether (EO) (for example, TAKENATE (registered trademark) D-116N, manufactured by Mitsui Chemicals, Inc.).

Polymerizable Monomer

The specified particles may include a polymerizable monomer.

When the specified particles include a polymerizable monomer, after the ink film is thickened by the actions of the specified sensitizer and the photo-acid generator, the thickened ink film can be cured by the action of the polymerizable monomer.

This results in further improvements in the hardness and the scratch resistance of the image.

When the specified particles include such a polymerizable monomer, the polymerizable monomer included in the specified particles may be one species alone, or may be two or more species.

The polymerizable monomer included in the specified particles may be compounds described in Paragraphs 0097 to 0105 of WO2016/052053A.

The polymerizable monomer that may be included in the specified particles is preferably a photopolymerizable monomer or a thermal-polymerizable monomer.

The photopolymerizable monomer has properties of being polymerized upon irradiation with light. The photopolymerizable monomer is preferably a radical-polymerizable monomer.

The thermal-polymerizable monomer has properties of being polymerized upon heating or irradiation with infrared radiation.

In this Specification, inks in which the specified particles include a photopolymerizable monomer and/or the specified polymer has a photopolymerizable group are sometimes referred to as "photocurable inks", while inks in which the specified particles include a thermal-polymerizable monomer and/or the specified polymer has a thermal-polymerizable group are sometimes referred to as "thermosetting inks".

The ink film formed of an ink according to the present disclosure can be cured by, in a case where the ink according to the present disclosure is a photocurable ink, irradiating the ink film with light (refer to a curing step A described later), or, in a case where the ink according to the present disclosure is a thermosetting ink, heating or irradiating the ink film with infrared radiation (refer to a heating step or a curing step B described later).

In a particularly preferred example of the photocurable ink, the specified particles include a radical-polymerizable monomer and/or (more preferably, and) the specified polymer has a radical-polymerizable group.

This provides a further improvement in the curability of the image upon irradiation with light, which results in a further improvement in the scratch resistance of the image.

When the specified particles include, as the polymerizable monomer, a photopolymerizable monomer, the specified particles preferably further include a photopolymerization initiator described later.

When the specified particles include, as the polymerizable monomer, a thermal-polymerizable monomer, the specified particles may further include at least one of a photothermal conversion agent or a thermal curing accelerator described later.

The content (total content in the case of including two or more species) of the polymerizable monomer included in the specified particles relative to the total solid-content amount of the specified particles is, from the viewpoint of improving the film curing sensitivity and the film hardness, preferably 1 mass % to 80 mass %, more preferably 5 mass % to 70 mass %, still more preferably 10 mass % to 50 mass %.

In this Specification, the total solid-content amount of the specified particles means, in a case where the specified particles do not include solvents, the total amount of the specified particles, and, in a case where the specified particles include a solvent, the total amount of the specified particles except for the solvent.

The polymerizable monomer preferably has a molecular weight of 100 to 4000, more preferably 100 to 2000, more preferably 100 to 1000, more preferably 100 to 900, more preferably 100 to 800, particularly preferably 150 to 750.

Photopolymerizable Monomer

The photopolymerizable monomer may be a radical-polymerizable monomer or a cationic-polymerizable monomer, and is preferably a radical-polymerizable monomer.

The radical-polymerizable monomer has, in the molecular structure, a radical-polymerizable group.

Preferred examples of the radical-polymerizable group of the radical-polymerizable monomer are the same as the above-described preferred examples of the radical-polymerizable group that may be present in the specified polymer.

Examples of the radical-polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

The radical-polymerizable monomer is preferably a compound having an ethylenically unsaturated group.

When the specified particles include the radical-polymerizable monomer, the specified particles may include a single radical-polymerizable monomer species alone, or may include two or more radical-polymerizable monomer species.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stil acrylate, isostearyl acrylate, 2-ethylhexyldiglycol acrylate, 2-hydroxybutyl acrylate, 2-acryloyloxyethylhydrophthalic acid, ethoxy diethylene glycol acrylate, methoxy diethylene glycol acrylate, methoxypolyethylene glycol acrylate, methoxy propylene glycol acrylate, 2-hydroxy-3-phenoxypropyl acrylate, vinyl ether acrylate, 2-acryloyloxyethylsuccinic acid, 2-acryloyloxyphthalic acid, 2-acryloxyethyl-2-hydroxyethylphthalic acid, lactone-modified acrylate, acryloyl morpholine, acrylamide, and substituted acrylamides (such as N-methylol acrylamide, and diacetone acrylamide);

bifunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxy neopentyl glycol diacrylate, propoxylated neopentyl glycol diacrylate, alkoxylated dimethyloltricyclodecane diacrylate, polytetramethylene glycol diacrylate, alkoxylated cyclohexanonedimethanol diacrylate, alkoxylated hexanediol diacrylate, dioxane glycol diacrylate, cyclohexanonedimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanurate triacrylate, ε-caprolactone-modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the methacrylate compound include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate; and bifunctional methacrylate compounds such as polyethylene glycol dimethacrylate, polypropylene glycol dimethacrylate, 2,2-bis(4-methacryloxypolyethoxyphenyl)propane, and tetraethylene glycol dimethacrylate.

Examples of the styrene compound include styrene, p-methylstyrene, p-methoxystyrene, β-methylstyrene, p-methyl-β-methylstyrene, c-methylstyrene, and p-methoxy-β-methylstyrene.

Examples of the vinylnaphthalene compound include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinyl heterocyclic compound include N-vinylcarbazole, N-vinylpyrrolidone, N-vinylethylacetamide, N-vinylpyrrole, N-vinylphenothiazine, N-vinylacetanilide, N-vinylethylacetamide, N-vinylsuccinimide, N-vinylphthalimide, N-vinylcaprolactam, and N-vinylimidazole.

Other examples of the radical-polymerizable monomer include allyl glycidyl ether, diallyl phthalate, triallyl trimellitate, and N-vinylamides such as N-vinylformamide.

Of these radical-polymerizable monomers, the bi- or lower functional radical-polymerizable monomer is preferably at least one selected from the group consisting of 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanonedimethanol diacrylate, alkoxylated hexanediol diacrylate, polyethylene glycol diacrylate, and polypropylene glycol diacrylate.

The tri- or higher functional radical-polymerizable monomer is preferably at least one selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerolpropoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

The specified particles may include a combination of a bi- or lower functional radical-polymerizable monomer and a tri- or higher functional radical-polymerizable monomer. In this case, the bi- or lower functional radical-polymerizable monomer contributes to adhesiveness between the image and the substrate, and the tri- or higher functional radical-polymerizable monomer contributes to an improvement in the hardness of the image.

The combination of the bi- or lower functional radical-polymerizable monomer and the tri- or higher functional radical-polymerizable monomer is, for example, the combination of a bifunctional acrylate compound and a trifunctional acrylate compound, the combination of a bifunctional acrylate compound and a pentafunctional acrylate compound, or the combination of a monofunctional acrylate compound and a tetrafunctional acrylate compound.

From the viewpoint of further improving adhesiveness between the image and the substrate, at least one species of the radical-polymerizable monomer that may be included in the specified particles is preferably a radical-polymerizable monomer having a cyclic structure (hereafter, also referred to as "cyclic radical-polymerizable monomer").

Examples of the cyclic radical-polymerizable monomer include cyclohexyl acrylate, tetrahydrofurfuryl acrylate, benzyl acrylate, isobornyl acrylate, dicyclopentenyl acrylate, dicyclopentenyloxyethyl acrylate, dicyclopentanyl acrylate, ethoxylated isocyanurate triacrylate, and ε-caprolactone-modified tris-(2-acryloxyethyl) isocyanurate.

The examples further include bi- or higher functional cyclic radical-polymerizable monomers described below.

From the viewpoint of further improving the adhesiveness between the image and the substrate, at least one species of the radical-polymerizable monomer that may be included in the specified particles is preferably a polymerizable monomer including, in a single molecule, one or more cyclic structures and two or more (meth)acryloyl groups (hereafter, also referred to as "bi- or higher functional cyclic radical-polymerizable monomer").

Examples of the bi- or higher functional cyclic radical-polymerizable monomer include:
tricyclodecanedimethanol di(meth)acrylate,
bisphenol A ethylene oxide (EO) adduct di(meth)acrylate,
bisphenol A propylene oxide (PO) adduct di(meth)acrylate,
ethoxylated bisphenol A di(meth)acrylate,
alkoxylated dimethyloltricyclodecane di(meth)acrylate,
alkoxylated cyclohexanonedimethanol di(meth)acrylate, and
cyclohexanonedimethanol di(meth)acrylate.

When the specified particles include a radical-polymerizable monomer, the percentage of a bi- or higher functional cyclic radical-polymerizable monomer relative to the whole radical-polymerizable monomer is preferably 10 mass % to 100 mass %, more preferably 30 mass % to 100 mass %, particularly preferably 40 mass % to 100 mass %.

In addition to the above-described radical-polymerizable monomers, there are other usable radical-polymerizable monomers such as commercially available products described in, for example, "Crosslinking agent handbook", edited by Shinzo YAMASHITA (1981, TAISEISHA LTD.); "UV/EB curing handbook (raw material)", edited by Kiyomi KATO (1985, Kobunshi Kankokai); "Applications and markets of UV/EB curing techniques", edited by RadTech Japan, p. 79 (1989, CMC Publishing Co., Ltd.); and "Polyester resin handbook", written by Eiichiro TAKIYAMA (1988, THE NIKKAN KOGYO SHIMBUN, LTD.); and radical-polymerizable and crosslinkable monomers publicly known in the industry.

Examples of the cationic-polymerizable monomer include an epoxy compound, a vinyl ether compound, and an oxetane compound.

The cationic-polymerizable monomer is preferably a compound having at least one olefin, thioether, acetal, thioxane, thietane, aziridine, N heterocycle, O heterocycle, S heterocycle, P heterocycle, aldehyde, lactam, or cyclic ester group.

The cationic-polymerizable monomer may be compounds described in J. V. Crivello et al. "Advances in Polymer Science", 62, pages 1 to 47 (1984); Lee et al. "Handbook of Epoxy Resins", McGraw Hill Book Company, New York (1967); and P. F. Bruins et al. "Epoxy Resin Technology" (1968).

There are also known photopolymerizable monomers that are photocurable polymerizable monomers used for photopolymerizable compositions and described in patent publications such as JP1995-159983A (JP-H7-159983A), JP1995-31399B (JP-H7-31399B), JP1996-224982A (JP-H8-224982A), JP1998-863A (JP-H10-863A), JP1997-134011A (JP-H9-134011A), and JP2004-514014A. These monomers are also applicable as polymerizable monomers that may be included in the specified particles.

The photopolymerizable monomer may be a commercially available product on the market.

Examples of the commercially available product of the photopolymerizable monomer include AH-600 (bifunctional), AT-600 (bifunctional), UA-306H (hexafunctional), UA-306T (hexafunctional), UA-306I (hexafunctional), UA-510H (decafunctional), UF-8001G (bifunctional), DAUA-167 (bifunctional), LIGHT ACRYLATE NPA (bifunctional), LIGHT ACRYLATE 3EG-A (bifunctional) (all from Kyoeisha Chemical Co., Ltd.), SR339A (PEA, monofunctional), SR506 (IBOA, monofunctional), CD262 (bifunctional), SR238 (HDDA, bifunctional), SR341 (3MPDDA, bifunctional), SR508 (bifunctional), SR306H (bifunctional), CD560 (bifunctional), SR833S (bifunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), SR399E (pentafunctional) (all from Sartomer), A-NOD-N (NDDA, bifunctional), A-DOD-N (DDDA, bifunctional), A-200 (bifunctional), APG-400 (bifunctional), A-BPE-10 (bifunctional), A-BPE-20 (bifunctional), A-9300 (trifunctional), A-9300-1CL (trifunctional), A-TMPT (trifunctional), A-TMM-3L (trifunctional), A-TMMT (tetrafunctional), AD-TMP (tetrafunctional) (all from Shin Nakamura Chemical Co., Ltd.), UV-7510B (trifunctional) (The Nippon Synthetic Chemical Industry Co., Ltd.), KAYARAD DPCA-30 (hexafunctional), and KAYARAD DPEA-12 (hexafunctional) (all from Nippon Kayaku Co., Ltd.).

In addition, preferred examples of the polymerizable monomer include commercially available products such as NPGPODA (neopentyl glycol propylene oxide adduct diacrylate), SR531, SR285, SR256 (all from Sartomer), A-DHP (dipentaerythritol hexaacrylate, Shin Nakamura Chemical Co., Ltd.), ARONIX (registered trademark) M-156 (TOAGOSEI CO., LTD.), V-CAP (BASF), and VISCOAT #192 (OSAKA ORGANIC CHEMICAL INDUSTRY LTD.).

Among these commercially available products, in particular, preferred are photopolymerizable monomers having a cyclic structure that are SR506, SR833S, A-9300, and A-9300-CL, particularly preferred is SR833S.

Thermal-Polymerizable Monomer

The thermal-polymerizable monomer can be selected from the group consisting of polymerizable monomers that can be polymerized by being heated or irradiated with infrared radiation. Examples of the thermal-polymerizable monomer include compounds such as epoxy compounds, oxetane compounds, aziridine compounds, azetidine compounds, ketone compounds, aldehyde compounds, and blocked isocyanate compounds.

Examples of the epoxy compounds include bi- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexanecarboxylate, epichlorohydrin-bisphenol S-derived epoxide, epoxidated styrene, epichlorohydrin-bisphenol F-derived epoxide, epichlorohydrin-bisphenol A-derived epoxide, epoxidated novolac, and alicyclic diepoxide; and tri- or higher functional epoxy compounds such as polyglycidyl ester of polybasic acid, polyglycidyl ether of polyol, polyglycidyl ether of polyoxyalkylene glycol, polyglycidyl ester of aromatic polyol, urethane polyepoxy compounds, and polyepoxy polybutadiene.

A commercially available product of the epoxy compounds may be EPICLON (registered trademark) 840 (DIC Corporation).

Examples of the oxetane compounds include 3-ethyl-3-hydroxymethyl-1-oxetane, 1,4bis[3-ethyl-3-oxetanylmethoxy)methyl]benzene, 3-ethyl-3-phenoxymethyl-oxetane, bis([1-ethyl(3-oxetanyl)]methyl) ether, 3-ethyl-3-[(2-ethylhexyloxy)methyl]oxetane, 3-ethyl-[(triethoxysilylpropoxy)methyl]oxetane, and 3,3-dimethyl-2-(p-methoxyphenyl)-oxetane.

Examples of the blocked isocyanate compounds include compounds obtained by deactivating isocyanate compounds with a blocking agent (active-hydrogen-containing compound).

Preferred examples of such an isocyanate compound include commercially available isocyanates such as hexamethylene diisocyanate, isophorone diisocyanate, toluyl diisocyanate, xylylene diisocyanate, hexamethylene diisocyanate trimer, trimethylhexylylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and BAYHYDUR (registered trademark; Bayer AG); and bi- or higher functional isocyanates that are combinations of the foregoing.

Examples of the blocking agent include lactam [such as ε-caprolactam, δ-valerolactam, and γ-butyrolactam], oxime [such as acetoxime, methyl ethyl ketoxime (MEK oxime), methyl isobutyl ketoxime (MIBK oxime), and cyclohexanone oxime], amine [such as aliphatic amine (dimethylamine, diisopropylamine, di-n-propylamine, and diisobutylamine), alicyclic amine (such as methylhexylamine and dicyclohexylamine), and aromatic amine (such as aniline and diphenylamine)], aliphatic alcohol [such as methanol, ethanol, 2-propanol, and n-butanol], phenol and alkylphenol [such as phenol, cresol, ethylphenol, n-propylphenol, isopropylphenol, n-butylphenol, octylphenol, nonylphenol, xylenol, diisopropylphenol, and di-t-butylphenol], imidazole [such as imidazole and 2-methylimidazole], pyrazole [such as pyrazole, 3-methylpyrazole, and 3,5-dimethylpyrazole], imine [such as ethyleneimine and polyethyleneimine], active methylene [such as dimethyl malonate, diethyl malonate, diisopropyl malonate, acetylacetone, methyl acetoacetate, and ethyl acetoacetate], blocking agents described in JP2002-309217A and JP2008-239890A, and mixtures of two or more of the foregoing. In particular, the blocking agent is preferably oxime, lactam, pyrazole, active methylene, or amine.

The blocked isocyanate compounds may be commercially available products on the market. Preferred examples include TRIXENE (registered trademark) BI7982, BI7641, BI7642, BI7950, BI7960, and BI7991 (Baxenden Chemicals LTD), and BAYHYDUR (registered trademark; Bayer AG). There are also other preferred examples that are a compound group described in Paragraph 0064 in WO2015/158654A.

The specified particles including the above-described specified polymer and the above-described polymerizable monomer can be produced by, for example, mixing together an oil-phase component including the specified polymer and the polymerizable monomer, and an aqueous-phase component, and emulsifying the resultant mixture.

Radical Polymerization Initiator

The specified particles may include at least one radical polymerization initiator.

In this Specification, the radical polymerization initiator means a compound that absorbs light to generate a radical.

However, a compound that absorbs light to generate a radical and that also belongs to the above-described photoacid generator is not included in the concept of the radical polymerization initiator in this Specification.

In an ink according to the present disclosure, when the specified particles include a radical-polymerizable monomer and/or the specified polymer has a radical-polymerizable group, the specified particles preferably include at least one radical polymerization initiator. This results in further improvements in the hardness and scratch resistance of the image formed.

Specifically, when the specified particles include a radical-polymerizable monomer and/or the specified polymer has a radical-polymerizable group, and the specified particles include a radical polymerization initiator, each specified particle has both of a radical-polymerizable group (specifically, the radical-polymerizable group in the radical-polymerizable monomer and/or the radical-polymerizable group in the specified polymer), and the radical polymerization initiator. Thus, the radical-polymerizable group and the radical polymerization initiator are in close proximity to each other, so that, compared with the cases of using existing photocurable compositions, an improvement is achieved in the curing sensitivity of the film (hereafter, also simply referred to as "sensitivity"). This results in further improvements in the hardness and scratch resistance of the image formed.

When the specified particles include a radical polymerization initiator, radical polymerization initiators that have high sensitivity but have low dispersibility or low solubility in water and hence have been difficult to use become usable (for example, a radical polymerization initiator having a solubility of 1.0 mass % or less in water at 25° C.). As a result, radical polymerization initiators for use can be selected with a higher degree of freedom, which results in an increase in the degree of freedom of selecting light sources for use. This can provide an improvement in the curing sensitivity.

The above-described radical polymerization initiators that have high sensitivity but have low dispersibility or low solubility in water and hence have been difficult to use are, for example, specifically carbonyl compounds and acylphosphine oxide compounds described later, preferably acylphosphine oxide compounds.

In this way, in the ink according to the present disclosure, the specified particles are prepared so as to include a substance having a low solubility in water, so that the substance is contained in the ink according to the present disclosure, which is an aqueous composition. This is another advantage of the ink according to the present disclosure.

The ink according to such an embodiment in which the specified particles include a radical polymerization initiator also has higher preservation stability than existing photocurable compositions. The reason for this is inferred that the radical polymerization initiator is included in the specified particles, which results in suppression of aggregation or sedimentation of the radical polymerization initiator.

Regarding the radical polymerization initiator, reference can be appropriately made to for example, descriptions in Paragraphs 0091 to 0094 of W2016/052053A.

Preferred examples of the radical polymerization initiator include (a) carbonyl compounds such as aromatic ketones and (b) acylphosphine oxide compounds; specific examples include bis(2,4,6-trimethylbenzoyl)-phenylphosphine oxide (such as IRGACURE (registered trademark) 819, manufactured by BASF), 2-(dimethylamino)-1-(4-morpholinophenyl)-2-benzyl-1-butanone (such as IRGACURE (registered trademark) 369, manufactured by BASF), 2-methyl-1-(4-methylthiophenyl)-2-morpholinopropan-1-one (such as IRGACURE (registered trademark) 907, manufactured by BASF), 1-hydroxy-cyclohexyl-phenyl-ketone (such as IRGACURE (registered trademark) 184, manufactured by BASF), and 2,4,6-trimethylbenzoyl-diphenyl-phosphine oxide (such as DAROCUR (registered trademark) TPO and LUCIRIN (registered trademark) TPO (both manufactured by BASF)).

Of these, from the viewpoints of, for example, an improvement in the sensitivity and suitability for LED light, the photopolymerization initiator internally included is preferably the (b) acylphosphine oxide compounds, more preferably monoacylphosphine oxide compounds (particularly preferably 2,4,6-trimethylbenzoyl-diphenyl-phosphine oxide), or bisacylphosphine oxide compounds (particularly preferably bis(2,4,6-trimethylbenzoyl)-phenylphosphine oxide).

The LED light preferably has a wavelength of 355 nm, 365 nm, 385 nm, 395 nm, or 405 nm.

The specified particles including a radical polymerization initiator can be produced by, for example, mixing together an oil-phase component including the specified polymer, the photo-acid generator, the specified sensitizer, the radical-polymerizable monomer, and the photopolymerization initiator, and an aqueous-phase component, and emulsifying the resultant mixture.

The radical polymerization initiator content relative to the total solid-content amount of the specified particles is preferably 0.1 mass % to 15 mass %, more preferably 0.5 mass % to 10 mass %, still more preferably 1 mass % to 6 mass %.

Photothermal Conversion Agent

When the specified particles include, as the polymerizable monomer, a thermal-polymerizable monomer, the specified particles may include at least one photothermal conversion agent.

The photothermal conversion agent is a compound that absorbs infrared radiation or the like to generate heat, to polymerize and cure a thermal-polymerizable monomer. The photothermal conversion agent may be a publicly known compound.

The photothermal conversion agent is preferably an infrared absorbent. Examples of the infrared absorbent include polymethylindolium, indocyanine green, polymethine pigment, croconium pigment, cyanine pigment, merocyanine pigment, squarylium pigment, chalcogenopyryloallylidene pigment, metal thiolate complex pigment, bis(chalcogenopyrylo)polymethine pigment, oxyindolizine pigment, bisaminoallyl polymethine pigment, indolizine pigment, pyrylium pigment, quinoid pigment, quinone pigment, phthalocyanine pigment, naphthalocyanine pigment, azo pigment, azomethine pigment, and carbon black.

Thermal Curing Accelerator

When the specified particles include, as the polymerizable monomer, a thermal-polymerizable monomer, the specified particles may include at least one thermal curing accelerator.

The thermal curing accelerator is a compound that catalytically accelerates the thermosetting reaction of the thermal-polymerizable monomer.

The thermal curing accelerator may be a publicly known compound. The thermal curing accelerator is preferably acid or base, or a compound that generates acid or base under heating. Examples include carboxylic acid, sulfonic acid, phosphoric acid, aliphatic alcohol, phenol, aliphatic amine, aromatic amine, imidazole (such as phenylimidazole or 2-methylimidazole), and pyrazole.

In the ink according to the present disclosure, the total solid-content amount of the specified particles relative to the total solid-content amount of the ink is preferably 50 mass % or more, more preferably 60 mass % or more, still more preferably 70 mass % or more, still more preferably 80 mass % or more, still more preferably 85 mass % or more.

This provides a further improvement in the ejection stability and a further improvement in the adhesiveness between the image and the substrate.

In the ink according to the present disclosure, the total solid-content amount of the specified particles relative to the total amount of the ink is preferably 1 mass % to 50 mass %, more preferably 3 mass % to 40 mass %, still more preferably 5 mass % to 30 mass %.

When the total solid-content amount of the specified particles relative to the total amount of the ink is 1 mass % or more, a further improvement is achieved in the adhesiveness between the image and the substrate.

When the total solid-content amount of the specified particles relative to the total amount of the ink is 50 mass % or less, a further improvement is achieved in the dispersion stability of the ink.

The volume-average dispersed particle size of the specified particles is not particularly limited, but is, from the viewpoint of dispersion stability, preferably 0.01 μm to 10 μm, more preferably 0.01 μm to 5 μm, still more preferably 0.05 μm to 1 μm, still more preferably 0.05 μm to 0.5 μm, still more preferably 0.05 μm to 0.3 μm.

In this Specification, the "volume-average dispersed particle size" means a value measured by a light scattering method. The measurement of the volume-average dispersed particle size of the specified particles by the light scattering method is performed with, for example, LA-960 (HORIBA, Ltd.).

Water

The ink according to the present disclosure contains water.

The water serves as a dispersion medium of the specified particles (dispersoid).

The water content of the ink according to the present disclosure is not particularly limited. The water content relative to the total amount of the ink is preferably 10 mass % to 99 mass %, more preferably 20 mass % to 95 mass %, still more preferably 30 mass % to 90 mass %, particularly preferably 50 mass % to 90 mass %.

Coloring Material

The ink according to the present disclosure may be an ink containing at least one coloring material (what is called "color ink"), or may be an ink not containing any coloring material (what is called "clear ink").

When the ink contains a coloring material, the coloring material is preferably contained outside of the specified particles (in other words, the specified particles do not include the coloring material).

The coloring material is not particularly limited, and can be freely selected from publicly known coloring materials such as pigments, water-soluble dyes, and disperse dyes. Of these, more preferably, pigments are included because of high weather resistance and high color reproducibility.

The pigments are not particularly limited, and may be appropriately selected in accordance with the purpose. Examples of the pigments include publicly known organic pigments and inorganic pigments. Other examples of the pigments include resin particles dyed with dyes, commercially available pigment dispersions, and surface-treated pigments (such as a pigment dispersed in a dispersion medium such as water, a liquid compound, or an insoluble resin, and a pigment surface-treated with, for example, a resin or a pigment derivative).

Examples of the organic pigments and inorganic pigments include yellow pigments, red pigments, magenta pigments, blue pigments, cyan pigments, green pigments, orange pigments, violet pigments, brown pigments, black pigments, and white pigments.

When a pigment is used as the coloring material, a pigment dispersing agent may be optionally used.

When a pigment is used as the coloring material, the pigment may be a self-dispersible pigment in which the surfaces of pigment particles have a hydrophilic group.

For the coloring materials and the pigment dispersing agent, reference can be appropriately made to Paragraphs 0180 to 0200 of JP2014-040529A and Paragraphs 0122 to 0129 of WO2016/052053A.

When the ink according to the present disclosure contains a coloring material, the coloring material content relative to the total amount of the ink is preferably 0.1 mass % to 20 mass %, more preferably 0.5 mass % to 10 mass %, particularly preferably 0.5 mass % to 5 mass %.

Other Components

The ink according to the present disclosure may contain, as needed, other components different from the above-described components.

Such other components may be included in the specified particles, or may not be included in the specified particles.

Organic Solvent

The ink according to the present disclosure may contain an organic solvent.

When the ink according to the present disclosure contains an organic solvent, a further improvement can be achieved in the adhesiveness between the image and the substrate.

When the ink according to the present disclosure contains an organic solvent, the organic solvent content relative to the total amount of the ink is preferably 0.1 mass % to 10 mass %, more preferably 0.1 mass % to 5 mass %.

Specific examples of the organic solvent are as follows:
  alcohols (such as methanol, ethanol, propanol, isopropanol, butanol, isobutanol, secondary butanol, tertiary butanol, pentanol, hexanol, cyclohexanol, and benzyl alcohol),
  polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thiodiglycol, and 2-methylpropanediol),
  polyhydric alcohol ethers (such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether),
  amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, andtetramethylpropylenediamine),
  amides (such as formamide, N,N-dimethylformamide, and N,N-dimethylacetamide), heterocycles (such as 2-pyrrolidone, N-methyl-2-pyrrolidone, cyclohexylpyrrolidone, 2-oxazolidone, 1,3-dimethyl-2-imidazolidinone, and γ-butyrolactone),
sulfoxides (such as dimethyl sulfoxide),
sulfones (such as sulfolane), and
others (such as urea, acetonitrile, and acetone).

The ink according to the present disclosure may contain, as components that may be included in the specified particles or that may not be included in the specified particles, for example, a surfactant, a polymerization inhibitor, and an ultraviolet absorbent.

The ink according to the present disclosure may contain, as needed, from the viewpoints of the hardness of the image, the adhesiveness between the image and the substrate, and ink ejection stability, outside of the specified particles, a polymerizable monomer, a photopolymerization initiator, and a resin, for example.

Regarding these components, reference can be made to, for example, Paragraphs 0134 to 0157 of WO2016/052053A.

Preferred Properties of Ink

When the ink according to the present disclosure is set at 25° C. to 50° C., the ink preferably has a viscosity of 3 mPa·s to 15 mPa·s, more preferably 3 mPa·s to 13 mPa·s. In particular, when the ink according to the present disclosure is set at 25° C., the ink preferably has a viscosity of 50 mPa·s or less. When the viscosity of the ink satisfies such a range, higher ejection stability can be achieved.

Incidentally, the viscosity of the ink is a value measured with a viscometer.

As the viscometer, for example, VISCOMETER TV-22 (Toki Sangyo Co., Ltd.) can be used.

When the ink according to the present disclosure is a photocurable ink or a thermosetting ink, examples of particularly preferred forms include the following Forms 1 to 4.

Form 1

Form 1 is a photocurable ink in which the specified particles include a photopolymerizable monomer (preferably a radical-polymerizable monomer, which is hereafter the same), and the specified polymer is a chain polymer.

In Form 1, the chain polymer preferably has a Mw of 5000 or more. Regarding a more preferred range of Mw of the chain polymer, reference can be made to the above-described preferred range of the molecular weight of the specified polymer.

In Form 1, the photopolymerizable monomer preferably has a molecular weight of 100 to 4000. Regarding a more preferred range of the molecular weight of the photopolymerizable monomer, reference can be made to the above-described more preferred range of the molecular weight of the polymerizable monomer.

Form 2

Form 2 is a photocurable ink in which the specified particles include a photopolymerizable monomer (preferably a radical-polymerizable monomer, which is hereafter the same), and the specified polymer is a crosslinked polymer.

In Form 2, the specified particles are preferably microcapsules including a shell formed of a crosslinked polymer having a three-dimensional crosslinked structure, and a core including a photopolymerizable monomer.

In Form 2, the photopolymerizable monomer preferably has a molecular weight of 100 to 4000. Regarding a more preferred range of the molecular weight of the photopolymerizable monomer, reference can be made to the above-described more preferred range of the molecular weight of the polymerizable monomer.

Form 3

Form 3 is a thermosetting ink in which the specified particles include a thermal-polymerizable monomer, and the specified polymer is a chain polymer.

In Form 3, the chain polymer preferably has a Mw of 5000 or more. Regarding a more preferred range of Mw of the chain polymer, reference can be made to the above-described preferred range of the molecular weight of the specified polymer.

In Form 3, the thermal-polymerizable monomer preferably has a molecular weight of 100 to 4000. Regarding a more preferred range of the molecular weight of the thermal-polymerizable monomer, reference can be made to the above-described more preferred range of the molecular weight of the polymerizable monomer.

Form 4

Form 4 is a thermosetting ink in which the specified particles include a thermal-polymerizable monomer, and the specified polymer is a crosslinked polymer.

In Form 4, the specified particles are preferably microcapsules including a shell formed of a crosslinked polymer having a three-dimensional crosslinked structure, and a core including a thermal-polymerizable monomer.

In Form 4, the thermal-polymerizable monomer preferably has a molecular weight of 100 to 4000. Regarding a more preferred range of the molecular weight of the thermal-polymerizable monomer, reference can be made to the above-described more preferred range of the molecular weight of the polymerizable monomer.

Example of Method for Producing Ink (Production Method A)

The method for producing the ink according to the present disclosure is not particularly limited, but may be the following example (Production method A).

The Production method A has a step of mixing together an oil-phase component including an organic solvent, a polymer having an acid group (raw-material polymer), a photo-acid generator, and a specified sensitizer, and an aqueous-phase component including water and a neutralizer, and performing emulsification, to form the specified particles.

In the step of forming the specified particles, the above-described oil-phase component and aqueous-phase component are mixed together and the resultant mixture is emulsified to thereby form the specified particles. The formed specified particles function as a dispersoid in the ink produced.

Specifically, in the step of forming the specified particles, the acid groups of the raw-material polymer are partially neutralized to generate anionic groups, so that a polymer having an anionic group (namely, the specified polymer) is formed, and the specified particles including the formed specified polymer, a photo-acid generator, and a specified sensitizer are formed.

The water in the aqueous-phase component functions as a dispersion medium in the ink produced.

Examples of the organic solvent included in the oil-phase component include ethyl acetate and methyl ethyl ketone.

The organic solvent is preferably at least partially removed in the forming process of the specified particles or after formation of the specified particles.

The oil-phase component may include, in addition to the above-described components, for example, a sensitizing auxiliary, a polymerizable monomer, a radical polymerization initiator, a polymerizable-group-introducing compound (preferably, a compound having a polymerizable group and an active hydrogen group), or a polymerizable-group-introduced isocyanate compound.

In the case of performing the Production method A to produce a photocurable ink, the oil-phase component is prepared to include, for example, a radical polymerization initiator, and at least one selected from the group consisting of a radical-polymerizable monomer, a raw-material monomer having a radical-polymerizable group, and a specified monomer having a radical-polymerizable group.

In the case of performing the Production method A to produce a thermosetting ink, the oil-phase component is prepared to include, for example, a thermal-polymerizable monomer.

The aqueous-phase component is not particularly limited as long as it includes water and a neutralizer.

The preferred examples of the neutralizer are the same as those described above.

The aqueous-phase component may include, in addition to water and the neutralizer, another component.

In the Production method A, the total amount of the oil-phase component and the aqueous-phase component except for the organic solvent and water corresponds to the total solid-content amount of the specified particles in the ink produced.

Regarding preferred ranges of the amounts of components that can be used for the Production method A, reference can be made to the above-described section "Ink". This reference is made such that, in the above-described section "Ink", "content" and "the total solid-content amount of the specified particles" are respectively replaced by "usage amount" and "total amount of the oil-phase component and the aqueous-phase component except for the organic solvent and water".

In the step of forming the specified particles, the method of mixing together the oil-phase component and the aqueous-phase component is not particularly limited, but is, for example, mixing by stirring.

In the step of forming the specified particles, the method of performing emulsification is not particularly limited, but is, for example, emulsification using an emulsification device such as a homogenizer (for example, a dispersing device).

In the emulsification, the number of revolutions in the dispersing device is, for example, 5000 rpm to 20000 rpm, preferably 10000 rpm to 15000 rpm.

In the emulsification, the time for revolutions is, for example, 1 minute to 120 minutes, preferably 3 minutes to 60 minutes, more preferably 3 minutes to 30 minutes, still more preferably 5 minutes to 15 minutes.

In the step of forming the specified particles, emulsification may be performed under heating.

The emulsification under heating enables more efficient formation of the specified particles.

In addition, the emulsification under heating facilitates, from the mixture, removal of at least a portion of the organic solvent in the oil-phase component.

The heating temperature in the case of emulsification under heating is preferably 35° C. to 70° C., more preferably 40° C. to 60° C.

The step of forming the specified particles may include an emulsification step of emulsifying the mixture (at a temperature of less than 35° C., for example), and a heating step of heating (at a temperature of 35° C. or more, for example) the emulsion obtained by the emulsification step.

Such an embodiment in which the step of forming the specified particles includes the emulsification step and the heating step enables, particularly in the heating step, more efficient formation of the specified particles.

In addition, the embodiment in which the step of forming the specified particles includes the emulsification step and the heating step facilitates, particularly in the heating step, removal, from the mixture, at least a portion of the organic solvent in the oil-phase component.

The heating temperature in the heating step is preferably 35° C. to 70° C., more preferably 40° C. to 60° C.

In the heating step, the heating time is preferably 6 hours to 50 hours, more preferably 12 hours to 40 hours, still more preferably 15 hours to 35 hours.

The Production method A may have, in addition to the step of forming the specified particles, another step as needed.

The other step may be a step of adding other components (such as a pigment) after the step of forming the specified particles.

The other components (such as a pigment) added are the same as the above-described other components that can be contained in the ink.

Another Example of Method for Producing Ink (Production Method B)

The method for producing an ink containing specified particles including a crosslinked polymer is also preferably the following Production method B.

The Production method B is the same as the Production method A except that the oil-phase component is changed as described below, and preferred embodiments of the Production method B are also the same as those of the Production method A.

In the Production method B, the oil-phase component includes an organic solvent, a tri- or higher functional isocyanate compound, an acid-group-introduced isocyanate compound and/or acid-group-introducing compound, a photo-acid generator, and a specified sensitizer.

In the case of performing the Production method B to produce a photocurable ink, the oil-phase component is prepared to include, for example, a radical polymerization initiator, and at least one selected from the group consisting of a radical-polymerizable monomer, a radical-polymerizable-group-introducing compound, and a radical-polymerizable-group-introduced isocyanate compound.

In the case of performing the Production method B to produce a thermosetting ink, the oil-phase component is prepared to further include, for example, a thermal-polymerizable monomer.

In the Production method B, in the step of forming the specified particles, the oil-phase component and the aqueous-phase component are mixed together, and the resultant mixture is emulsified, which inferentially causes all the following reactions:

a reaction of forming a crosslinked polymer having a three-dimensional crosslinked structure and having an acid group (namely, shells of microcapsules) due to a reaction of a tri- or higher functional isocyanate compound, an acid-group-introduced isocyanate compound and/or acid-group-introducing compound, and water;

a neutralization reaction of an acid group (namely, a reaction of generating an anionic group) in an acid-group-introduced isocyanate compound, an acid-group-introducing compound, or a crosslinked polymer having a three-dimensional crosslinked structure and having an acid group; and a reaction of forming microcapsules including a shell including a crosslinked polymer having a three-dimensional crosslinked structure and having an acid group or a crosslinked polymer having a three-dimensional crosslinked structure and having an anionic group, and a core including a photo-acid generator and a specified sensitizer.

In the Production method B, in the step of forming the specified particles, the order of occurrence of the above-described reactions is not limited, and eventually, as the specified particles, microcapsules are formed that include a shell including a crosslinked polymer having a three-dimensional crosslinked structure and having an anionic group, and a core including a photo-acid generator and a specified sensitizer.

In the Production method B, the oil-phase component may include a dispersing agent for dispersing the microcapsules. In this case, in the Production method B, the step of forming the specified particles forms, as the specified particles, microcapsules covered with the dispersing agent (namely, a composite of the dispersing agent and microcapsules).

Image-Forming Method

A preferred example of an image-forming method using the above-described ink according to the present disclosure (hereafter, also referred to as "image-forming method X") is as follows.

The image-forming method X includes a step of applying, onto a substrate, the ink according to the present disclosure by an ink jet process to thereby form an ink film (hereafter, also referred to as "application step");

a step of irradiating the formed ink film with light (hereafter, also referred to as "light irradiation step"); and a step of heat-drying the ink film irradiated with light to obtain an image (hereafter, also referred to as "heat-drying step").

The image-forming method X may have another step as needed.

The image-forming method X forms an image having high definition.

In addition, the image-forming method X ensures high ejection stability for the ink.

Application Step

The application step is a step of applying, onto a substrate, the ink according to the present disclosure by an ink jet process to thereby form an ink film.

The substrate is not particularly limited and may be appropriately selected from, for example, publicly known substrates provided as support bodies and recording media.

Examples of the substrate include paper, paper laminated with plastic (such as polyethylene, polypropylene, or polystyrene), metal plates (plates of metals such as aluminum, zinc, or copper), plastic films [films of, for example, polyvinyl chloride (PVC: Polyvinyl Chloride) resin, cellulose diacetate, cellulose triacetate, cellulose propionate, cellulose butyrate, cellulose acetate butyrate, cellulose nitrate, polyethylene terephthalate (PET: Polyethylene Terephthalate), polyethylene (PE: Polyethylene), polystyrene (PS: Polystyrene), polypropylene (PP: Polypropylene), polycarbonate (PC: Polycarbonate), polyvinyl acetal, or acrylic resin], paper laminated with or vapor-deposition-coated with the foregoing metals, and plastic films laminated with or vapor-deposition-coated with the foregoing metals.

Other examples of the substrate include textile substrates.

Examples of the raw materials of the textile substrates include natural fibers such as cotton, silk, hemp, and wool; chemical fibers such as viscose rayon and lyocell; synthetic fibers such as polyester, polyamide, and acrylic; and mixtures of at least two species selected from the group consisting of natural fibers, chemical fibers, and synthetic fibers. The textile substrates may be textile substrates described in Paragraphs 0039 to 0042 of WO2015/158592A.

Preferred examples of the substrate include plastic substrates such as polyvinyl chloride (PVC) substrates, polystyrene (PS) substrates, polycarbonate (PC) substrates, polyethylene terephthalate (PET) substrates, polypropylene (PP) substrates, and acrylic resin substrates.

The application of the ink by an ink jet process can be performed with a publicly known ink jet recording apparatus.

The ink jet recording apparatus is not particularly limited, and a publicly known ink jet recording apparatus that provides a target resolution can be freely selected and used.

Such an ink jet recording apparatus is, for example, an apparatus including an ink supply device, a temperature sensor, and heating means.

The ink supply device includes, for example, a source tank including the ink according to the present disclosure, supply pipes, an ink supply tank disposed immediately upstream of an ink jet head, a filter, and a piezo ink jet head. The piezo ink jet head may be operated so as to eject multisize dots of preferably 1 µl to 100 µl, more preferably 8 µl to 30 µl, at a resolution of preferably 320 dpi (dot per inch)×320 dpi to 4000 dpi×4000 dpi, more preferably 400 dpi×400 dpi to 1600 dpi×1600 dpi, still more preferably 720 dpi×720 dpi. Incidentally, "dpi" represents the number of dots per 2.54 cm (1 inch).

Light Irradiation Step

The light irradiation step is a step of irradiating the formed ink film with light.

As a result, as described above, actions of the photo-acid generator and the specified sensitizer effectively thicken the ink film. The thickened ink film is heat-dried in a heat-drying step described later, to thereby form an image having high definition.

In the light irradiation step, the light used for irradiation of the ink film preferably has a peak wavelength of, from the viewpoint of effectively causing electroexcitation of the above-described specified sensitizer, 380 nm to 400 nm, particularly preferably 385 nm or 395 nm.

In the light irradiation step, from the viewpoint of effectively thickening the ink film, the ink film is preferably irradiated with ultraviolet radiation (UV light) emitted from an LED (Light Emitting Diode) light source.

In the light irradiation step, the light used for irradiation of the ink film preferably has an energy of 10 mJ/cm$^2$ to 300 mJ/cm$^2$, more preferably 15 mJ/cm$^2$ to 200 mJ/cm$^2$, still more preferably 20 mJ/cm$^2$ to 100 mJ/cm$^2$.

Heat-Drying Step

The heat-drying step is a step of subjecting, to heat-drying, the ink film irradiated with light in the above-described light irradiation step, to obtain an image.

In the image-forming method according to the present disclosure, in the case of using, as the ink according to the present disclosure, the above-described thermosetting ink, the heat-drying step may be performed to heat-cure the ink film (namely, thermal polymerization using the thermal-polymerizable monomer). Stated another way, in the case of using, as the ink according to the present disclosure, the above-described thermosetting ink, the heat-drying step may also serve as a curing step B described later.

The heating in the heat-drying step may be performed by heating, with heating means, the ink applied onto the substrate.

The heating means for the heat-drying is not particularly limited, and examples include a heating drum, hot air, an infrared lamp, an infrared LED, an infrared heater, a heating oven, a heating plate, an infrared laser, and an infrared dryer.

The heating temperature during the heat-drying is preferably 40° C. or more, more preferably 40° C. to 200° C., still more preferably 45° C. to 100° C., still more preferably 50° C. to 80° C., still more preferably 55° C. to 70° C.

The heating temperature is the temperature of the ink on the substrate, and can be measured with a thermograph using an infrared thermography apparatus H2640 (manufactured by Nippon Avionics Co., Ltd.).

The heating time can be appropriately set in accordance with, for example, the heating temperature, the composition of the ink, and printing speed. The heating time is preferably 5 seconds or more, more preferably 5 seconds to 5 minutes, more preferably 10 seconds to 1 minute, still more preferably 20 seconds to 1 minute.

Curing Step

In the image-forming method X, in the case of using a curable (photocurable or thermally curable) ink, the image-forming method X may have a curing step of curing the image obtained in the heat-drying step.

This curing step causes, in the ink film, a polymerization reaction (namely, a crosslinking reaction) to proceed due to the polymerizable group of the polymerizable monomer and/or polymer.

Thus, when the image-forming method X has the curing step, further improvements in the hardness and scratch resistance of the image can be achieved.

In the image-forming method X, in the case of using a photocurable ink, the curing step can be a curing step (hereafter, "curing step A") of subjecting the image obtained in the heat-drying step to irradiation with light, to thereby photocure the image.

In the image-forming method X, in the case of using a thermosetting ink, the curing step can be a curing step (hereafter, "curing step B") of subjecting the image obtained in the heat-drying step to heating or irradiation with infrared radiation, to thereby thermally cure the image.

However, in the case of using a thermosetting ink, this curing step B may be omitted and thermal curing may be achieved in the above-described heat-drying step.

Specifically, in the image-forming method X, in the case of using a thermosetting ink, the heat-drying step of heat-drying the ink film and the curing step B of thermally curing the image may be individually performed; alternatively, a single heat-drying step of achieving both of heat-drying and thermal curing of the ink film may be performed.

Curing Step A

The curing step A is a step of subjecting the image obtained in the heat-drying step to irradiation with light, to thereby photocure the image.

In the curing step A, the image is irradiated with light, to cause a photo-crosslinking reaction (namely a photopolymerization) of the specified particles in the image to proceed, to thereby increase the hardness of the image.

Examples of the light usable in the curing step A include ultraviolet radiation (UV light), visible light, and an electron beam; of these, UV light is preferred.

The light usable in the curing step A preferably has a peak wavelength of 200 nm to 405 nm, more preferably 220 nm to 390 nm, still more preferably 220 nm to 385 nm.

The peak wavelength is also preferably 200 nm to 310 nm, or preferably 200 nm to 280 nm.

In the curing step A, the energy of the light used for irradiation of the image is preferably 100 mJ/cm$^2$ to 4000 mJ/cm$^2$, more preferably 200 mJ/cm$^2$ to 3000 mJ/cm$^2$, still more preferably 300 mJ/cm$^2$ to 2500 mJ/cm$^2$.

During irradiation with light in the curing step A, the illuminance at the exposed surface is, for example, 10 mW/cm$^2$ to 2000 mW/cm$^2$, preferably 20 mW/cm$^2$ to 1000 mW/cm$^2$.

As sources for emitting the light in the curing step A, there are widely known sources such as a mercury lamp, a metal halide lamp, a UV fluorescent lamp, a gas laser, and a solid-state laser.

These light sources listed as examples may be replaced by semiconductor ultraviolet emission devices, which is industrially and environmentally advantageous.

Among semiconductor ultraviolet emission devices, LEDs (Light Emitting Diodes) and LDs (Laser Diodes), which are small, have long longevity and high efficiency, and are inexpensive, are considered as promising light sources.

Preferred light sources are a metal halide lamp, an ultrahigh pressure mercury lamp, a high pressure mercury lamp, a medium pressure mercury lamp, a low pressure mercury lamp, an LED, and a blue-violet laser.

Of these, in the case of using a sensitizer and a photopolymerization initiator in combination, more preferred is an ultrahigh pressure mercury lamp that emits light at a wavelength of 365 nm, 405 nm, or 436 nm, a high pressure mercury lamp that emits light at a wavelength of 365 nm, 405 nm, or 436 nm, or an LED that emits light at a wavelength of 355 nm, 365 nm, 385 nm, 395 nm, or 405 nm; most preferred is an LED that emits light at a wavelength of 355 nm, 365 nm, 385 nm, 395 nm, or 405 nm.

In the curing step A, the time for irradiating the image with light is, for example, 0.01 seconds to 120 seconds, preferably 0.1 seconds to 90 seconds.

As the irradiation conditions and the basic irradiation method, the irradiation conditions and the irradiation method disclosed in JP1985-132767A (JP-S60-132767A) can be similarly used.

A preferred mode of irradiation with light is specifically a mode in which both sides of a head unit including an ink ejection device are equipped with light sources, and the head unit and the light sources are used to perform scanning by, what is called, the shuttle mode; or a mode of irradiation with light using another light source without being driven.

The irradiation with light in the curing step A is preferably performed after the lapse of a certain time (for example, 0.01 seconds to 120 seconds, preferably 0.01 seconds to 60 seconds) from heat-drying of the ink film.

Curing Step B

The curing step B is a step of subjecting the image obtained in the heat-drying step to heating or irradiation with infrared radiation, to thereby thermally cure the ink film.

In the curing step B, the image is subjected to heating or irradiation with infrared radiation, to cause a thermal-crosslinking reaction (namely, thermal polymerization) of the specified particles in the image to proceed, to thereby increase the hardness of the image.

Preferred examples of the curing step B are the same as the preferred examples of the heating step.

EXAMPLES

Hereinafter, Examples according to the present disclosure will be described; however, the present disclosure is not limited to the following Examples.

Hereafter, "part" represents part by mass unless otherwise specified.

Synthesis of Raw-Material Polymer

As raw-material polymers (specifically, polymers having an acid group and serving as raw materials for specified polymers), polymers P-1 to P-3 and polymer P-a described below were synthesized.

Polymers P-1 to P-3 and polymer P-a are all chain polymers.

Specifically, polymers P-1 to P-3 are urethane polymers, and polymer P-a is an acrylic polymer.

In these polymers P-1 to P-3 and polymer P-a, the acid groups (specifically, carboxy groups) are partially neutralized in the stage of mixing together the oil-phase component and the aqueous-phase component described later, and turned into anionic groups (specifically, carboxylate groups). This neutralization forms specified polymers (specifically, polymers having carboxylate groups, which are anionic groups).

Synthesis of Polymer P-1

In accordance with the following reaction scheme, polymer P-1 having an acid group and a photopolymerizable group was synthesized.

Incidentally, polymer P-1 was used not only as a raw material for particles but also as a dispersing agent for microcapsules in Example 307.

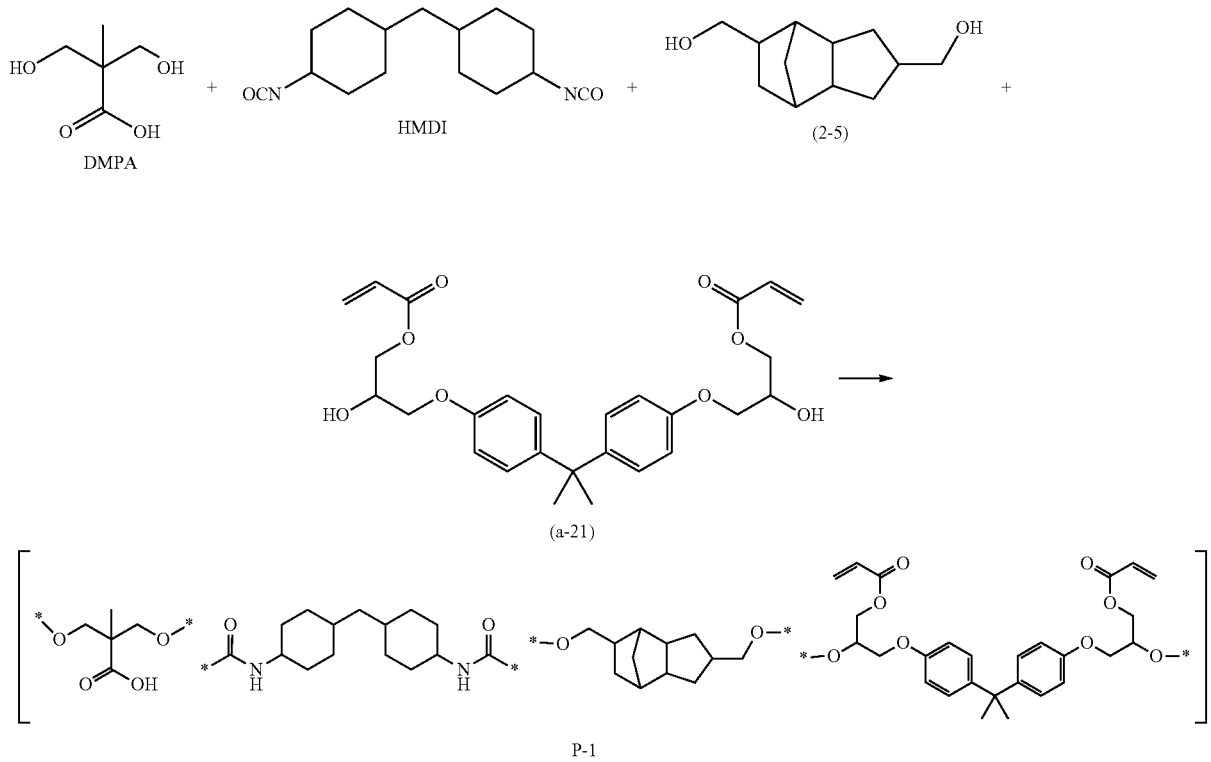

To a three-neck flask, dicyclohexylmethane-4,4'-diisocyanate (HMDI) (137.4 g), dimethylolpropionic acid (DMPA) (25.48 g), tricyclodecanedimethanol (Compound (2-5)) (19.6 g), bisphenol A epoxy diacrylate (Compound (a-21)) (101.7 g), and ethyl acetate (182.5 g) were charged, and heated at 70° C. To this, 0.36 g of NEOSTANN U-600 (manufactured by Nitto Kasei Co., Ltd., inorganic bismuth catalyst; hereafter, also referred to as "U-600") was added, and stirred at 70° C. for 5 hours.

Subsequently, to this, isopropyl alcohol (199 g) serving as an end capping agent and ethyl acetate (444.7 g) were added, and stirred at 70° C. for 3 hours. After the stirring for 3 hours, the reaction solution was left to cool to room temperature, and subsequently subjected to concentration adjustment using ethyl acetate, to thereby obtain a 30 mass % solution of polymer P-1 (solvent: ethyl acetate).

Polymer P-1 was found to have a weight-average molecular weight (Mw) of 8000, and an acid value of 0.65 mmol/g.

Synthesis of Polymer P-2

In accordance with the following reaction scheme, polymer P-2 having an acid group and a photopolymerizable group was synthesized.

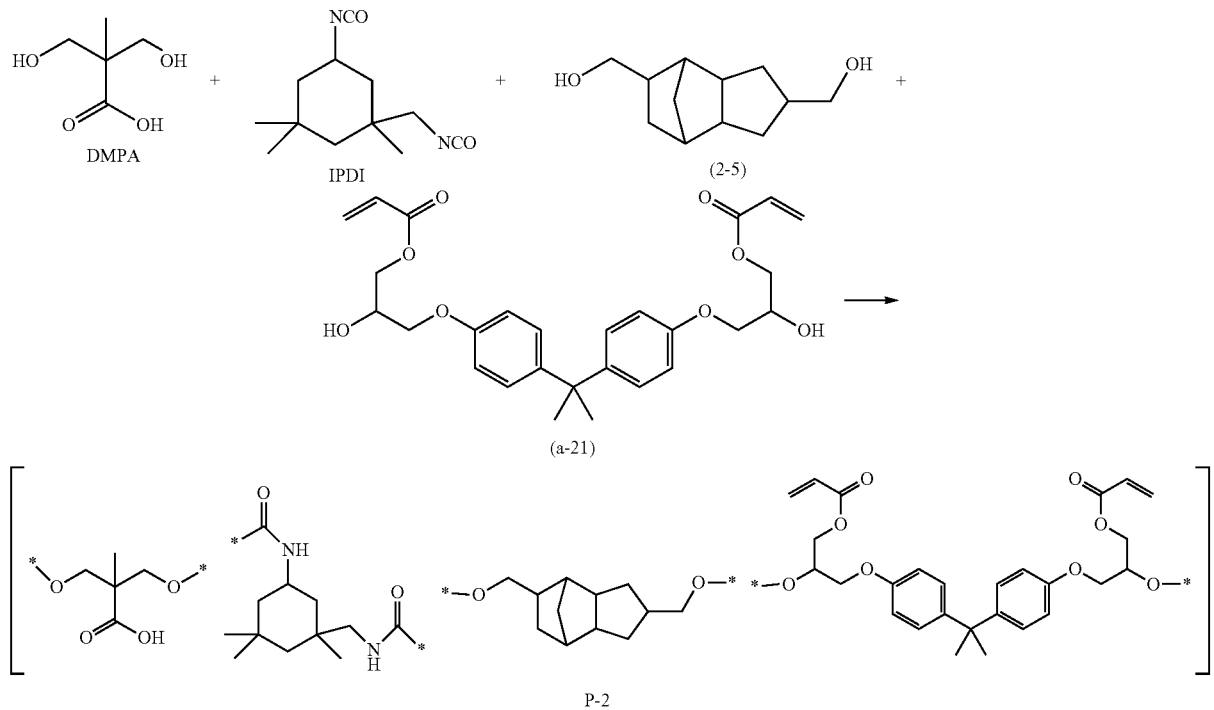

To a three-neck flask, isophorone diisocyanate (IPDI) (116.4 g), dimethylolpropionic acid (DMPA) (25.48 g), tricyclodecanedimethanol (Compound (2-5)) (24.1 g), bisphenol A epoxy diacrylate (Compound (a-21)) (101.7 g), and ethyl acetate (161.4 g) were charged, and heated at 70° C. To this, 0.32 g of NEOSTANN U-600 (manufactured by Nitto Kasei Co., Ltd., inorganic bismuth catalyst; hereafter, also referred to as "U-600") was added, and stirred at 70° C. for 5 hours.

Subsequently, to this, isopropyl alcohol (184.3 g) serving as an end capping agent, and ethyl acetate (410.44 g) were added, and stirred at 70° C. for 3 hours. After the stirring for 3 hours, the reaction solution was left to cool to room temperature, and subsequently subjected to concentration adjustment using ethyl acetate, to thereby obtain a 30 mass % solution of polymer P-2 (solvent: ethyl acetate).

Polymer P-2 was found to have a weight-average molecular weight (Mw) of 8000 and an acid value of 0.65 mmol/g.

Synthesis of Polymer P-3

In accordance with the following reaction scheme, polymer P-3 having an acid group and not having a photopolymerizable group was synthesized.

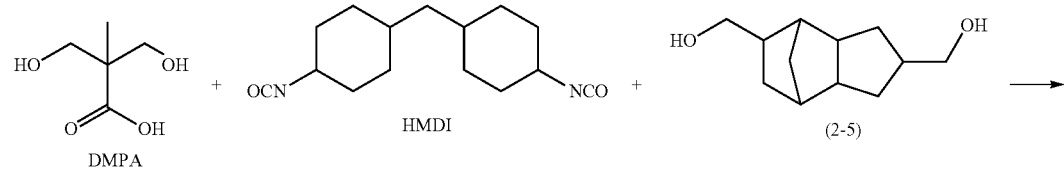

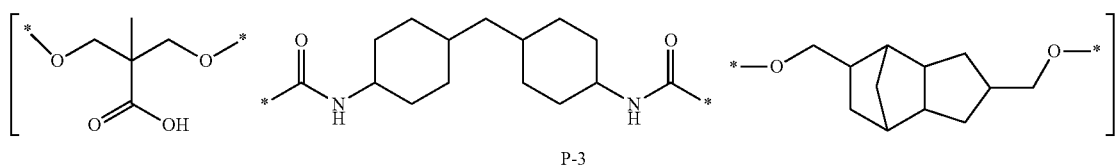

To a three-neck flask, dicyclohexylmethane-4,4'-diisocyanate (HMDI) (137.4 g), dimethylolpropionic acid (DMPA) (20.8 g), tricyclodecanedimethanol (Compound (2-5)) (60.8 g), and ethyl acetate (219.1 g) were charged, and heated at 70° C. To this, 0.43 g of U-600 was added, and stirred at 70° C. for 5 hours.

Subsequently, to this, isopropyl alcohol (IPA) (165.2 g) serving as an end capping agent, and ethyl acetate (324.6 g) were added, and stirred at 70° C. for 3 hours. After the stirring for 3 hours, the reaction solution was left to cool to room temperature, and subsequently subjected to concentration adjustment using ethyl acetate, to thereby obtain a 30 mass % solution of polymer P-3 (solvent: ethyl acetate).

Polymer P-3 was found to have a weight-average molecular weight (Mw) of 8000, and an acid value of 0.65 mmol/g.

Synthesis of Polymer P-a

The following polymer P-a having an acid group and not having a photopolymerizable group was synthesized.

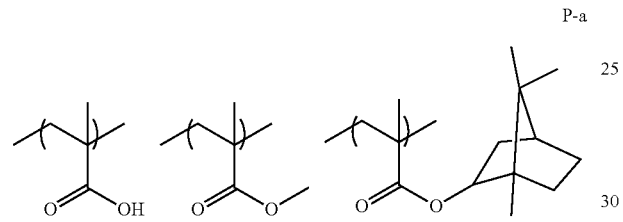

P-a

To a three-neck flask, 1-methoxy-2-propanol (93.0 g) was charged, and stirred under a stream of nitrogen at 10 mL/min, at 75° C. for 30 minutes. To this, a mixture of methacrylic acid (8.7 g), methyl methacrylate (30.0 g), isobornyl methacrylate (111.3 g), V-601 (manufactured by Wako Pure Chemical Industries, Ltd., dimethyl 2,2'-azobis (2-methylpropionic acid)) (4.15 g), dodecyl mercaptan (0.91 g), and 1-methoxy-2-propanol (57.7 g) was added dropwise for 2 hours. After completion of the dropwise addition, stirring at 75° C. for 2 hours was performed. The resultant reaction solution was left to cool to room temperature, and subsequently poured into a mixture of 200 mL of water and 20 mL of acetone. The precipitated powder was collected by filtration, and dried in an oven at 60° C. for 6 hours. The obtained powder was subjected to concentration adjustment by addition of ethyl acetate, to thereby obtain a 30 mass % solution of polymer P-a (methacrylic acid/methyl methacrylate/isobornyl methacrylate (=5.8/20/74.2 [mass ratio]) copolymer) (solvent: ethyl acetate).

Polymer P-a was found to have a weight-average molecular weight (Mw) of 20000, and an acid value of 0.65 mmol/g.

Preparation of Sensitizers

The following sensitizers were prepared:

ITX is an example of the compound represented by Formula (S1) (in Table 1-2 and Table 2-2, described as classification "S1");

TC is an example of the compound represented by Formula (S2) (in Table 1-2 and Table 2-2, described as classification "S2"); and DBA is an example of the compound represented by Formula (S3) (in Table 1-2 and Table 2-2, described as classification "S3").

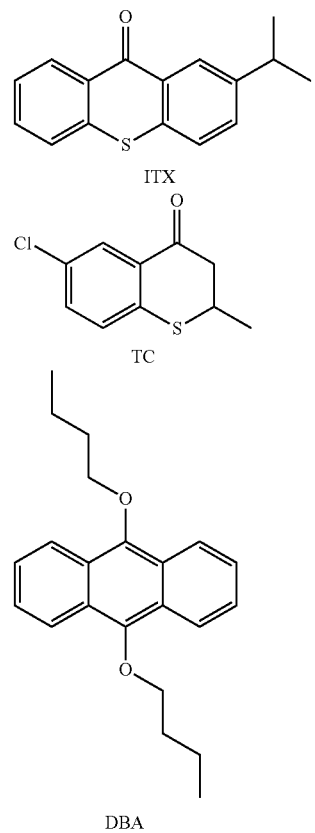

Preparation of Photo-Acid Generators

The following photo-acid generators were prepared.

In the following description,

PAG-2 is an example of the compound represented by Formula (G1) (in Table 1-1 and Table 2-1, described as classification "G1"), PAG-5, PAG-7, PAG-9, and PAG-11 are examples of the compound represented by Formula (G2) (in Table 1-1 and Table 2-1, described as classification "G2"), and PAG-13 is an example of another photo-acid generator other than the compound represented by Formula (G1) and the compound represented by Formula (G2) (in Table 1-1 and Table 2-1, described as classification "Other").

The species of X⁻ of the compounds are described in Table 1-1 to Table 5-1.

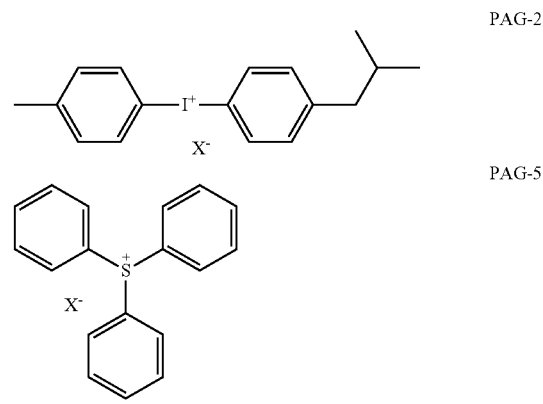

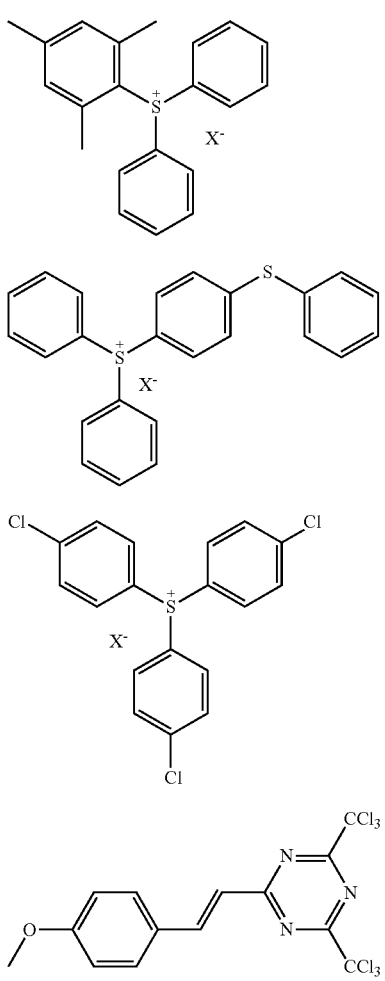

PAG-7

PAG-9

PAG-11

PAG-13

Preparation of Sensitizing Auxiliary

As a raw material for particles in some of Examples, the following sensitizing auxiliary was prepared.

MNT is an example of the compound represented by Formula (SA).

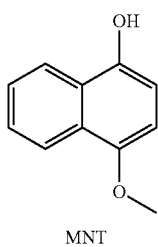

MNT

Example 101: Photocurable Ink

Preparation of Aqueous Dispersion
Preparation of Oil-Phase Component

A mixed solution of ethyl acetate and ethanol (ethyl acetate:ethanol (mass ratio)=10:1),
  a 30 mass % solution of polymer P-1 (raw-material polymer) (50 parts as the amount of polymer P-1),
  a radical-polymerizable monomer SR833S (21 parts; hereafter, also referred to as "S833") manufactured by Sartomer,
  a radical-polymerizable monomer SR399E (18.5 parts; hereafter, also referred to as "S399") manufactured by Sartomer,
  a radical polymerization initiator IRGACURE (registered trademark) 819 (3 parts; hereafter, also referred to as "IRG819") manufactured by BASF,
  ITX (2.5 parts) serving as a sensitizer, and
  PAG-13 (5 parts) serving as a photo-acid generator,
  were mixed together, and stirred for 15 minutes, to thereby obtain 44 g of an oil-phase component having a solid content of 36 mass %.

S833 is a bifunctional radical-polymerizable monomer having a ring structure, specifically tricyclodecanedimethanol diacrylate (molecular weight: 304).

S399 is a pentafunctional radical-polymerizable monomer not having a ring structure, specifically dipentaerythritol pentaacrylate (molecular weight: 525).

IRG819 is an acylphosphine oxide-based radical polymerization initiator, specifically bis(2,4,6-trimethylbenzoyl)-phenylphosphine oxide.

Preparation of Aqueous-Phase Component

Distilled water (45 g) and sodium hydroxide serving as a neutralizer were mixed together, and stirred for 15 minutes, to thereby prepare an aqueous-phase component.

The amount of sodium hydroxide used as a neutralizer was adjusted such that the specified polymer (specifically, the specified polymer formed by neutralization of polymer P-1) would have a neutralization degree of 50%.

The oil-phase component and the aqueous-phase component were mixed together, and the resultant mixture was emulsified at 25° C. using a homogenizer at 18000 rpm for 10 minutes, to obtain an emulsion. The obtained emulsion was added to distilled water (25 g), and the resultant liquid was stirred at room temperature for 30 minutes. Subsequently, this liquid was heated at 50° C., and stirred at 50° C. for 6 hours, to thereby drive off, from the liquid, ethyl acetate and ethanol.

The liquid from which ethyl acetate and ethanol had been driven off was further stirred at 50° C. for 24 hours, to thereby form, in the liquid, the specified particles.

Subsequently, this liquid including the specified particles was diluted with distilled water so as to have a solid content of 20 mass %, to thereby obtain an aqueous dispersion of the specified particles.

Polymer P-1 serving as a raw-material polymer is neutralized in the forming process of the particles (specifically, during a process after the mixing of the oil-phase component and the aqueous-phase component).

The specified particles include the specified polymer formed by neutralization of polymer P-1 (chain polymer having a carboxylate group as an anionic group).

Polymer P-1 serving as a raw-material polymer and the chain polymer formed by neutralization are both chain urethane polymers.

Preparation of Photocurable Ink

The components of the following composition were mixed together to prepare a photocurable ink.
Composition of Photocurable Ink
  Aqueous dispersion described above: 82 parts
  Pigment dispersion liquid (Pro-jet Cyan APS1000 (manufactured by FUJIFILM Imaging Colorants, Inc.), pigment concentration: 14 mass %): 13 parts Fluorosurfactant (manufactured by E. I. du Pont de Nemours and Company, Capstone FS-31, solid content: 25 mass %): 0.3 parts 2-Methylpropanediol: 4.7 parts In the obtained ink, the intra-particle anion value A (mmol/g), which is the number of millimoles of the anionic group per 1 g of the specified particles, the intra-particle photo-acid generator amount G (mmol/g), which is the number of millimoles of the photo-acid generator per 1 g of the specified particles, and the value obtained by subtracting the intra-particle photo-acid generator amount G from the intra-particle anion value A (namely, "difference [A−G]") are described in Table 1-2.

Evaluations

The photocurable ink obtained above was evaluated in the following manner.

The results are described in Table 1-2.

Ejection Stability

The photocurable ink stored at room temperature within 1 day from preparation was ejected through the head of an ink jet printer (manufactured by Roland DG Corporation, SP-300V) for 30 minutes, and then the ejection was terminated.

After predetermined times (specifically, a plurality of times of 5 minutes, 8 minutes, and 10 minutes) elapsed from the termination of ejection, the ink was again ejected through the head onto the substrate to form 5 cm×5 cm solid images.

As the substrate, CORREX, which is a polypropylene (PP) substrate manufactured by DUROplastic Technologies, was employed.

These images were visually inspected for missing dots due to, for example, nozzles turned into a non-ejection state, and ink ejection stability was evaluated in accordance with the following evaluation grades.

Among the following evaluation grades, A represents the highest ink ejection stability.

Evaluation Grades of Ejection Stability

A: No missing dots due to, for example, nozzles turned into a non-ejection state were found even at the time of evaluation of ejection after 10 minutes elapsed from the termination of ejection, and good images were obtained.

B: No missing dots due to, for example, nozzles turned into a non-ejection state were found at the time of evaluation of ejection after 8 minutes elapsed from the termination of ejection, and good images were obtained; however, nozzles were turned into a non-ejection state at the time of evaluation of ejection after 10 minutes elapsed from the termination of ejection, and missing dots were found.

C: No missing dots due to, for example, nozzles turned into a non-ejection state were found at the time of evaluation of ejection after 5 minutes elapsed from the termination of ejection, and good images were obtained; however, nozzles were turned into a non-ejection state at the time of evaluation of ejection after 8 minutes elapsed from the termination of ejection, and missing dots were found.

D: Nozzles were turned into a non-ejection state at the time of evaluation of ejection after 5 minutes elapsed from the termination of ejection, and missing dots were found.

Definition of Image

To the substrate, the photocurable ink was ejected through the head of the above-described ink jet printer, to form character images corresponding to FIG. 1 so as to have sizes of 5 points, 6 points, 7 points, 8 points, and 10 points.

The character images formed to have the sizes were irradiated with ultraviolet light (UV light) at a wavelength of 385 nm from an LED light source.

As the LED light source, a 385 nm UV-LED irradiation device for experimental use (manufactured by CCS Inc.) was employed. The energy (exposure energy) of UV light used for the irradiation was set to 50 mJ/cm$^2$.

Subsequently, the character images having the sizes and irradiated with UV light were heat-dried at 60° C. for 3 minutes. The heat-drying was performed by hot-air drying.

The heat-dried character images corresponding to FIG. 1 and formed with the sizes were observed with a craft loupe (manufactured by ETSUMI CO., LTD.) at a magnification of 10. The observation result was evaluated, in terms of definition of the image, in accordance with the following evaluation grades. Among the following evaluation grades, A represents the highest definition of the image.

Evaluation Grades of Definition of Image

A: The character image corresponding to FIG. 1 and having the size of 5 points was formed without illegible lettering or bleeding.

B: The character image corresponding to FIG. 1 and having the size of 6 points was formed without illegible lettering or bleeding (however, B excludes cases evaluated as A).

C: The character image corresponding to FIG. 1 and having the size of 7 points was formed without illegible lettering or bleeding (however, C excludes cases evaluated as A and B).

D: The character image corresponding to FIG. 1 and having the size of 8 points was formed without illegible lettering or bleeding (however, D excludes cases evaluated as A to C).

E: The character image corresponding to FIG. 1 and having the size of 10 points was formed without illegible lettering or bleeding (however, E excludes cases evaluated as A to D).

F: The character image corresponding to FIG. 1 and having the size of 10 points was formed with illegible lettering or bleeding.

Pencil Hardness of Cured Film

The same procedures as in the evaluation of definition of images were performed except that, instead of the character images having the sizes, a solid image was formed, to obtain a solid image having been subjected to, in sequence, irradiation with UV light from the LED light source and heat-drying.

The heat-dried solid image was irradiated with UV light from a metal-halide-lamp light source, to thereby cure the solid image to obtain a cured film.

The irradiation with UV light from the metal-halide-lamp light source was performed using a UV mini conveyor apparatus CSOT for experimental use (manufactured by GS Yuasa Power Supply Ltd.) including, as a light source, an ozoneless metal halide lamp MAN250L, and set at a conveyor speed of 35 m/min and an exposure intensity (intensity of UV light) of 1.0 W/cm$^2$.

The energy of UV light used for irradiation and emitted from the metal-halide-lamp light source was set to 1000 mJ/cm$^2$.

The cured film was measured in terms of pencil hardness in accordance with JIS K5600-5-4 (1999).

The pencil employed for the measurement of pencil hardness was UNI (registered trademark) manufactured by Mitsubishi Pencil Co., Ltd.

Scratch Resistance of Cured Film

A cured film formed as in the evaluation of pencil hardness was subjected to a scratch test under the following conditions.

Conditions of Scratch Test

Instrument: Reciprocating Abraser "TYPE 30S", manufactured by HEIDON

Scratch stylus: an SUS (stainless steel) scratch stylus having a tip having a radius of curvature of 1.0 mm Load: two conditions of 100 g and 200 g Scratching speed: 3000 mm/min Number of scratching performed: 5 strokes After the scratch test was performed, the surface of the cured film was visually observed, and the scratch resistance of the cured film was evaluated in accordance with the following evaluation grades.

Among the following evaluation grades, A represents the highest scratch resistance of the cured film.

Evaluation Grades of Scratch Resistance of Cured Film

A: After 5 strokes, no scratch marks were observed in the cured film under each of the load conditions of 100 g and 200 g.

B: After 5 strokes, no scratch marks were observed in the cured film under the load condition of 100 g; however, scratch marks were slightly observed in the cured film under the load condition of 200 g.

C: After 5 strokes, scratch marks were slightly observed in the cured film under the load condition of 100 g.

D: After 5 strokes, scratch marks were clearly observed in the cured film under the load condition of 100 g.

Examples 102 to 107: Photocurable Inks

The same procedures as in Example 101 were performed except that, in the preparation of the aqueous dispersion, the combination of the species of the photo-acid generator (including the species of X$^-$) and the species of the sensitizer was changed as described in Tables 1-1 and 1-2.

The results are described in Table 1-2.

Example 108: Photocurable Ink

The same procedures as in Example 105 were performed except that, in the preparation of the aqueous dispersion, a sensitizing auxiliary whose species and amount are described in Table 1-2 was further added, and the amount of radical-polymerizable monomer S833 was changed as described in Table 1-1.

The results are described in Table 1-2.

Example 109: Photocurable Ink

The same procedures as in Example 108 were performed except that, in the preparation of the aqueous dispersion, the species of the sensitizer was changed as described in Table 1-2.

The results are described in Table 1-2.

Examples 110, 111, and 116: Photocurable Inks

The same procedures as in Example 108 were performed except that, in the preparation of the aqueous dispersion, the species of the raw-material polymer was changed as described in Table 1-1.

The results are described in Table 1-2.

Example 112: Photocurable Ink

The same procedures as in Example 108 were performed except that, in the preparation of the aqueous dispersion, the radical polymerization initiator was not used, and the amount of radical-polymerizable monomer S833 was changed as described in Table 1-1.

The results are described in Table 1-2.

Examples 113 to 115: Photocurable Inks

The same procedures as in Example 108 were performed except that, in the preparation of the aqueous dispersion, the species of the photo-acid generator (including the species of X$^-$) was changed as described in Table 1-1.

The results are described in Table 1-2.

Examples 117 to 126 and Comparative Examples 101 and 102: Photocurable Inks

The same procedures as in Example 108 were performed except that, in the preparation of the aqueous dispersion, the combination of the amount of raw-material polymer, the neutralization degree of the specified polymer, the amount of photo-acid generator, and the amount of radical-polymerizable monomer was changed as described in Table 2-1, so that the difference [A–G] (value obtained by subtracting the intra-particle photo-acid generator amount G from the intra-particle anion value A) was changed as described in Table 2-2.

The results are described in Table 2-2.

TABLE 1-1

| | Photocurable ink containing particles All solid contents of particles (amounts are described in parts by mass) | | | | | | | | | | | | | | |
|---|---|---|---|---|---|---|---|---|---|---|---|---|---|---|---|
| | Polymer | | | | | Radical-polymerizable monomer | | Radical-polymerizable monomer | | Radical polymerization initiator | | Photo-acid generator | | | |
| | Species | Amount | Acid value (mmol/g) | Neutralization degree | Anion value (mmol/g) | Species | Amount | Species | Amount | Species | Amount | Species | Classification | X$^-$ | Amount | Mw |
| Example 101 | P-1 | 50 | 0.65 | 50% | 0.33 | S833 | 21 | S399 | 18.5 | IRG 819 | 3 | PAG-13 | Other | — | 5 | 448 |
| Example 102 | P-1 | 50 | 0.65 | 50% | 0.33 | S833 | 21 | S399 | 18.5 | IRG 819 | 3 | PAG-2 | G1 | BF4 | 5 | 438 |
| Example 103 | P-1 | 50 | 0.65 | 50% | 0.33 | S833 | 21 | S399 | 18.5 | IRG 819 | 3 | PAG-9 | G2 | BF4 | 5 | 458 |
| Example 104 | P-1 | 50 | 0.65 | 50% | 0.33 | S833 | 21 | S399 | 18.5 | IRG 819 | 3 | PAG-9 | G2 | CF3SO3 | 5 | 521 |

TABLE 1-1-continued

| | Photocurable ink containing particles All solid contents of particles (amounts are described in parts by mass) | | | | | | | | | | | | | |
|---|---|---|---|---|---|---|---|---|---|---|---|---|---|---|
| | Polymer | | | | Radical-polymerizable monomer | | Radical-polymerizable monomer | | Radical polymerization initiator | | Photo-acid generator | | | |
| | Species | Amount | Acid value (mmol/g) | Neutralization degree | Anion value (mmol/g) | Species | Amount | Species | Amount | Species | Amount | Species | Classification | X⁻ | Amount | Mw |
| Example 105 | P-1 | 50 | 0.65 | 50% | 0.33 | S833 | 21 | S399 | 18.5 | IRG 819 | 3 | PAG-9 | G2 | PF6 | 5 | 516 |
| Example 106 | P-1 | 50 | 0.65 | 50% | 0.33 | S833 | 21 | S399 | 18.5 | IRG 819 | 3 | PAG-9 | G2 | PF6 | 5 | 516 |
| Example 107 | P-1 | 50 | 0.65 | 50% | 0.33 | S833 | 21 | S399 | 18.5 | IRG 819 | 3 | PAG-9 | G2 | PF6 | 5 | 516 |
| Example 108 | P-1 | 50 | 0.65 | 50% | 0.33 | S833 | 20 | S399 | 18.5 | IRG 819 | 3 | PAG-9 | G2 | PF6 | 5 | 516 |
| Example 109 | P-1 | 50 | 0.65 | 50% | 0.33 | S833 | 20 | S399 | 18.5 | IRG 819 | 3 | PAG-9 | G2 | PF6 | 5 | 516 |
| Example 110 | P-2 | 50 | 0.65 | 50% | 0.33 | S833 | 20 | S399 | 18.5 | IRG 819 | 3 | PAG-9 | G2 | PF6 | 5 | 516 |
| Example 111 | P-3 | 50 | 0.65 | 50% | 0.33 | S833 | 20 | S399 | 18.5 | IRG 819 | 3 | PAG-9 | G2 | PF6 | 5 | 516 |
| Example 112 | P-1 | 50 | 0.65 | 50% | 0.33 | S833 | 23 | S399 | 18.5 | — | 0 | PAG-9 | G2 | PF6 | 5 | 516 |
| Example 113 | P-1 | 50 | 0.65 | 50% | 0.33 | S833 | 20 | S399 | 18.5 | IRG 819 | 3 | PAG-5 | G2 | PF6 | 5 | 408 |
| Example 114 | P-1 | 50 | 0.65 | 50% | 0.33 | S833 | 20 | S399 | 18.5 | IRG 819 | 3 | PAG-7 | G2 | PF6 | 5 | 450 |
| Example 115 | P-1 | 50 | 0.65 | 50% | 0.33 | S833 | 20 | S399 | 18.5 | IRG 819 | 3 | PAG-11 | G2 | PF6 | 5 | 510 |
| Example 116 | P-a | 50 | 0.65 | 50% | 0.33 | S833 | 20 | S399 | 18.5 | IRG 819 | 3 | PAG-9 | G2 | PF6 | 5 | 516 |

TABLE 1-2

| | Photocurable ink containing particles | | | | | | | | | | | |
|---|---|---|---|---|---|---|---|---|---|---|---|---|
| | All solid contents of particles (amounts are described in parts by mass) | | | | | Intra-particle anion value A (mmol/g) | Intra-particle photo-acid generator amount G (mmol/g) | Difference [A − G] | Evaluation results | | | |
| | Sensitizer | | | Sensitizing auxiliary | | | | | | | | |
| | Species | Classification | Amount | Species | Amount | Total amount | | | | Ejection stability | Definition of image | Pencil hairiness | Scratch resistance |
| Example 101 | ITX | S1 | 2.5 | — | 0 | 100 | 0.16 | 0.11 | 0.05 | A | E | 2H | A |
| Example 102 | ITX | S1 | 2.5 | — | 0 | 100 | 0.16 | 0.11 | 0.05 | A | D | 2H | A |
| Example 103 | ITX | S1 | 2.5 | — | 0 | 100 | 0.16 | 0.11 | 0.05 | A | C | 2H | A |
| Example 104 | ITX | S1 | 2.5 | — | 0 | 100 | 0.16 | 0.10 | 0.06 | A | B | 2H | A |
| Example 105 | ITX | S1 | 2.5 | — | 0 | 100 | 0.16 | 0.10 | 0.06 | A | B | 2H | A |
| Example 106 | DBA | S3 | 2.5 | — | 0 | 100 | 0.16 | 0.10 | 0.06 | A | C | 2H | A |
| Example 107 | TC | S2 | 2.5 | — | 0 | 100 | 0.16 | 0.10 | 0.06 | A | C | 2H | A |
| Example 108 | ITX | S1 | 2.5 | MNT | 1 | 100 | 0.16 | 0.10 | 0.06 | A | A | 2H | A |
| Example 109 | DBA | S3 | 2.5 | MNT | 1 | 100 | 0.16 | 0.10 | 0.06 | A | B | 2H | A |
| Example 110 | ITX | S1 | 2.5 | MNT | 1 | 100 | 0.16 | 0.10 | 0.06 | A | B | 2H | A |
| Example 111 | ITX | S1 | 2.5 | MNT | 1 | 100 | 0.16 | 0.10 | 0.06 | A | B | H | B |
| Example 112 | ITX | S1 | 2.5 | MNT | 1 | 100 | 0.16 | 0.10 | 0.06 | A | A | H | B |
| Example 113 | ITX | S1 | 2.5 | MNT | 1 | 100 | 0.16 | 0.12 | 0.04 | A | A | 2H | A |

TABLE 1-2-continued

Photocurable ink containing particles

| | All solid contents of particles (amounts are described in parts by mass) | | | | | Intra-particle anion value A (mmol/g) | Intra-particle photo-acid generator amount G (mmol/g) | Difference [A − G] | Evaluation results | | | |
|---|---|---|---|---|---|---|---|---|---|---|---|---|
| | Sensitizer | | | Sensitizing auxiliary | | | | | | Definition of image | Pencil hairiness | Scratch resistance |
| | Species | Classification | Amount | Species | Amount | Total amount | | | | Ejection stability | | |
| Example 114 | ITX | S1 | 2.5 | MNT | 1 | 100 | 0.16 | 0.11 | 0.05 | A | A | 2H | A |
| Example 115 | ITX | S1 | 2.5 | MNT | 1 | 100 | 0.16 | 0.10 | 0.06 | A | A | 2H | A |
| Example 116 | ITX | S1 | 2.5 | MNT | 1 | 100 | 0.16 | 0.10 | 0.06 | A | A | H | B |

TABLE 2-1

Photocurable ink containing particles
All solid contents of particles (amounts are described in parts by mass)

| | Polymer | | | | | Radical-polymerizable monomer | | Radical-polymerizable monomer | | Radical polymerization initiator | | Photo-acid generator | | | | |
|---|---|---|---|---|---|---|---|---|---|---|---|---|---|---|---|---|
| | Species | Amount | Acid value (mmol/g) | Neutralization degree | Anion value (mmol/g) | Species | Amount | Species | Amount | Species | Amount | Species | Classification | X⁻ | Amount | Mw |
| Example 117 | P-1 | 50 | 0.65 | 70% | 0.46 | S833 | 20 | S399 | 18.5 | IRG 819 | 3 | PAG-9 | G2 | PF6 | 5 | 516 |
| Example 118 | P-1 | 50 | 0.65 | 85% | 0.55 | S833 | 20 | S399 | 18.5 | IRG 819 | 3 | PAG-9 | G2 | PF6 | 5 | 516 |
| Example 119 | P-1 | 50 | 0.75 | 50% | 0.38 | S833 | 20 | S399 | 18.5 | IRG 819 | 3 | PAG-9 | G2 | PF6 | 5 | 516 |
| Example 120 | P-1 | 50 | 0.80 | 65% | 0.52 | S833 | 20 | S399 | 18.5 | IRG 819 | 3 | PAG-9 | G2 | PF6 | 5 | 516 |
| Example 121 | P-1 | 60 | 0.65 | 50% | 0.33 | S833 | 15 | S399 | 13.5 | IRG 819 | 3 | PAG-9 | G2 | PF6 | 5 | 516 |
| Example 122 | P-1 | 70 | 0.65 | 50% | 0.33 | S833 | 10 | S399 | 8.5 | IRG 819 | 3 | PAG-9 | G2 | PF6 | 5 | 516 |
| Example 123 | P-1 | 50 | 0.65 | 50% | 0.33 | S833 | 27 | S399 | 8.5 | IRG 819 | 3 | PAG-9 | G2 | PF6 | 8 | 516 |
| Example 124 | P-1 | 40 | 0.50 | 50% | 0.25 | S833 | 34 | S399 | 9.5 | IRG 819 | 3 | PAG-9 | G2 | PF6 | 10 | 516 |
| Example 125 | P-1 | 40 | 0.50 | 50% | 0.25 | S833 | 32 | S399 | 8.5 | IRG 819 | 3 | PAG-9 | G2 | PF6 | 13 | 516 |
| Example 126 | P-1 | 40 | 0.50 | 50% | 0.25 | S833 | 31 | S399 | 8.5 | IRG 819 | 3 | PAG-9 | G2 | PF6 | 14 | 516 |
| Comparative Example 101 | P-1 | 50 | 0.65 | 100% | 0.65 | S833 | 20 | S399 | 18.5 | IRG 819 | 3 | PAG-9 | G2 | PF6 | 5 | 516 |
| Comparative Example 102 | P-1 | 30 | 0.40 | 30% | 0.12 | S833 | 36 | S399 | 14.5 | IRG 819 | 3 | PAG-9 | G2 | PF6 | 13 | 516 |

TABLE 2-2

Photocurable ink containing particles

| | All solid contents of particles (amounts are described in parts by mass) | | | | | Intra-particle anion value A (mmol/g) | Intra-particle photo-acid generator amount G (mmol/g) | Difference [A – G] | Evaluation results | | | |
|---|---|---|---|---|---|---|---|---|---|---|---|---|
| | Sensitizer | | | Sensitizing auxiliary | | | | | | | | |
| | Species | Classification | Amount | Species | Amount | Total amount | | | | Ejection stability | Definition of image | Pencil hardness | Scratch resistance |
| Example 117 | ITX | S1 | 2.5 | MNT | 1 | 100 | 0.23 | 0.10 | 0.13 | A | B | 2H | A |
| Example 118 | ITX | S1 | 2.5 | MNT | 1 | 100 | 0.28 | 0.10 | 0.18 | A | C | 2H | A |
| Example 119 | ITX | S1 | 2.5 | MNT | 1 | 100 | 0.19 | 0.10 | 0.09 | A | A | 2H | A |
| Example 120 | ITX | S1 | 2.5 | MNT | 1 | 100 | 0.26 | 0.10 | 0.16 | A | C | 2H | A |
| Example 121 | ITX | S1 | 2.5 | MNT | 1 | 100 | 0.20 | 0.10 | 0.10 | A | A | 2H | A |
| Example 122 | ITX | S1 | 2.5 | MNT | 1 | 100 | 0.23 | 0.10 | 0.13 | A | B | 2H | A |
| Example 123 | ITX | S1 | 2.5 | MNT | 1 | 100 | 0.16 | 0.15 | 0.01 | A | A | 2H | A |
| Example 124 | ITX | S1 | 2.5 | MNT | 1 | 100 | 0.10 | 0.19 | -0.09 | A | A | 2H | A |
| Example 125 | ITX | S1 | 2.5 | MNT | 1 | 100 | 0.10 | 0.25 | -0.15 | B | B | 2H | A |
| Example 126 | ITX | S1 | 2.5 | MNT | 1 | 100 | 0.10 | 0.27 | -0.17 | B | C | 2H | A |
| Comparative Example 101 | ITX | S1 | 2.5 | MNT | 1 | 100 | 0.33 | 0.10 | 0.23 | B | F | 2H | A |
| Comparative Example 102 | ITX | S1 | 2.5 | MNT | 1 | 100 | 0.04 | 0.25 | -0.21 | D | A | 2H | A |

Notes of Table 1-1 to Table 5-2

In the "Polymer" columns, "Species" means the species of the raw-material polymer.

In the "Polymer" columns, "Acid value (mmol/g)" means the number of millimoles of an acid group (specifically, a carboxy group) per 1 g of the raw-material polymer.

In the "Polymer" columns, "Neutralization degree" means the neutralization degree of the specified polymer (specifically, in the specified polymer, the percentage % of the number of moles of an anionic group relative to the total number of moles of the anionic group and an acid group).

In the "Polymer" columns, "Anion value (mmol/g)" means the anion value of the specified polymer (specifically, the number of millimoles of the anionic group per 1 g of the specified polymer).

In the Classification of the photo-acid generator, "G1" means that the photo-acid generator belongs to the compound represented by Formula (G1).

In the Classification of the photo-acid generator, "G2" means that the photo-acid generator belongs to the compound represented by Formula (G2).

In the Classification of the photo-acid generator, "Other" means that the photo-acid generator does not belong to the compound represented by Formula (G1) or the compound represented by Formula (G2).

In $X^-$ of the photo-acid generator, "BF4" means a tetrafluoroborate ion ($BF_4^-$).

In $X^-$ of the photo-acid generator, "CF3CO3" means a trifluoromethanesulfonate ion ($CF_3CO_3^-$).

In $X^-$ of the photo-acid generator, "PF6" means a hexafluorophosphate ion ($PF_6^-$).

In the Classification of the sensitizer, "S1" means that the sensitizer belongs to the compound represented by Formula (S1).

In the Classification of the sensitizer, "S2" means that the sensitizer belongs to the compound represented by Formula (S2).

In the Classification of the sensitizer, "S3" means that the sensitizer belongs to the compound represented by Formula (S3).

"Intra-particle anion value A (mmol/g)" means the number of millimoles of the anionic group (specifically, a carboxylate group) per 1 g of the specified particles.

"Intra-particle photo-acid generator amount G (mmol/g)" means the number of millimoles of the photo-acid generator per 1 g of the specified particles.

As described in Tables 1-1 and 1-2 and Tables 2-1 and 2-2, Examples 101 to 126, which employ photocurable inks that contain water and particles (namely, the specified particles) including a polymer having an anionic group (namely, the specified polymer), a photo-acid generator, and a sensitizer, and that have a value (difference [A–G]) of –0.20 or more and 0.20 or less obtained by subtracting the intra-particle photo-acid generator amount G from the intra-particle anion value A, provided formed images having high definition and exhibited high ink ejection stability.

By contrast, Comparative Example 101, which has a difference [A–G] of more than 0.20, provided images having lower definition.

Comparative Example 102, which has a difference [A–G] of less than –0.20, exhibited lower ink ejection stability.

In each of the above-described Examples 101 to 126, the aqueous dispersion of the specified particles was used for measuring the volume-average dispersed particle size of the specified particles.

As a result, in each of the Examples, the specified particles were found to have a volume-average dispersed particle size in the range of 0.10 µm to 0.25 µm.

The results of Examples 101 to 103 have demonstrated that, in the cases where the photo-acid generator is at least one selected from the group consisting of the compound represented by Formula (G1) and the compound represented by Formula (G2) (Examples 102 and 103), the images have further improved definition.

The results of Examples 102 and 103 have demonstrated that, in the cases where the photo-acid generator includes the compound represented by Formula (G2) (Example 103), the images have further improved definition.

The results of Examples 103 to 105 have demonstrated that, in the cases where the photo-acid generator includes the compound represented by Formula (G2) and $X^-$ in Formula (G2) is a trifluoromethanesulfonate ion ($CF_3CO_3^-$) or a hexafluorophosphate ion ($PF_6^-$) (Examples 104 and 105), the images have further improved definition.

The results of Examples 105 to 107 have demonstrated that, in the cases where the sensitizer includes the compound represented by Formula (S1) (Example 105), the images have further improved definition.

The results of Examples 105 and 108 have demonstrated that, in the cases where the particles further include a sensitizing auxiliary (MNT belonging to the compound represented by Formula (SA)) (Example 108), the images have further improved definition.

The results of Examples 108, 110, and 111 have demonstrated that, in the cases where the specified polymer has a radical-polymerizable group (Examples 108 (polymer P-1) and 110 (polymer P-2)), the images have further improved pencil hardness and scratch resistance.

The results of Examples 108 and 112 have demonstrated that, in the cases where the specified particles include a radical polymerization initiator (Example 108), the images have further improved pencil hardness and scratch resistance.

Example 201: Thermosetting Ink

Preparation of Thermosetting Ink

A thermosetting ink was prepared as in Example 105 except that, in the preparation of the aqueous dispersion, the species of the raw-material polymer was changed as described in Table 3-1, and S833, S399, and IRG819 were changed to Trixene™ BI7982 (thermal-polymerizable monomer; blocked isocyanate; manufactured by Baxenden Chemicals Ltd.) from which propylene glycol monomethyl ether had been driven off under a reduced pressure under conditions of 60° C. and 2.67 kPa (20 torr) (hereafter, also referred to as "BI7982"; the amount is described in Table 3-1; molecular weight: 793).

Evaluations

The thermosetting ink obtained above was evaluated in the following manner.

The results are described in Table 3-2.

Ejection Stability of Ink

The evaluation was performed as with the evaluation of ejection stability of the ink in Example 101.

Definition of Image

The evaluation was performed as with the evaluation of definition of the images in Example 101.

Pencil Hardness of Cured Film

The evaluation of pencil hardness of the cured film was performed as with the evaluation of pencil hardness of the cured film in Example 101 except that the procedure of subjecting the solid image to heat-drying (heat-drying after irradiation with UV light from an LED light source) and irradiation with UV light (metal-halide-lamp light source) was changed to a procedure of heating the solid image in an oven at 120° C. for 5 minutes.

Scratch Resistance of Cured Film

The evaluation of the scratch resistance of the cured film was performed as in the evaluation of the scratch resistance of the cured film in Example 101 except that the procedure of subjecting the solid image to heat-drying (heat-drying after irradiation with UV light from the LED light source) and irradiation with UV light (metal-halide-lamp light source) was changed to a procedure of heating the solid image in an oven at 120° C. for 5 minutes.

Example 202: Thermosetting Ink

The same procedures as in Example 201 were performed except that, in the preparation of the aqueous dispersion, a sensitizing auxiliary whose species and amount are described in Table 3-2 was further added, and the amount of thermal-polymerizable monomer BI7982 was changed as described in Table 3-1.

Comparative Example 201: Thermosetting Ink

The same procedures as in Example 202 were performed except that the neutralization degree of the specified polymer was changed as described in Table 3-1, so that the difference [A–G] (value obtained by subtracting the intra-particle photo-acid generator amount G from the intra-particle anion value A) was changed so as to become the value described in Table 3-2.

The results are described in Table 3-2.

TABLE 3-1

Thermosetting ink containing particles
All solid contents of particles (amounts are described in parts by mass)

| | Polymer | | | | | Thermal-polymerizable monomer | | Photo-acid generator | | |
|---|---|---|---|---|---|---|---|---|---|---|
| | Species | Amount | Acid value (mmol/g) | Neutralization degree | Anion value (mmol/g) | Species | Amount | Species | X⁻ | Amount |
| Example 201 | P-3 | 50 | 0.65 | 50% | 0.33 | BI7982 | 42.5 | PAG-9 | PF6 | 5 |
| Example 202 | P-3 | 50 | 0.65 | 50% | 0.33 | BI7982 | 41.5 | PAG-9 | PF6 | 5 |
| Comparative Example 201 | P-3 | 50 | 0.65 | 100% | 0.65 | BI7982 | 41.5 | PAG-9 | PF6 | 5 |

TABLE 3-2

| | | | | | | | | | | | |
|---|---|---|---|---|---|---|---|---|---|---|---|
| | colspan="5" | Thermosetting ink containing particles | | | | | | | | | |
| | colspan="5" | All solid contents of particles (amounts are described in parts by mass) | | | | Intra-particle anion value A | Intra-particle photo-acid generator amount G | Differ-ence | colspan="4" | Evaluation results | | | |
| | Sensitizer | | Sensitizing auxiliary | | Total | | | | Ejection | Defini-tion of | Pencil | Scratch resis- |
| | Species | Amount | Species | Amount | Amount | (mmol/g) | (mmol/g) | [A − G] | stability | image | hardness | tance |
| Example 201 | ITX | 2.5 | — | 0 | 100 | 0.16 | 0.10 | 0.06 | A | B | 2H | A |
| Example 202 | ITX | 2.5 | MNT | 1 | 100 | 0.16 | 0.10 | 0.06 | A | A | 2H | A |
| Comparative Example 201 | ITX | 2.5 | MNT | 1 | 100 | 0.33 | 0.10 | 0.23 | A | F | 2H | A |

As described in Tables 3-1 and 3-2, Examples 201 and 202 relating to thermosetting inks provided results similar to those of Examples 105 and 108 relating to photocurable inks.

In each of the above-described Examples 201 and 202, the aqueous dispersion of the specified particles was used for measuring the volume-average dispersed particle size of the specified particles.

As a result, in each of the Examples, the specified particles were found to have a volume-average dispersed particle size in the range of 0.10 µm to 0.25 µm.

Example 301: Photocurable Ink Containing MC

Preparation of Aqueous Dispersion of Microcapsules (MC)

In the following manner, an aqueous dispersion of microcapsules (MC) including a shell composed of a urethane polymer being a crosslinked polymer having a three-dimensional crosslinked structure, and a core including a radical-polymerizable monomer, a radical polymerization initiator, a photo-acid generator, and a sensitizer was prepared.

In this Example, the microcapsules (MC) correspond to the specified particles.

Preparation of Oil-Phase Component

Ethyl acetate,

TAKENATE (registered trademark) D-120N manufactured by Mitsui Chemicals, Inc. (43.5 parts as the amount of the trifunctional isocyanate compound present as a solid content; hereafter, this solid content is also referred to as "D120"), a solution of NCO1 described below (25 parts as the amount of NCO1 present as a solid content), the above-described S833 (21 parts) being a radical-polymerizable monomer, the above-described IRG819 (3 parts) being a radical polymerization initiator, the above-described PAG-9 ($X^-$:$CF_3CO_3^-$) (5 parts) being a photo-acid generator, and the above-described ITX (2.5 parts) being a sensitizer, were mixed together and stirred for 15 minutes, to thereby obtain 45.7 g of an oil-phase component having a solid content of 30 mass %.

TAKENATE D-120N is a 75 mass % ethyl acetate solution of an adduct of trimethylolpropane (TMP) and 1,3-bis(isocyanatomethyl)cyclohexane (HXDI) ("D120" being a trifunctional isocyanate compound).

NCO1 is an isocyanate compound having an introduced carboxy group, and is specifically an adduct (DMPA/IPDI=⅓ (molar ratio)) of 2,2-bis(hydroxymethyl)propionic acid (DMPA) and IPDI.

NCO1 has an acid value (the number of millimoles of a carboxy group per 1 g of NCO1) of 1.24 mmol/g.

The above-described NCO1 solution is a 35 mass % ethyl acetate solution of NCO1.

The NCO1 solution was prepared by adding, to a three-neck flask, 16.5 g of 2,2-bis(hydroxymethyl)propionic acid (DMPA), 82 g of isophorone diisocyanate (IPDI), and 186 g of ethyl acetate (AcOEt), performing heating at 50° C., adding 0.3 g of NEOSTANN U-600 to this, and causing a reaction for 3 hours.

Preparation of Aqueous-Phase Component

Distilled water (43.1 g) and sodium hydroxide serving as a neutralizer were mixed together and stirred for 15 minutes, to thereby prepare an aqueous-phase component.

The amount of sodium hydroxide used as a neutralizer was adjusted such that the shells (crosslinked polymer) of MC to be produced would have a neutralization degree of 50%.

The oil-phase component and the aqueous-phase component were mixed together, and the resultant mixture was emulsified at room temperature using a homogenizer at 12000 rpm for 10 minutes, to obtain an emulsion. The obtained emulsion was added to distilled water (15.3 g), and the obtained liquid was heated at 50° C. and stirred at 50° C. for 5 hours, to thereby drive off, from the liquid, ethyl acetate. The remaining liquid was diluted with distilled water such that the solid content would become 20 mass %, to thereby obtain an aqueous dispersion of microcapsules (MC).

The crosslinked polymer serving as the shells of the microcapsules (MC) is a urethane polymer having a three-dimensional crosslinked structure and formed by a reaction of D120 being a trifunctional isocyanate compound, NCO1 being an isocyanate compound having an introduced carboxy group, and water.

The crosslinked polymer has a carboxylate group (anionic group) generated by partial neutralization of the carboxy groups in NCO1.

Preparation of Photocurable Ink

The components of the following composition were mixed together, to prepare a photocurable ink.

Composition of Photocurable Ink

Aqueous dispersion described above: 82 parts

Pigment dispersion liquid (Pro-jet Cyan APS1000 (manufactured by FUJIFILM Imaging Colorants, Inc.), pigment concentration: 14 mass %): 13 parts Fluorosurfactant (manufactured by E. I. du Pont de Nemours and Company, Capstone FS-31, solid content: 25 mass %): 0.3 parts 2-Methylpropanediol: 4.7 parts Evaluations The obtained photocurable ink was evaluated as in the evaluations performed in Example 101.

The results are described in Table 4-2.

Examples 302 to 304: Photocurable Inks Containing MC

Evaluations were performed as in Example 301 except that the combination of the species of X⁻ in the photo-acid generator and the species of the sensitizer was changed as described in Tables 4-1 and 4-2.

The results are described in Table 4-2.

Example 305: Photocurable Ink Containing MC

The same procedures as in Example 302 were performed except that, in the preparation of the aqueous dispersion, a sensitizing auxiliary whose species and amount are described in Table 4-2 was further added, and the amount of radical-polymerizable monomer S833 was changed as described in Table 4-1.

The results are described in Table 4-2.

Example 306: Ink Containing MC

The same procedures as in Example 305 were performed except that, in the preparation of the aqueous dispersion, the radical-polymerizable monomer S833 and the photopolymerization initiator IRG819 were not used, and the amount of TAKENATE D-120N used was changed such that the amount of D120 being a solid content would become the value described in Table 4-1

The results are described in Table 4-2. .

Example 307: Photocurable Ink Containing MC

Example 307 is an example in which polymer P-1 used in Example 101 and the like was used as a dispersing agent for microcapsules.

In this Example, the composite of the microcapsules and the dispersing agent corresponds to the specified particles.

Specifically, the same procedures as in Example 305 were performed except that, in the preparation of the oil-phase component, the NCO1 solution (25 parts as the amount of NCO1 being a solid content) was changed to a 30 mass % solution of polymer P-1 (50 parts as the amount of polymer P-1 being a solid content), and the amount of TAKENATE D-120N used was changed such that the amount of D120 being a solid content would become the amount described in Table 4-1.

In this Example, the amount of sodium hydroxide used as a neutralizer was adjusted such that polymer P-1 serving as a dispersing agent would have a neutralization degree of 50%.

The results are described in Table 4-2.

Comparative Example 301

The same procedures as in Example 305 were performed except that the neutralization degree of the crosslinked polymer was changed so as to become the value described in Table 4-1, so that the difference [A−G] (value obtained by subtracting the intra-particle photo-acid generator amount G from the intra-particle anion value A) was changed so as to become the value described in Table 4-2.

The results are described in Table 4-2.

TABLE 4-1

Photocurable ink containing MC
Raw materials of particles
(amounts are described in parts by mass)
Raw materials of MC

| | Shells of MC (crosslinked polymer) | | | | Cores of MC | | | | | | |
|---|---|---|---|---|---|---|---|---|---|---|---|
| | Raw materials | | | Neutralization | Radical-polymerizable monomer | | Radical polymerization initiator | | Photo-acid generator | | |
| | Species | Amount | Species | Amount | degree | Species | Amount | Species | Amount | Species | X⁻ | Amount |
| Example 301 | D120 | 43.5 | NCO1 | 25 | 50% | S833 | 21 | IRG 819 | 3 | PAG-9 | CF3SO3 | 5 |
| Example 302 | D120 | 43.5 | NCO1 | 25 | 50% | S833 | 21 | IRG 819 | 3 | PAG-9 | PF6 | 5 |
| Example 303 | D120 | 43.5 | NCO1 | 25 | 50% | S833 | 21 | IRG 819 | 3 | PAG-9 | PF6 | 5 |
| Example 304 | D120 | 43.5 | NCO1 | 25 | 50% | S833 | 21 | IRG 819 | 3 | PAG-9 | SO3 | 5 |
| Example 305 | D120 | 43.5 | NCO1 | 25 | 50% | S833 | 20 | IRG 819 | 3 | PAG-9 | PF6 | 5 |
| Example 306 | D120 | 66.5 | NCO1 | 25 | 50% | — | 0 | — | 0 | PAG-9 | PF6 | 5 |
| Example 307 | D120 | 18.5 | — | 0 | 50% | S833 | 20 | IRG 819 | 3 | PAG-9 | PF6 | 5 |
| Comparative Example 301 | D120 | 43.5 | NCO1 | 25 | 100% | S833 | 20 | IRG 819 | 3 | PAG-9 | PF6 | 5 |

TABLE 4-2

Photocurable ink containing MC

| | Raw materials of particles (amounts are described in parts by mass) | | | | | | Intra-particle anion value A (mmol/g) | Intra-particle photo-acid generator amount G (mmol/g) | Difference [A – G] | Evaluation results | | | |
|---|---|---|---|---|---|---|---|---|---|---|---|---|---|
| | Raw materials of MC Cores of MC | | | | | | | | | | | | |
| | Sensitizer | | Sensitizing auxiliary | | Dispersing agent | | | | | | | | |
| | Species | Amount | Species | Amount | Species | Amount | Total | | | | Ejection stability | Definition of image | Pencil hardness | Scratch resistance |
| Example 301 | ITX | 2.5 | — | 0 | — | 0 | 100 | 0.16 | 0.10 | 0.06 | A | B | 2H | A |
| Example 302 | ITX | 2.5 | — | 0 | — | 0 | 100 | 0.16 | 0.10 | 0.06 | A | B | 2H | A |
| Example 303 | DBA | 2.5 | — | 0 | — | 0 | 100 | 0.16 | 0.10 | 0.06 | A | C | 2H | A |
| Example 304 | TC | 2.5 | — | 0 | — | 0 | 100 | 0.16 | 0.10 | 0.06 | A | C | 2H | A |
| Example 305 | ITX | 2.5 | MNT | 1 | — | 0 | 100 | 0.16 | 0.10 | 0.06 | A | A | 2H | A |
| Example 306 | ITX | 2.5 | MNT | 1 | — | 0 | 100 | 0.16 | 0.10 | 0.06 | A | A | F | B |
| Example 307 | ITX | 2.5 | MNT | 1 | P-1 | 50 | 100 | 0.16 | 0.10 | 0.07 | A | A | 2H | A |
| Comparative Example 301 | ITX | 2.5 | MNT | 1 | — | 0 | 100 | 0.31 | 0.10 | 0.21 | A | F | 2H | A |

As described in Tables 4-1 and 4-2, it has been demonstrated that Examples 301 to 307 relating to photocurable inks containing MC also provide advantages of high ink ejection stability and high image definition.

In addition, the results of Examples 305 and 306 have demonstrated that, in the case where the specified particles include a radical-polymerizable monomer (Example 305), the image has further improved scratch resistance.

In the above-described Examples 301 to 307, the aqueous dispersions of MC were used for measuring the volume-average dispersed particle sizes of MC, and the volume-average dispersed particle sizes of MC were found to be in the range of 0.10 μm to 0.25 μm.

Example 401: Thermosetting Ink Containing MC

Preparation of Thermosetting Ink

In the following manner, an aqueous dispersion of microcapsules (MC) including a shell composed of a urethane polymer being a crosslinked polymer having a three-dimensional crosslinked structure, and a core including a thermal-polymerizable monomer, a photo-acid generator, and a sensitizer was prepared.

In this Example, the microcapsules (MC) correspond to the specified particles.

Specifically, a thermosetting ink was prepared as in the preparation of the photocurable ink in Example 302 except that S833, IRG819, and ITX were changed to BI7982 (the amount is described in Table 5-1), and the amount of D120 was changed as described in Table 5-1.

In the thermosetting ink, the structure of the crosslinked polymer forming the shells of MC is the same as the structure of the polymer forming the shells of MC in Example 301.

Evaluations

The thermosetting ink obtained above was evaluated as in Example 201 relating to a thermosetting ink.

The results are described in Table 5-2.

Example 402: Thermosetting Ink Containing MC

The same procedures were performed as in Example 401 except that, in the preparation of the aqueous dispersion, a sensitizing auxiliary whose species and amount are described in Table 5-2 was further added, and the amount of thermal-polymerizable monomer BI7982 was changed as described in Table 5-1.

The results are described in Table 5-2.

Comparative Example 401: Thermosetting Ink Containing MC

The same procedures as in Example 402 were performed except that the neutralization degree of the specified polymer was changed as described in Table 5-1, so that the difference [A–G] (value obtained by subtracting the intra-particle photo-acid generator amount G from the intra-particle anion value A) was changed so as to become a value in Table 5-2.

The results are described in Table 5-2.

TABLE 5-1

Thermosetting ink containing MC
Raw materials of particles
(amounts are described in parts by mass)
Raw materials of MC

| | Shells of MC (crosslinked polymer) | | | Cores of MC | | | | |
| | Raw materials | | Neutralization | Thermal-polymerizable monomer | | Photo-acid generator | | |
| | Species | Amount | Species | Amount | degree | Species | Amount | Species | $X^-$ | Amount |
|---|---|---|---|---|---|---|---|---|---|---|
| Example 401 | D120 | 45 | NCO1 | 25 | 50% | BI7982 | 24 | PAG-9 | PF6 | 5 |
| Example 402 | D120 | 45 | NCO1 | 25 | 50% | BI7982 | 23 | PAG-9 | PF6 | 5 |
| Comparative Example 401 | D120 | 45 | NCO1 | 25 | 100% | BI7982 | 23 | PAG-9 | PF6 | 5 |

TABLE 5-2

Thermosetting ink containing MC

| | Raw materials of particles (amounts are described in parts by mass) | | | | Intra-particle anion value A | Intra-particle photo-acid generator amount G | Evaluation results | | | |
| | Raw materials of MC Cores of MC | | | | | | | | | |
| | Sensitizer | | Sensitizing auxiliary | | | | Differ-ence | Ejection | Defini-tion of | Pencil | Scratch resis- |
| | Species | Amount | Species | Amount | Total | (mmol/g) | (mmol/g) | [A − G] | stability | image | hardness | tance |
|---|---|---|---|---|---|---|---|---|---|---|---|---|
| Example 401 | ITX | 2.5 | — | 0 | 102 | 0.16 | 0.10 | 0.06 | A | B | 2H | A |
| Example 402 | ITX | 2.5 | MNT | 1 | 102 | 0.16 | 0.10 | 0.06 | A | A | 2H | A |
| Comparative Example 401 | ITX | 2.5 | MNT | 1 | 102 | 0.31 | 0.10 | 0.23 | A | F | 2H | A |

As described in Tables 5-1 and 5-2, it has been demonstrated that Examples 401 and 402 relating to thermosetting inks containing MC also provide advantages of high ink ejection stability and high image definition.

In the above-described Examples 401 and 402, the aqueous dispersions of MC were used for measuring the volume-average dispersed particle sizes of MC, and the volume-average dispersed particle sizes of MC were found to be in the range of 0.10 μm to 0.25 μm.

The disclosure of JP2018-060714 filed Mar. 27, 2018 is incorporated herein by reference in its entirety.

All the documents, patent applications, and technical standards mentioned in this Specification are incorporated herein by reference to the same extent as in the case where the documents, patent applications, and technical standards are each specifically and individually described as being incorporated herein by reference.

What is claimed is:
1. An ink jet ink composition, comprising:
water; and
particles comprising a polymer having an anionic group, a photo-acid generator, and a sensitizer,
wherein a number of millimoles of the anionic group per 1 g of the particles is defined as an intra-particle anion value A, a number of millimoles of the photo-acid generator per 1 g of the particles is defined as an intra-particle photo-acid generator amount G, and a value obtained by subtracting the intra-particle photo-acid generator amount G from the intra-particle anion value A is −0.20 or more and 0.20 or less, the sensitizer comprises at least one selected from the group consisting of a compound represented by the following Formula (S1), a compound represented by the following Formula (S2), and a compound represented by the following Formula (S3):

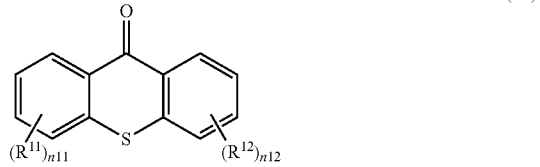

(S1)

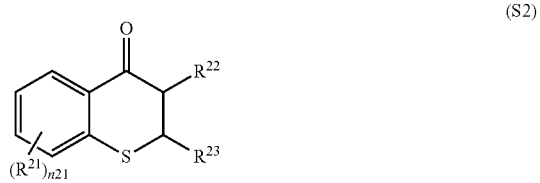

(S2)

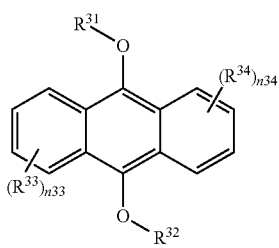

wherein, in Formula (S1), Formula (S2), and Formula (S3),
$R^{11}$, $R^{12}$, $R^{21}$, $R^{33}$, and $R^{34}$ each independently represent a halogen atom, an alkyl group, an aryl group, a hydroxy group, an amino group, an alkylsulfanyl group, an alkylamino group, an alkoxy group, an alkoxycarbonyl group, an acyloxy group, an acyl group, a carboxy group, or a sulfo group;
n11, n12, n21, n33, and n34 each independently represent an integer of 0 to 4;
when n11 is an integer of 2 to 4, a plurality of $R^{11}$ may be the same or different;
when n12 is an integer of 2 to 4, a plurality of $R^{12}$ may be the same or different;
when n21 is an integer of 2 to 4, a plurality of $R^{21}$ may be the same or different;
when n33 is an integer of 2 to 4, a plurality of $R^{33}$ may be the same or different;
when n34 is an integer of 2 to 4, a plurality of $R^{34}$ may be the same or different;
$R^{22}$ and $R^{23}$ in Formula (S2) each independently represent a hydrogen atom, a halogen atom, an alkyl group, or a hydroxy group; and
$R^{31}$ and $R^{32}$ in Formula (S3) each independently represent an alkyl group.

2. The ink jet ink composition according to claim 1, wherein the anionic group comprises a carboxylate group.

3. The ink jet ink composition according to claim 1, wherein the photo-acid generator comprises at least one selected from the group consisting of a compound represented by the following Formula (G1) and a compound represented by the following Formula (G2):

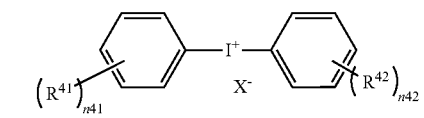

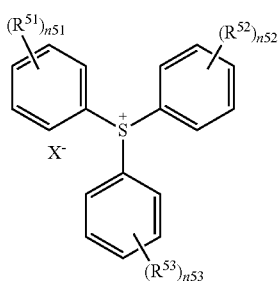

wherein, in Formula (G1) and Formula (G2),
$R^{41}$, $R^{42}$, $R^{51}$, $R^{52}$, and $R^{53}$ each independently represent a halogen atom, an alkyl group, an aryl group, a hydroxy group, an alkoxy group, an aryloxy group, an alkylthio group, an arylthio group, or a trifluoromethyl group;
n41, n42, n51, n52, and n53 each independently represent an integer of 0 to 5;
when n41 is an integer of 2 to 5, a plurality of $R^{41}$ may be the same or different;
when n42 is an integer of 2 to 5, a plurality of $R^{42}$ may be the same or different;
when n51 is an integer of 2 to 5, a plurality of $R^{51}$ may be the same or different;
when n52 is an integer of 2 to 5, a plurality of $R^{52}$ may be the same or different;
when n53 is an integer of 2 to 5, a plurality of $R^{53}$ may be the same or different; and
$X^-$ in Formula (G1) and $X^-$ in Formula (G2) each independently represent a chloride ion, a bromide ion, an iodide ion, a para-toluenesulfonate ion, a tetrafluoroborate ion, a trifluoromethanesulfonate ion, a bis(trifluoromethylsulfonyl)imide ion, a hexafluorophosphate ion, a hexafluoroantimonate ion, a perchlorate ion, or a hexafluoroarsenate ion.

4. The ink jet ink composition according to claim 3, wherein the photo-acid generator comprises the compound represented by Formula (G2).

5. The ink jet ink composition according to claim 4, wherein $X^-$ in Formula (G2) is a trifluoromethanesulfonate ion or a hexafluorophosphate ion.

6. The ink jet ink composition according to claim 1, wherein the sensitizer comprises the compound represented by Formula (S1).

7. The ink jet ink composition according to claim 1, wherein the particles further comprise a sensitizing auxiliary that is a compound represented by the following Formula (SA):

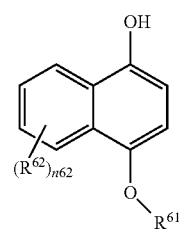

wherein, in Formula (SA), $R^{61}$ represents a hydrocarbon group having 1 to 20 carbon atoms; $R^{62}$ represents a halogen atom, an alkyl group, an aryl group, a hydroxy group, an alkoxy group, or a trifluoromethyl group; n62 represents an integer of 0 to 4; and when n62 is an integer of 2 to 4, a plurality of $R^{62}$ may be the same or different.

8. The ink jet ink composition according to claim 1, wherein the particles further comprise a radical-polymerizable monomer.

9. The ink jet ink composition according to claim 1, wherein the polymer further comprises a radical-polymerizable group.

10. The ink jet ink composition according to claim 1, wherein the particles further comprise a radical polymerization initiator.

11. The ink jet ink composition according to claim 1, the ink jet ink composition being used as an ink in an image-forming method comprising:

applying, onto a substrate, the ink by an ink jet process to form an ink film;

irradiating the formed ink film with light; and heat-drying the ink film irradiated with light to obtain an image.

12. A method for producing the ink jet ink composition according to claim 1, the method comprising:

mixing together an oil-phase component comprising an organic solvent, a polymer having an acid group, the photo-acid generator, and the sensitizer, and an aqueous-phase component comprising water and a neutralizer, and performing emulsification to form the particles.

13. An image-forming method, comprising:

applying, onto a substrate, the ink jet ink composition according to claim 1 by an ink jet process to form an ink film;

irradiating the formed ink film with light; and heat-drying the ink film irradiated with light to obtain an image.

* * * * *